United States Patent
Park et al.

(10) Patent No.: US 12,452,792 B2
(45) Date of Patent: Oct. 21, 2025

(54) METHOD AND DEVICE FOR CONTROLLING TRANSMISSION POWER OF TERMINAL IN WIRELESS COMMUNICATION SYSTEM

(71) Applicant: Samsung Electronics Co., Ltd., Suwon-si (KR)

(72) Inventors: Sungjin Park, Suwon-si (KR); Hyunseok Ryu, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 17/921,234

(22) PCT Filed: Apr. 27, 2021

(86) PCT No.: PCT/KR2021/005298
§ 371 (c)(1),
(2) Date: Oct. 25, 2022

(87) PCT Pub. No.: WO2021/221430
PCT Pub. Date: Nov. 4, 2021

(65) Prior Publication Data
US 2023/0171703 A1 Jun. 1, 2023

(30) Foreign Application Priority Data
Apr. 28, 2020 (KR) .................. 10-2020-0051776

(51) Int. Cl.
*H04W 4/00* (2018.01)
*H04W 52/14* (2009.01)
(Continued)

(52) U.S. Cl.
CPC ......... *H04W 52/146* (2013.01); *H04W 52/54* (2013.01); *H04W 72/23* (2023.01); *H04L 5/0055* (2013.01); *H04W 88/04* (2013.01)

(58) Field of Classification Search
None
See application file for complete search history.

(56) References Cited

U.S. PATENT DOCUMENTS 10,142,079 B2   11/2018   Oh et al.
10,314,019 B2   6/2019    Park et al.
(Continued)

FOREIGN PATENT DOCUMENTS

CN      106465295 A      2/2017
KR   10-2018-0008878     1/2018
(Continued)

OTHER PUBLICATIONS

Ericsson, Resource Allocation Mode 1 for NR SL, R1-2002233, 3GPP TSG RAN WG1 #100bis-e, e-Meeting, Apr. 10, 2020.
(Continued)

*Primary Examiner* — Bob A Phunkulh
(74) *Attorney, Agent, or Firm* — Jefferson IP Law, LLP

(57) ABSTRACT

An operating method of a first user equipment (UE) in a wireless communication system according to an embodiment of the disclosure includes receiving downlink control information (DCI) for sidelink communication from a base station, transmitting sidelink data to a second UE, based on the received DCI, receiving feedback information about the sidelink communication through a physical sidelink feedback channel (PSFCH) from the second UE, determining transmission power for transmitting the feedback information to the base station, and transmitting the feedback
(Continued)

information through a physical uplink control channel (PUCCH) to the base station, based on the determined transmission power.

16 Claims, 35 Drawing Sheets

(51) Int. Cl.
  *H04W 52/54* (2009.01)
  *H04W 72/23* (2023.01)
  *H04L 5/00* (2006.01)
  *H04W 88/04* (2009.01)

(56) References Cited

U.S. PATENT DOCUMENTS

| | | | |
|---|---|---|---|
| 11,388,678 B2 | 7/2022 | Ryu et al. | |
| 2015/0358924 A1 | 12/2015 | Papasakellariou | |
| 2016/0286558 A1 | 9/2016 | Chae et al. | |
| 2020/0228247 A1* | 7/2020 | Guo | H04L 1/0025 |
| 2020/0313805 A1* | 10/2020 | Park | H04L 1/1812 |
| 2021/0051600 A1* | 2/2021 | Fakoorian | H04W 52/242 |
| 2021/0266110 A1* | 8/2021 | Wang | H04W 72/0446 |
| 2021/0282089 A1 | 9/2021 | Takeda et al. | |
| 2022/0321278 A1* | 10/2022 | Yoshioka | H04L 1/1854 |
| 2022/0338172 A1* | 10/2022 | Yoshioka | H04W 72/20 |
| 2023/0016768 A1* | 1/2023 | Yang | H04L 5/0057 |
| 2023/0170958 A1* | 6/2023 | Khoshnevisan | H04W 52/42 375/262 |
| 2023/0261797 A1* | 8/2023 | Hahn | H04L 1/1678 370/329 |
| 2024/0089982 A1* | 3/2024 | Lee | H04W 72/232 |

FOREIGN PATENT DOCUMENTS

| | | |
|---|---|---|
| WO | 2017/014510 A1 | 1/2017 |
| WO | 2020008647 A1 | 8/2021 |

OTHER PUBLICATIONS

3GPP TS 38.213 V16.1.0, 3rd Generation Partnership Project; Technical Specification Group Radio Access Network; NR; Physical layer procedures for control, (Release 16), Apr. 3, 2020.
Mediatek Inc., Content of UE assistance information, R2-1906813, 3GPP TSG-RAN WG2 Meeting #106, Reno, USA, May 3, 2019.
International Search Report and Written Opinion dated Jul. 30, 2021, issued in International Patent Application No. PCT/KR2021/005298.
3GPP TS 38.300 v15.9.0, 3rd Generation Partnership Project; Technical Specification Group Radio Access Network; NR; NR and NG-RAN Overall Description; Stage 2 (Release 15), Apr. 6, 2020.
Korean Office Action dated Oct. 21, 2024, issued in Korean Patent Application No. 10-2020-0051776.
Huawei et al., NR DCI and UCI design for resource allocation mode 1, RI-1909315, 3GPP TSG RAN WGI Meeting #98, Prague, Czech Republic, Aug. 17, 2019.
3GPP TS 38.300 V16.1.0, 3rd Generation Partnership Project; Technical Specification Group Radio Access Network; NR; NR and NG-RAN Overall Description; Stage 2, (Release 16), Apr. 6, 2020.
Extended European Search Report dated Sep. 1, 2023, issued in European Patent Application No. 21795582.2.
Notice of Allowance European Search Report dated Feb. 27, 2025, issued in European Application No. 21 795 582.2.
Chinese Office Action dated Jun. 28, 2025, issued in Chinese Application No. 202180031974.4.

* cited by examiner

Mini-Slot-based scheduling

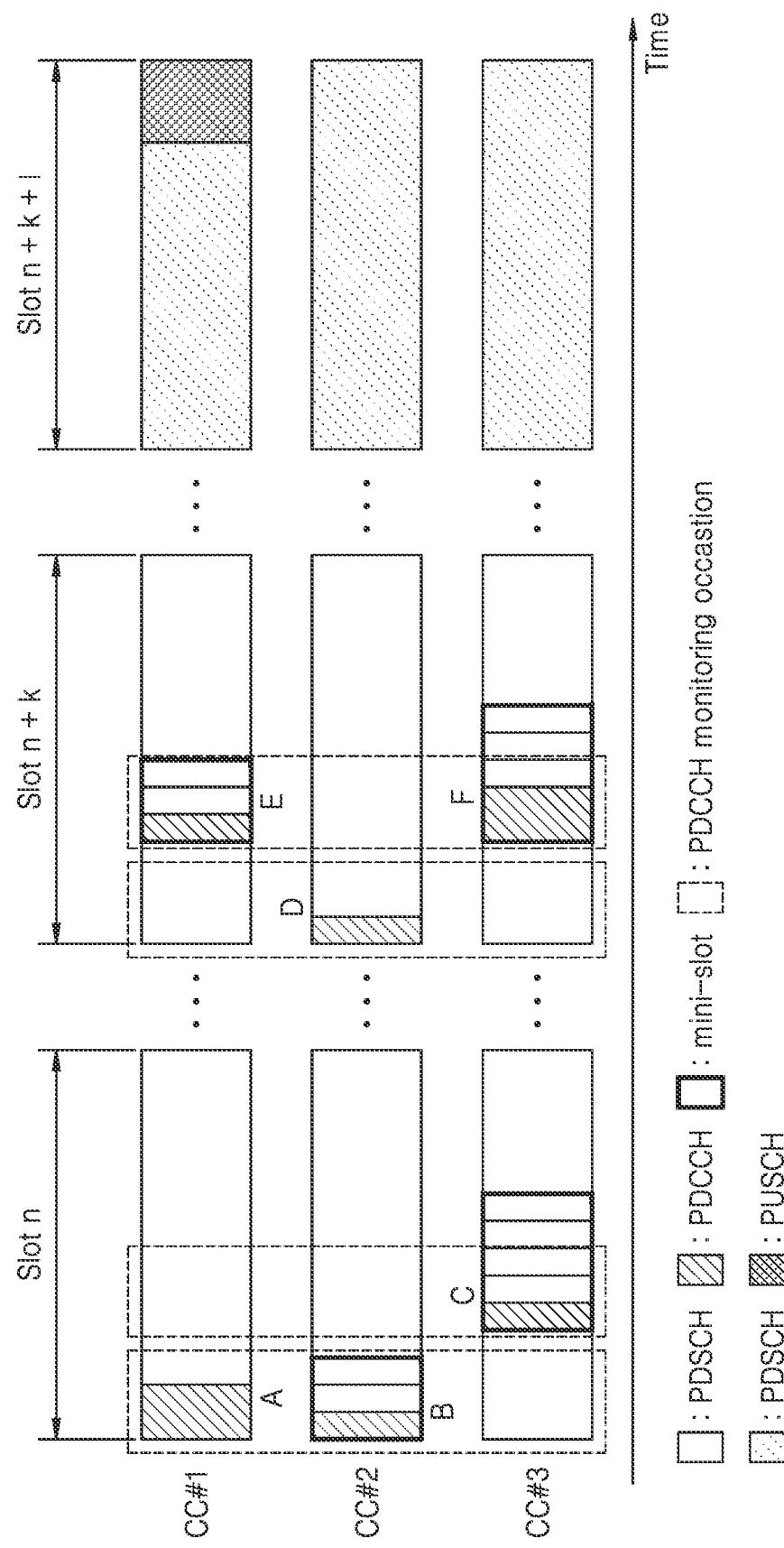

METHOD AND DEVICE FOR CONTROLLING TRANSMISSION POWER OF TERMINAL IN WIRELESS COMMUNICATION SYSTEM

TECHNICAL FIELD

The disclosure relates to a method of controlling power of a user equipment (UE) in a wireless communication system, and more particularly, to a method and apparatus for supporting uplink transmission power control.

BACKGROUND ART

In order to meet the increasing demand with respect to wireless data traffic after the commercialization of 4th generation (4G) communication systems, efforts have been made to develop improved 5th generation (5G) communication systems or pre-5G communication systems. For this reason, 5G communication systems or pre-5G communication systems are called beyond 4G network communication systems or post-long term evolution (LTE) systems.

In order to achieve high data rates, the implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple output (massive MIMO), full-dimensional MIMO (FD-MIMO), array antennas, analog beamforming, and large scale antennas are being studied.

Also, in order to improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and received-interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of Everything (IoE) technology, which is a combination of IoT technology and big data processing technology through connection with a cloud server, is also emerging. In order to implement the IoT, technology elements such as sensing technology, wired/wireless communication and network infrastructures, service interface technology, and security technology are required, and thus, technologies for inter-object connection, such as sensor network, machine to machine (M2M) communication, or machine-type communication (MTC), have recently been studied. In an IoT environment, intelligent Internet technology (IT) services that collect and analyze data generated by connected objects and create new value in human life may be provided. The IoT may be applied to fields such as smart homes, smart buildings, smart cities, smart cars or connected cars, smart grids, health care, smart home appliances, and advanced medical services through convergence and integration of existing information technology (IT) and various industries.

Accordingly, various attempts have been made to apply 5G communication systems to IoT networks. For example, 5G communication technologies such as sensor network, M2M communication, and MTC are implemented by using techniques such as beamforming, MIMO, and array antenna. The application of a cloud-RAN as big data processing technology may also be considered as an example of convergence of 5G technology and IoT technology.

As various services may be provided with the development of wireless communication systems as described above, there is a demand for a method of seamlessly providing the various services.

DESCRIPTION OF EMBODIMENTS

Technical Problem

An objective of the disclosure is to provide operating methods and apparatuses therefor of a user equipment (UE) and a base station to perform uplink transmission power control by using a transmission power control parameter transmitted through a downlink control channel.

Solution to Problem

An operating method of a first user equipment (UE) in a wireless communication system according to an embodiment of the disclosure includes receiving downlink control information (DCI) for sidelink communication from a base station, transmitting sidelink data to a second UE, based on the received DCI, receiving feedback information about the sidelink communication through a physical sidelink feedback channel (PSFCH) from the second UE, determining transmission power for transmitting the feedback information to the base station, and transmitting the feedback information through a physical uplink control channel (PUCCH) to the base station, based on the determined transmission power.

Advantageous Effects of Disclosure

According to the disclosure, there may be provided operating methods and apparatuses therefor of a user equipment (UE) and a base station to perform uplink transmission power control by using a transmission power control parameter transmitted through a downlink control channel.

BRIEF DESCRIPTION OF DRAWINGS

FIG. 20 is a diagram for describing a method by which a UE determines a physical uplink control channel (PUCCH) resource in a UL CA environment, according to an embodiment of the disclosure.

BEST MODE

Figure 1:
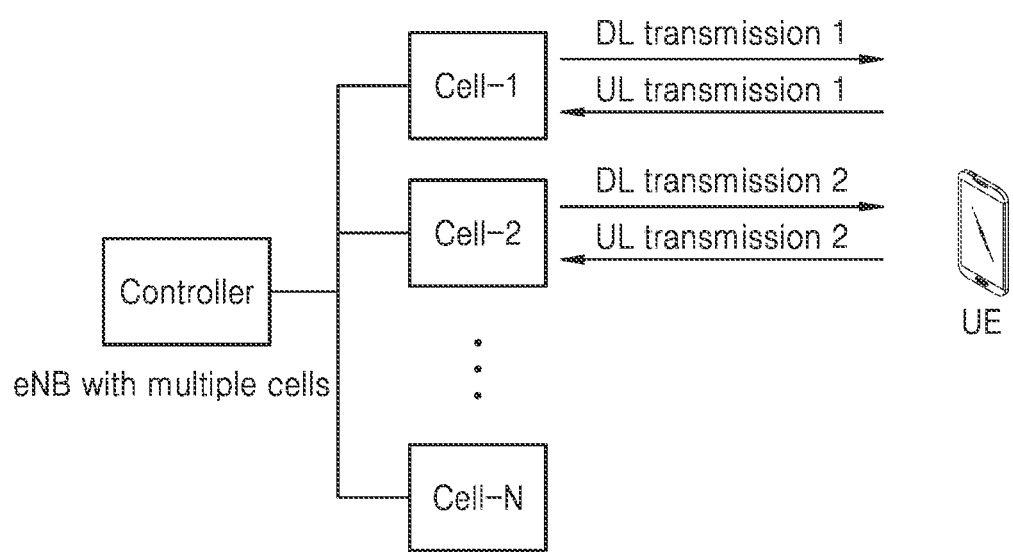
FIG. 1 is a diagram illustrating a carrier aggregation (CA) system, according to an embodiment of the disclosure.

An operating method of a first user equipment (UE) in a wireless communication system according to an embodiment of the disclosure may be provided. The operating method of the first UE includes receiving downlink control information (DCI) for sidelink communication from a base station, transmitting sidelink data to a second UE, based on the received DCI, receiving feedback information about the sidelink communication through a physical sidelink feedback channel (PSFCH) from the second UE, determining transmission power for transmitting the feedback information to the base station, and transmitting the feedback information through a physical uplink control channel (PUCCH) to the base station, based on the determined transmission power.

The determining of the transmission power for transmitting the feedback information to the base station may include identifying, based on the DCI, a transmission power control (TPC) command field for transmitting the feedback information through the PUCCH, when it is identified that the TPC command field is not included in the DCI, determining a TPC command value for transmitting the feedback information through the PUCCH, and determining the transmission power, based on the determined TPC command value.

The TPC command value may be determined to be 0 dBm, or to be a same value as a TPC command value for previous PUCCH transmission.

The determining of the TPC command value for transmitting the feedback information through the PUCCH may include identifying a TPC command value applied for another PUCCH transmission before the feedback information is transmitted through the PUCCH, and determining the TPC command value to be a same value as the identified TPC command value.

The TPC command value may be determined based on information received by a higher layer.

The operating method may further include determining the TPC command value based on a value indicated by at least one field included in the DCI.

The determining of the TPC command value for transmitting the feedback information through the PUCCH when it is identified that the TPC command field is not included in the DCI may include determining the TPC command value, based on a sidelink cast type for the sidelink communication performed by the first UE. The sidelink cast type may be determined based on a higher layer signal, a layer 1 signal, or a type of the feedback information about the sidelink communication received from the second UE.

The type of the feedback information about the sidelink communication may include a type of transmitting acknowledgement (ACK) or negative acknowledgement (NACK) or a type of transmitting NACK.

The operating method may further include determining a closed-loop index value based on a pre-set value, or information related to a PUCCH transmission resource indicated by a PUCCH resource indicator included in the DCI, and determining the TPC command value, based on the closed-loop index value.

A first user equipment (UE) operating in a wireless communication system according to an embodiment of the disclosure includes a transceiver and at least one processor. The at least one processor may be configured to receive downlink control information (DCI) for sidelink communication from a base station, transmit sidelink data to a second UE, based on the received DCI, receive feedback information about the sidelink communication from the second UE through a physical sidelink feedback channel (PSFCH), determine transmission power for transmitting the feedback information to the base station, and transmit the feedback information to the base station through a physical uplink control channel (PUCCH), based on the determined transmission power.

The at least one processor may be further configured to identify, based on the DCI, a transmission power control (TPC) command field for transmitting the feedback information through the PUCCH, determine a TPC command value for transmitting the feedback information through the PUCCH, when it is determined that the TPC command field is not included in the DCI, and determine the transmission power, based on the determined TPC command value.

The TPC command value may be determined to be 0 dBm, or to be a same value as a TPC command value for previous PUCCH transmission.

The at least one processor may be further configured to identify a TPC command value applied for another PUCCH transmission before the feedback information is transmitted through the PUCCH, and determine the TPC command value to be a same value as the identified TPC command value.

The TPC command value may be determined based on a value indicated by at least one field included in the DCI.

The at least one processor may be further configured to determine the TPC command value, based on a sidelink cast type for the sidelink communication performed by the first UE, wherein the sidelink cast type is determined based on a higher layer signal, a layer 1 signal, or a type of the feedback information about the sidelink communication received from the second UE.

MODE OF DISCLOSURE

Hereinafter, operational principles of the disclosure will be described in detail with reference to the accompanying drawings. While describing the disclosure, detailed descriptions of related well-known functions or configurations that may blur the points of the disclosure are omitted. The terms used herein are those defined in consideration of functions in the disclosure, but the terms may vary according to the intention of users or operators, precedents, etc. Hence, the terms used herein should be defined based on the meaning of the terms together with the descriptions throughout the specification.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus, generate means for implementing functions specified in the flowchart block(s). Because these computer program instructions may also be stored in a computer-executable or computer-readable memory that may direct the computer or other programmable data processing equipment to function in a particular manner, the instructions stored in the computer-executable or computer-readable memory may produce an article of manufacture including instruction means for performing the functions stored in the flowchart block(s). Because the computer program instructions may also be loaded into a computer or other programmable data processing equipment, a series of operational steps may be performed on the computer or other programmable data processing equipment to produce a computer implemented process, and thus, the instructions executed on the computer or other programmable data processing equipment may provide steps for implementing the functions specified in the flowchart block(s).

Also, each block may represent a module, segment, or portion of code, which includes one or more executable instructions for implementing specified logical function(s). It should also be noted that in some alternative implementations, the functions noted in the blocks may occur out of the order. For example, two blocks shown in succession may in fact be executed substantially concurrently or the blocks may sometimes be executed in the reverse order, according to the functionality involved.

The term " . . . unit" used in the present embodiment refers to a software or hardware component, such as a field-programmable gate array (FPGA) or an application-specific integrated circuit (ASIC), which performs certain tasks. However, the term " . . . unit" does not mean to be limited to software or hardware. A " . . . unit" may be configured to be in an addressable storage medium or may be configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and " . . . units" may be combined into fewer components and " . . . units" or may be further separated into additional components and " . . . units". Furthermore, components and " . . . units" may be implemented to operate one or more central processing units (CPUs) in a device or a secure multimedia card. Also, a " . . . unit" in an embodiment of the disclosure may include one or more processors.

In the disclosure, a downlink (DL) denotes a wireless transmission path of a signal transmitted by a base station (BS) to a user equipment (UE), and an uplink (UL) denotes a wireless transmission path of a signal transmitted by a UE to a BS. Hereinafter, although a long term evolution (LTE) or LTE-advanced (LTE-A) system is described as an example, an embodiment of the disclosure may be applied to other communication systems having a similar technical background or channel structure. For example, other communication systems to which an embodiment of the disclosure may be applied may include 5G mobile communication technology (5th generation (5G), new radio (NR), etc.) developed after LTE-A, and 5G below may be a concept including existing LTE, LTE-A, and other similar services. Also, the disclosure may be applied to other communication systems through some modifications without departing from the scope of the disclosure at the discretion of one of ordinary skill in the art.

Hereinafter, terms for identifying access nodes, terms indicating network entities, terms indicating messages, terms indicating interfaces between network entities, and terms indicating various identification information used herein are exemplified for convenience of explanation. Accordingly, the disclosure is not limited to terms described below, and other terms denoting objects having the same technical meanings may be used.

Hereinafter, some terms and names defined in the $3^{rd}$ generation partnership project long term evolution (3GPP LTE) standards may be used for convenience of explanation. However, the disclosure is not limited to the terms and names, and may be equally applied to systems that conform to other standards.

In the following descriptions of the disclosure, well-known functions or configurations are not described in detail when it is deemed that they may unnecessarily obscure the essence of the disclosure. Hereinafter, an embodiment of the disclosure will be described with reference to the accompanying drawings.

According to an embodiment of the disclosure, a carrier aggregation (CA) technology capable of increasing a data rate by grouping at least two frequency bands is well known. A UE in a system that supports CA may transmit or receive DL/UL data and control information via two or more carrier frequencies configuring a DL or a UL. A plurality of pieces of information may be included in a physical uplink shared channel (PUSCH), a physical uplink control channel (PUCCH), or a sounding reference signal (SRS) and transmitted via the UL.

According to an embodiment of the disclosure, when the UE performs transmission via the UL (transmission via the PUSCH, the PUCCH, or the SRS), the UE may perform transmission power control to decrease interference to an adjacent cell and to increase reception reliability of information to be transmitted via the UL. For UL transmission power control, the UE may configure a transmission power value by using parameters received from a BS and a DL path attenuation value measured by the UE. In this case, some parameters from among the parameters received from the BS may be received by the UE via radio resource control (RRC) signaling, and some parameters may be received by the UE via downlink control information (DCI) of a DL control channel. Also, a transmission power control parameter received by the UE via the DCI of the DL control channel may be transmitted from the BS by using UE-specific DCI transmitted only to a specific UE or may be transmitted from the BS by using group-common DCI transmitted only to UEs of a specific group.

According to an embodiment of the disclosure, in a CA environment, the UE may receive one or more DCIs from one or more cells. For example, in a CA environment of three cells, the UE may receive three DCIs from three cells. In this case, the three DCIs may be configured as one of UE-specific DCI and group-common DCI (e.g., the three DCIs may be configured as three UE-specific DCIs or three group-common DCIs), or may be configured as a combination of UE-specific DCI and group-common DCIs (e.g., the three DCIs may be configured as a combination of one UE-specific DCI and two group-common DCIs).

According to an embodiment of the disclosure, a UL transmission power control method using a parameter received via DCI may include an accumulation method and a method of using an absolute value. The accumulation method may be a method of accumulating and using a transmission power control parameter value received by a UE via DCI. The method of using an absolute value may be a method by which the UE uses the transmission power control parameter value received via DCI, without accumulation. The BS according to an embodiment of the disclosure may configure, via RRC signaling, which method from among the two transmission power control methods is to be used.

According to an embodiment of the disclosure, when the accumulation method is to be used, the UE may determine which DCI from among two or more DCIs received by the UE is to be used in performing accumulation.

FIG. 1 is a diagram illustrating a CA system, according to an embodiment of the disclosure.

FIG. 1 illustrates an example where the number of UL carrier frequencies is equal to the number of DL carrier frequencies, but the disclosure is not limited thereto. That is, the number of UL carrier frequencies may be a subset of the number of DL carrier frequencies. For example, when it is assumed that the number of DL carrier frequencies is N and the number of UL carrier frequencies is M, N≥M. In this case, a carrier used in CA may be referred to as a cell.

According to an embodiment of the disclosure, a UE may transmit/receive data and control information via a DL/UL from some cells (i.e., e.g., from two cells) of a BS including N cells. In this case, Cell-1 and Cell-2 may transmit, to the UE, DL control information for DL data transmission. Also, Cell-1 and Cell-2 may transmit, to the UE, UL control information for UL data transmission.

Transmission power control with respect to a PUCCH in a legacy wireless communication system is as in Equation 1.

$$P_{PUCCH}(i) = \min\left\{ \begin{array}{l} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{array} \right\} [dBm] \quad \text{Equation 1}$$

In Equation 1, $P_{PUCCH}(i)$ indicates transmission power of a PUCCH in an $i^{th}$ subframe of the UE, and each of parameters in Equation 1 is as below.

$P_{O\_PUCCH}$: A parameter that includes $P_{O\_NOMINAL\_PUCCH} + P_{O\_UE\_PUCCH}$, and is a value configured for the UE by the BS via RRC signaling. In particular, $P_{O\_NOMINAL\_PUCCH}$ is a cell-specific value including 8-bit information and having a range of (−126, 24) dB. Also, $P_{O\_UE\_PUCCH}$ is a UE-specific value including 4-bit information and having a range of (−8, 7) dB. The cell-specific value is transmitted from the BS to the UE via a system information block (SIB), and the UE-specific value is transmitted from the BS to the UE via dedicated RRC signaling.

$PL_c$: A path loss value calculated by the UE. The UE calculates the path loss value from reception power of a cell-specific reference signal (CRS) of a DL channel transmitted by the BS. In more detail, the BS transmits referenceSignalPower and a filtering coefficient to the UE via UE-specific or cell-specific RRC signaling, and based on this, the UE calculates the path loss value as below.

PL$_c$=referenceSignalPower−higher layer filtered RSRP $\Delta_{F\_PUCCH}$( ): A value that is transmitted to the UE via higher layer signaling (cell-specific signaling or UE-specific RRC signaling), that varies according to a format of a PUCCH, and that has a relative value with respect to PUCCH Format 1a (1-bit HARQ-ACK/NACK transmission). The value of $\Delta_{F\_PUCCH}$(F) is configured as in Table 1.

TABLE 1

$\Delta_{F\_PUCCH}$(F) Values

| PUCCH Format | Parameters, $\Delta_{F\_PUCCH}$(F) | Values [dB] |
|---|---|---|
| 1 | deltaF-PUCCH-Format1 | [−2, 0, 2] |
| 1b | deltaF-PUCCH-Format1b | [1, 3, 5] |
| 2 | deltaF-PUCCH-Format2 | [−2, 0, 1, 2] |
| 2a | deltaF-PUCCH-Format2a | [−2, 0, 2] |
| 2b | deltaF-PUCCH-Format2b | [2, 0, 2] |

$\Delta_{TxD}$(F') is a value that is transmitted to the UE via higher layer signaling (cell-specific signaling or UE-specific RRC signaling) when a PUCCH is transmitted via 2-antenna ports (i.e., a space frequency block code (SFBC)), and that varies according to a format of the PUCCH. When the SFBC is not used, $\Delta_{TxD}$(F')=0. The value of $\Delta_{TxD}$(F') is configured as in Table 2.

TABLE 2

$\Delta_{TxD}$(F') Values

| PUCCH Format | Parameters, $\Delta_{F\_PUCCH}$(F) | Values [dB] |
|---|---|---|
| 1 | deltaTxD-OffsetPUCCH-Format1 | [0, −2] |
| 1a/1b | deltaTxD-OffsetPUCCH-Format1a1b | [0, −2] |
| 2/2a/2b | deltaTxD-OffsetPUCCH-Format22a2b | [0, −2] |
| 3 | deltaTxD-OffsetPUCCH-Format3 | [0, −2] | h($n_{CQI}$,$n_{HARQ}$,$n_{SR}$): Different values may be used according to a format of a PUCCH. In this case, $n_{CQI}$ may indicate the number of bits used in feedback of channel quality information (CQI). $n_{HARQ}$ may indicate the number of bits used in hybrid automatic repeat request (HARQ)-ACK/NACK feedback. Also, $n_{SR}$ is 0 or 1 that is a bit used in feedback of a scheduling request. h($n_{CQI}$,$n_{HARQ}$,$n_{SR}$) may have different values according to a format of the PUCCH.

g(i) is a parameter for performing closed-loop power control. The BS may correct PUCCH transmission power to be UE-specific. Unlike PUSCH transmission power control, in PUCCH transmission power control, only accumulation-based transmission power control is performed, and g(i) is given as in Equation 2.

$$g(i) = g(i-1) + \sum_{m=0}^{M-1} \delta_{PUCCH}(i - k_m) \quad \text{Equation 2}$$

That is, g(i) in an $i^{th}$ subframe may be calculated by accumulating a value of $\delta_{PUCCH}$, which has been transmitted in DCI to the UE via a physical downlink control channel (PDCCH) in an i−$k_m^{th}$ subframe, to a value of g(i−1) used in a previous subframe (i.e., i−$1^{st}$ subframe). The value of $\delta_{PUCCH}$ may vary according to a DCI format. For DCI formats 1A/1B/1D/1/2A/2B/2C/2/3, same values as accumulated $\delta_{PUSCH}$ of Table 3 may be used. In the case of DCI format 3A, the value of $\delta_{PUCCH}$ may be equal to a value of $\delta_{PUSCH}$ used in Table 4.

TABLE 3

Mapping of TPC Command Field in DCI format 0/3/4 to accumulated $\delta_{PUSCH}$ values.

| TPC Command Field in DCI format 0/3/4 | Accumulated $\delta_{PUSCH}$ [dB] |
|---|---|
| 0 | −1 |
| 1 | 0 |
| 2 | 1 |
| 3 | 3 |

TABLE 4

Mapping of TPC Command Field in DCI format 3A to accumulated $\delta_{PUSCH}$ values.

| TPC Command Field in DCI format 3A | Accumulated $\delta_{PUSCH}$ [dB] |
|---|---|
| 0 | −1 |
| 1 | 1 |

In Equation 2, a value of M and a value of $k_0$ may be differently used in a frequency division duplex (FDD) system and a time division duplex (TDD) system. In more detail, in the FDD system, M=1 and $K_0$=4, and in the TDD system, M and $k_0$ may have different values as in Table 5 according to DL/UL configuration.

TABLE 5

Table 5: {$k_0$, $k_1$, . . . , $k_{M−1}$} for TDD

| TDD DL/UL Config- uration | Subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 8, 9, 7, 5, 4, 11, 6 | — | — | — | — | — | — | — |
| 6 | — | — | 7 | 7 | 5 | — | — | 7 | 7 | — |

Figure 2:
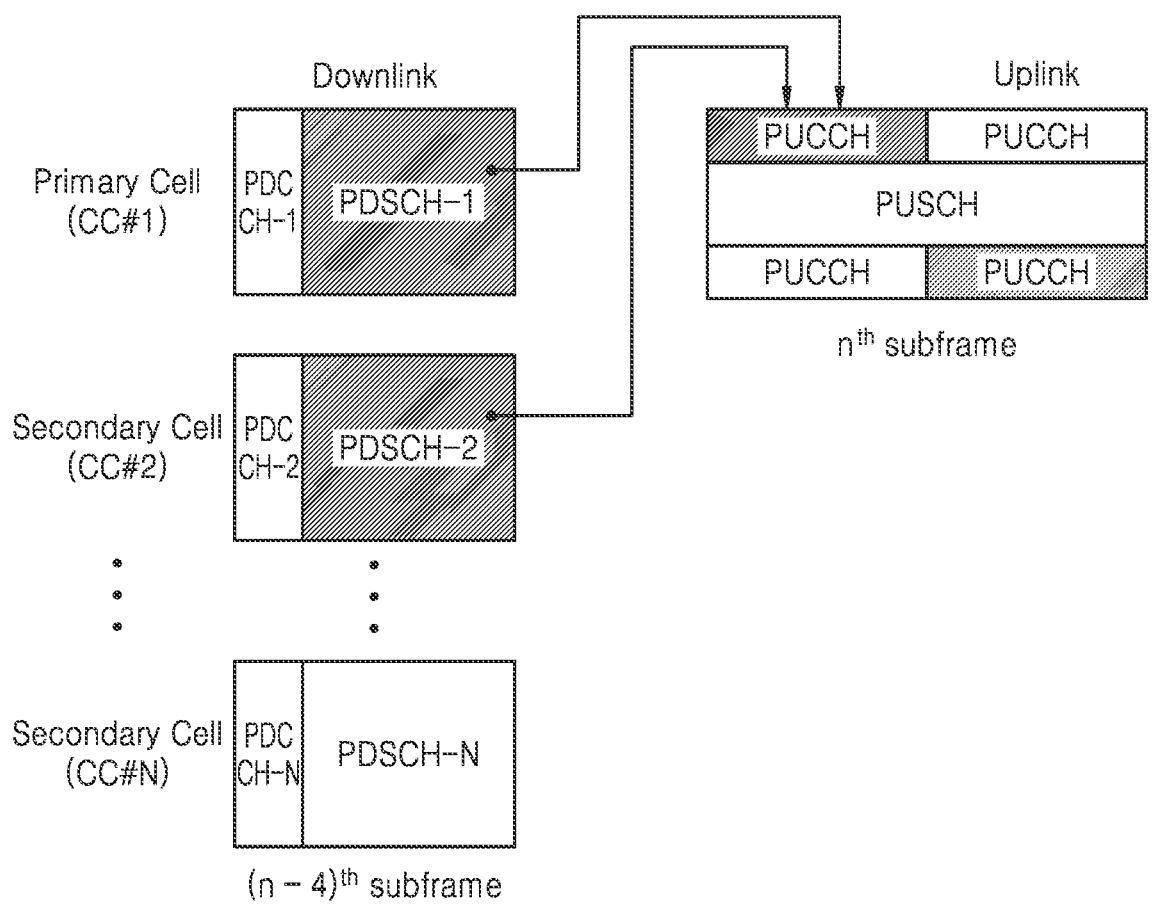
FIG. 2 is a diagram for describing an example of transmission of downlink (DL) data and DL control information and transmission of uplink (UL) control information in a CA system, according to an embodiment of the disclosure.

FIG. 2 is a diagram for describing an example of transmission of DL data and DL control information and transmission of UL control information in a CA system, according to an embodiment of the disclosure.

According to an embodiment of the disclosure, component carrier #1 (CC #1) may be referred to as a primary cell (PCell).

CC #2 to CC #N may be referred to as secondary cells (SCells). In this case, CC #1 may transmit, to a UE, DL data and control information that are respectively PDCCH-1 and PDSCH-1.

CC #2 may also transmit, to the UE, DL data and control information that are respectively PDCCH-2 and PDSCH-2.

PDCCH-1 transmitted from PCell (CC #1) to the UE may include resource allocation information of PDSCH-1 transmitted from PCell to the UE, and a 2-bit $\delta_{PUCCH}$ value of Table 3 which is a transmission power control parameter value of a PUCCH transmitted on PCell. PDCCH-2 transmitted from SCell (CC #2) to the UE may include resource allocation information of PDSCH-2 transmitted from CC #2 to the UE, and resource allocation information of a PUCCH transmitted on PCell. In this case, the resource allocation information of the PUCCH may reuse a transmission power control (TPC) command field.

That is, PUCCHs transmitted from Scell do not have a particular field for separate PUCCH resource allocation information. In this case, the UE may reinterpret, as PUCCH resource allocation information, a 2-bit TPC command field indicating a $\delta_{PUCCH}$ value by the BS.

Although not shown in FIG. 2, an embodiment of the disclosure may be applied even when three cells transmit a PDCCH. Accordingly, embodiments of the disclosure may be applied, regardless of the number of cells. When CC #2 and CC #3 respectively transmit PDCCH-2 and PDSCH-2, and PDCCH-3 and PDSCH-3, TPC command fields of PDCCH-2 and PDCCH-3 may include resource allocation information of a PUCCH transmitted on PCell. The TPC command fields of PDCCH-2 and PDCCH-3 may have the same value, and the UE may reinterpret all of the TPC command fields of PDCCH-2 and PDCCH-3 as the resource allocation information of the PUCCH transmitted via PCell.

Figure 3:
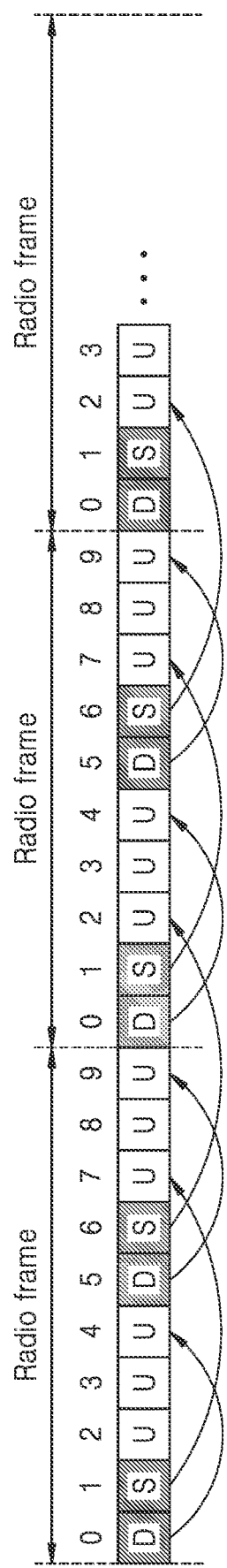
FIG. 3 is a diagram for describing a timing at which a user equipment (UE) applies a UL transmission power control parameter obtained via downlink control information (DCI) in a system, according to an embodiment of the disclosure.

FIG. 3 is a diagram for describing a timing at which a UE applies a UL transmission power control parameter obtained via DCI, according to an embodiment of the disclosure.

In an FDD system, HARQ ACK/NACK information about a physical downlink shared channel (PDSCH) received in an n–4$^{th}$ subframe via a DL is transmitted via a PUCCH of an n$^{th}$ subframe. Accordingly, a value of $\delta_{PUCCH}$ a UE obtains from a TPC command field of UE-specific DCI (or a value of $\delta_{PUCCH}$ the UE obtains from group-common DCI) received in the n–4th subframe is used in transmission of the PUCCH of the n$^{th}$ subframe.

In a TDD system, rules as in Table 5 may be applied. In more detail, in a system following TDD DL/UL configuration #0, configuration of a DL and a UL may be as in an example of FIG. 3. In this case, D may indicate a DL subframe (DL), U indicates a UL subframe (UL), and S may indicate s special subframe where a DL, a UL, and a gap coexist.

Referring to Table 5, a value of $\delta_{PUCCH}$ (the value of $\delta_{PUCCH}$ the UE obtains from the TPC command field of UE-specific DCI or the value of $\delta_{PUCCH}$ the UE obtains from group-common DCI) to be applied to subframe-2 corresponds to a value of $\delta_{PUCCH}$ transmitted in a previous sixth subframe before subframe-2. That is, the value of $\delta_{PUCCH}$ to be applied to subframe-2 may correspond to the value of $\delta_{PUCCH}$ transmitted in subframe no. 6.

A value of $\delta_{PUCCH}$ to be applied to subframe-4 may correspond to a value of $\delta_{PUCCH}$ transmitted in a previous fourth subframe before subframe-4. That is, the value of $\delta_{PUCCH}$ to be applied to subframe-4 may correspond to the value of $\delta_{PUCCH}$ transmitted in subframe no. 0.

A value of $\delta_{PUCCH}$ to be applied to subframe-7 may correspond to a value of $\delta_{PUCCH}$ transmitted in a previous sixth subframe before subframe-7. That is, the value of $\delta_{PUCCH}$ to be applied to subframe-7 may correspond to the value of $\delta_{PUCCH}$ transmitted in subframe no. 1.

Lastly, a value of $\delta_{PUCCH}$ to be applied to subframe-9 may correspond to a value of $\delta_{PUCCH}$ transmitted in a previous fourth subframe before subframe-9. That is, the value of $\delta_{PUCCH}$ to be applied to subframe-9 may correspond to the value of $\delta_{PUCCH}$ transmitted in subframe no. 5.

Figure 4:
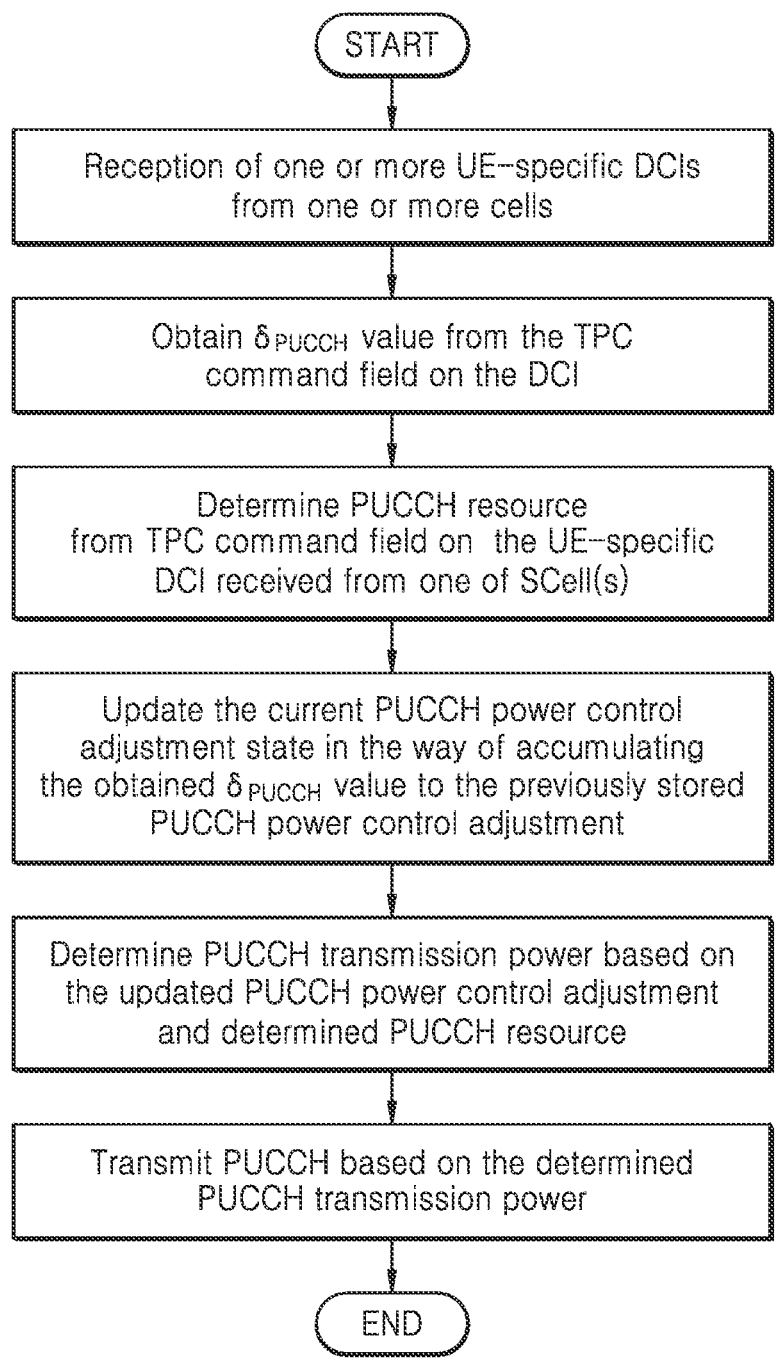
FIG. 4 is a diagram for describing an example where a UL transmission power control parameter a UE obtains via DCI is applied in a system, according to an embodiment of the disclosure.

FIG. 4 is a diagram for describing an example where a UL transmission power control parameter a UE obtains via DCI is applied, according to an embodiment of the disclosure.

A UE may receive one or more UE-specific DCIs or group-common DCIs from one or more cells. In this case, UE-specific DCI indicates a DCI format with a cyclic redundancy check (CRC) of DCI scrambled by cell radio network temporary identifier (C-RNTI) or semi-persistent scheduling (SPS)-RNTI, and more particularly, may indicate DCI format 1, 1A, 2, 2A, 2B, or 2C or DCI format 0_0, 0_1, 1_0, or 1_1.

Group-common DCI indicates a DCI format with a CRC of DCI scrambled by TPC-PUCCH-RNTI (or TPC-PUSCH-RNTI or TPC-SRS-RNTI), and more particularly, may indicate DCI format 3 or 3A or DCI format 2_2 or 2_3.

The UE may receive, in a particular subframe (e.g., an n$^{th}$ subframe), one or more DCIs, e.g., two or more UE-specific DCIs, two or more group-common DCIs, or two or more UE-specific DCIs and group-common DCIs, from one or more cells. Upon reception of the DCIs, the UE may determine whether there is DCI received from PCell, and when there is the DCI received from the PCell, the UE may obtain a value of $\delta_{PUCCH}$ from the DCI. That is, the UE may obtain the value of $\delta_{PUCCH}$ from a TPC command field of UE-specific DCI or group-common DCI.

The UE may obtain resource information of a PUCCH to be transmitted on the PCell, from a TPC command field of UE-specific DCI received from S Cell.

When the UE receives two or more UE-specific DCIs from two or more SCells, the UE may not expect different UE-specific DCIs to indicate two or more pieces of different PUCCH resource information. That is, a BS may transmit the same PUCCH resource information via different UE-specific DCIs.

After the UE respectively obtains the value of $\delta_{PUCCH}$ and the resource information of the PUCCH for PUCCH transmission from DCIs of the PCell and the SCell, the UE may configure a transmission power value of the PUCCH to be transmitted on the PCell. In more detail, the UE may update a value of g(i) by using Equation 2, and may configure a value of $P_{PUCCH}(i)$ by using Equation 1. The UE may transmit the PUCCH in an i$^{th}$ subframe by using the configured $P_{PUCCH}(i)$.

Figure 5:
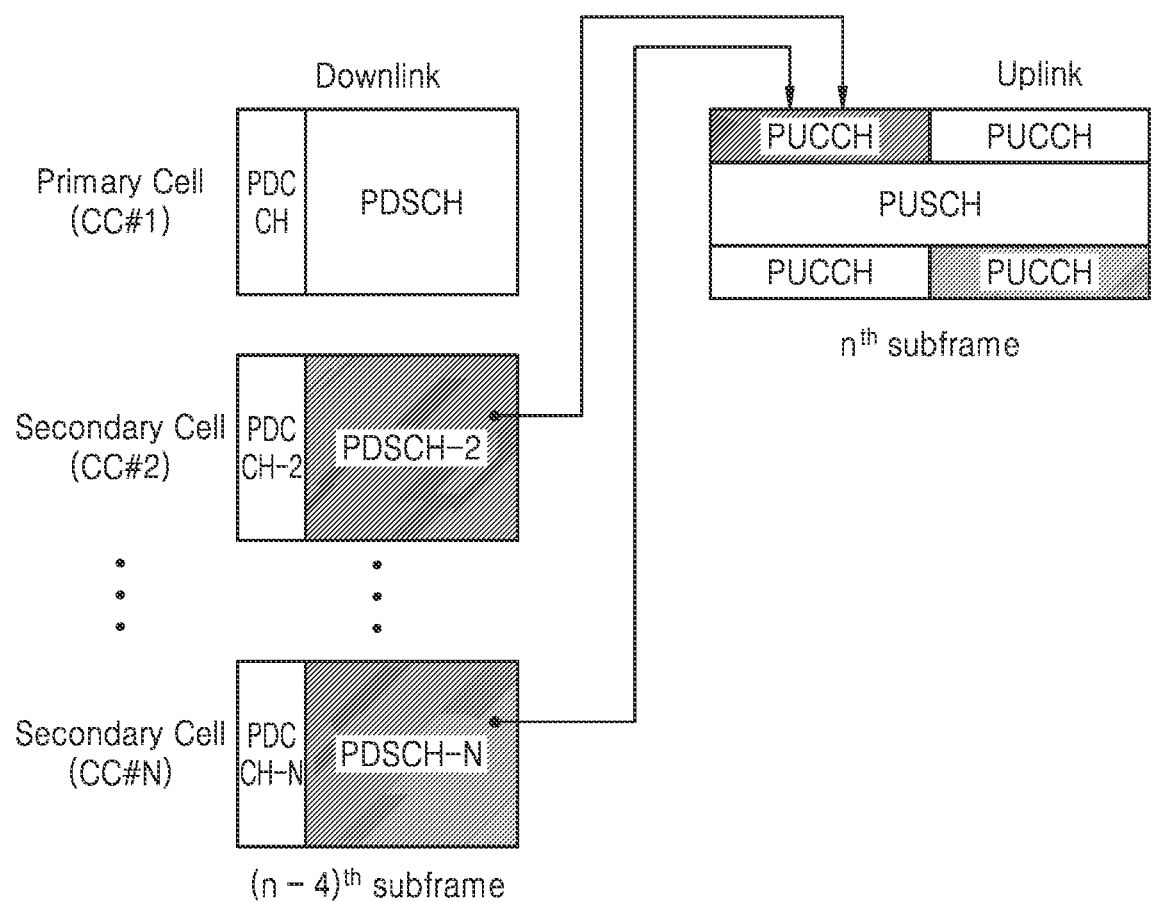
FIG. 5 is a diagram for describing another example of transmission of DL data and DL control information and transmission of UL control information in a CA system, according to an embodiment of the disclosure.

FIG. 5 is a diagram for describing another example of transmission of DL data and DL control information and transmission of UL control information in a CA system, according to an embodiment of the disclosure.

Unlike FIG. 2, in FIG. 5, CC #1 may not transmit DL data and control information to a UE, and CC #2 and CC #N may respectively transmit PDCCH-2 and PDSCH-2, and PDCCH-N and PDSCH-N to the UE.

According to descriptions of FIGS. 2 to 4, the UE may obtain information about a value of $\delta_{PUCCH}$ via a 2-bit TPC command field of PDCCH-1 transmitted from PCell (CC #1), and may obtain resource allocation information of a PUCCH to be transmitted on the PCell, via a 2-bit TPC command field of PDCCHs transmitted from SCells. In this case, when two or more SCells transmit PDCCHs, 2-bit TPC command fields of the PDCCHs of the respective SCells may have the same value.

Referring to FIG. 5, because there are not PDCCH-1 and PDSCH-1 transmitted from the PCell, the UE may not be able to obtain, from DCI of PDCCH-1, a value of $\delta_{PUCCH}$ the UE may reference to transmit the PUCCH.

Figure 6:
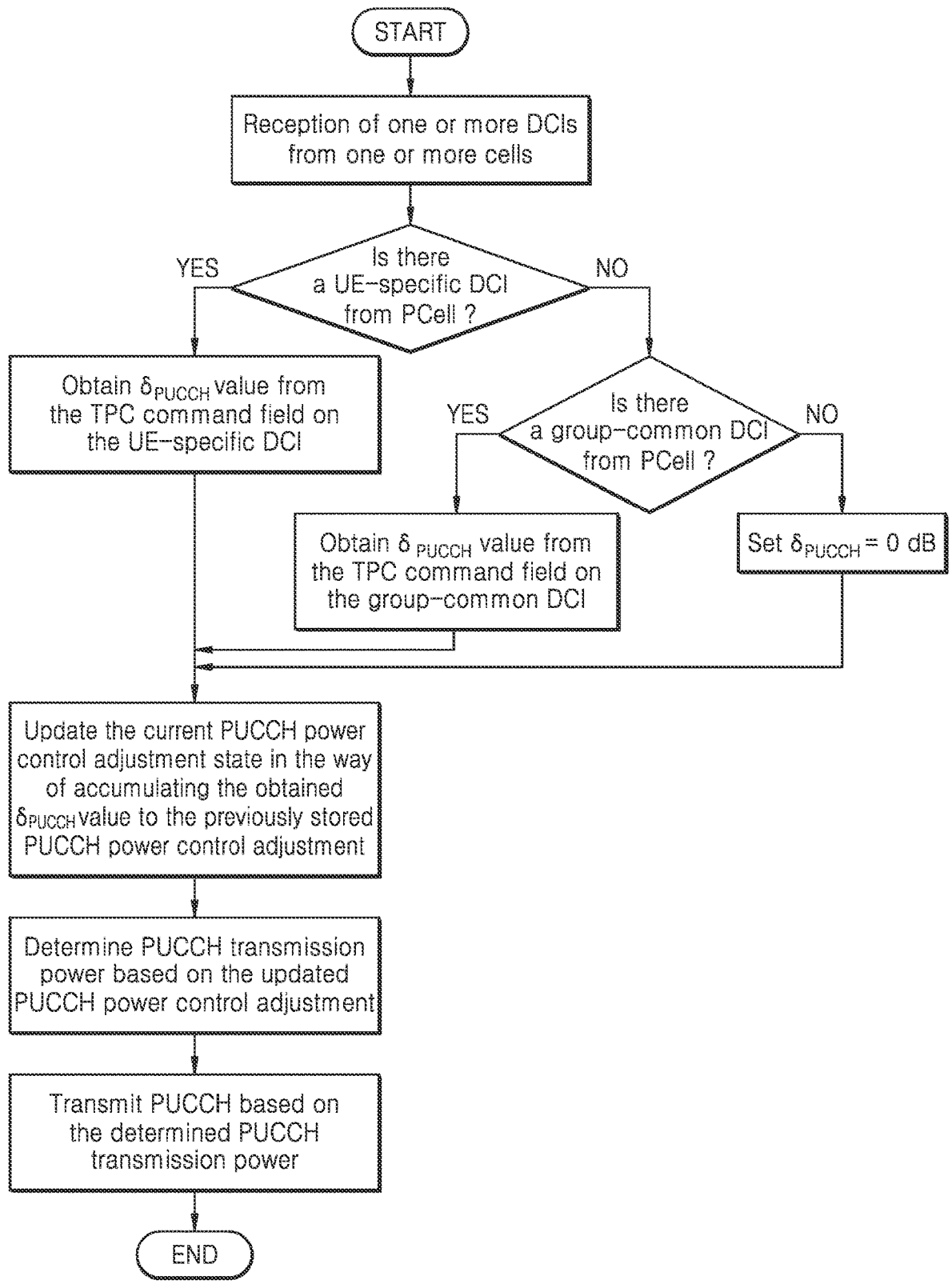
FIG. 6 is a diagram for describing operations of a UE in a case where a scenario of FIG. 5 occurs.

FIG. 6 is a diagram for describing an example of operations of a UE according to FIG. 5, according to an embodiment of the disclosure.

A UE according to an embodiment of the disclosure may receive, in a $(n-k)^{th}$ subframe, one or more DCIs from one or more cells.

Then, the UE may transmit a PUCCH on PCell, in an $n^{th}$ subframe. In this case, a value of k is fixed to 4 in the case of an FDD system, and in the case of the TDD system, a value of k follows Table 2 according to configuration of a DL and a UL (i.e., according to TDD DL/UL configuration).

In FIG. 6, the UE may determine whether UE-specific DCI received in the $(n-k)^{th}$ subframe from the PCell exists.

When the UE-specific DCI received from the PCell exists, the UE may obtain a value of $\delta_{PUCCH}$ from the UE-specific DCI.

When the UE-specific DCI received from the PCell does not exist, the UE may determine whether group-common DCI received from the PCell exists.

When group-common DCI received from the PCell exists in the $(n-k)^{th}$ subframe, the UE may obtain the value of $\delta_{PUCCH}$ from the group-common DCI.

When the group-common DCI received from the PCell does not exist in the $(n-k)^{th}$ subframe, the UE may configure the value of $\delta_{PUCCH}$ as 0 dB. The UE may obtain resource information of a PUCCH to be transmitted on the PCell, from a TPC command field of UE-specific DCI received from SCell.

When the UE receives two or more UE-specific DCIs from two or more SCells, the UE may not expect different UE-specific DCIs to indicate two or more pieces of different PUCCH resource information. That is, a BS may transmit the same PUCCH resource information via different UE-specific DCIs.

After the UE respectively obtains the value of $\delta_{PUCCH}$ and the resource information of the PUCCH for PUCCH transmission from DCIs of the PCell and the SCell, the UE may configure a transmission power value of the PUCCH to be transmitted on the PCell. In more detail, the UE may update a value of g(i) (where i=n) by using Equation 2, and may configure a value of $P_{PUCCH}(n)$ by using Equation 1. The UE may transmit the PUCCH in the $n^{th}$ subframe by using the configured $P_{PUCCH}(n)$.

As described with reference to FIGS. 2 to 6, according to whether a 2-bit TPC command field is transmitted from DCI of PCell or DCI of SCell, UE interpretation of a TPC command field may vary. That is, the UE may obtain a value of $\delta_{PUCCH}$ from a TPC command field of the DCI transmitted from the PCell, and may obtain resource information of a PUCCH from a TPC command field of DCIs transmitted from SCells. Because such an operation does not require an additional bit for indicating resource allocation information of the PUCCH, an overhead of the number of DCI bits may be reduced.

In a communication system according to an embodiment of the disclosure, the number of DCI bits may need to increase. Accordingly, in a communication system according to an embodiment of the disclosure, a DCI bit for indicating, to the UE, a value of $\delta_{PUCCH}$ for transmission power control of the PUCCH, and a DCI bit for indicating, to the UE, the resource allocation information of the PUCCH may separately exist. In this situation, the UE may receive two or more DCIs from two or more cells, and it is required to define operations the UE should perform at that time. For example, it is required to define whether the UE conforms to a TPC command field of UE-specific DCI of the PCell or conforms to all of two or more TPC command fields transmitted from the PCell and SCell.

Figure 7:
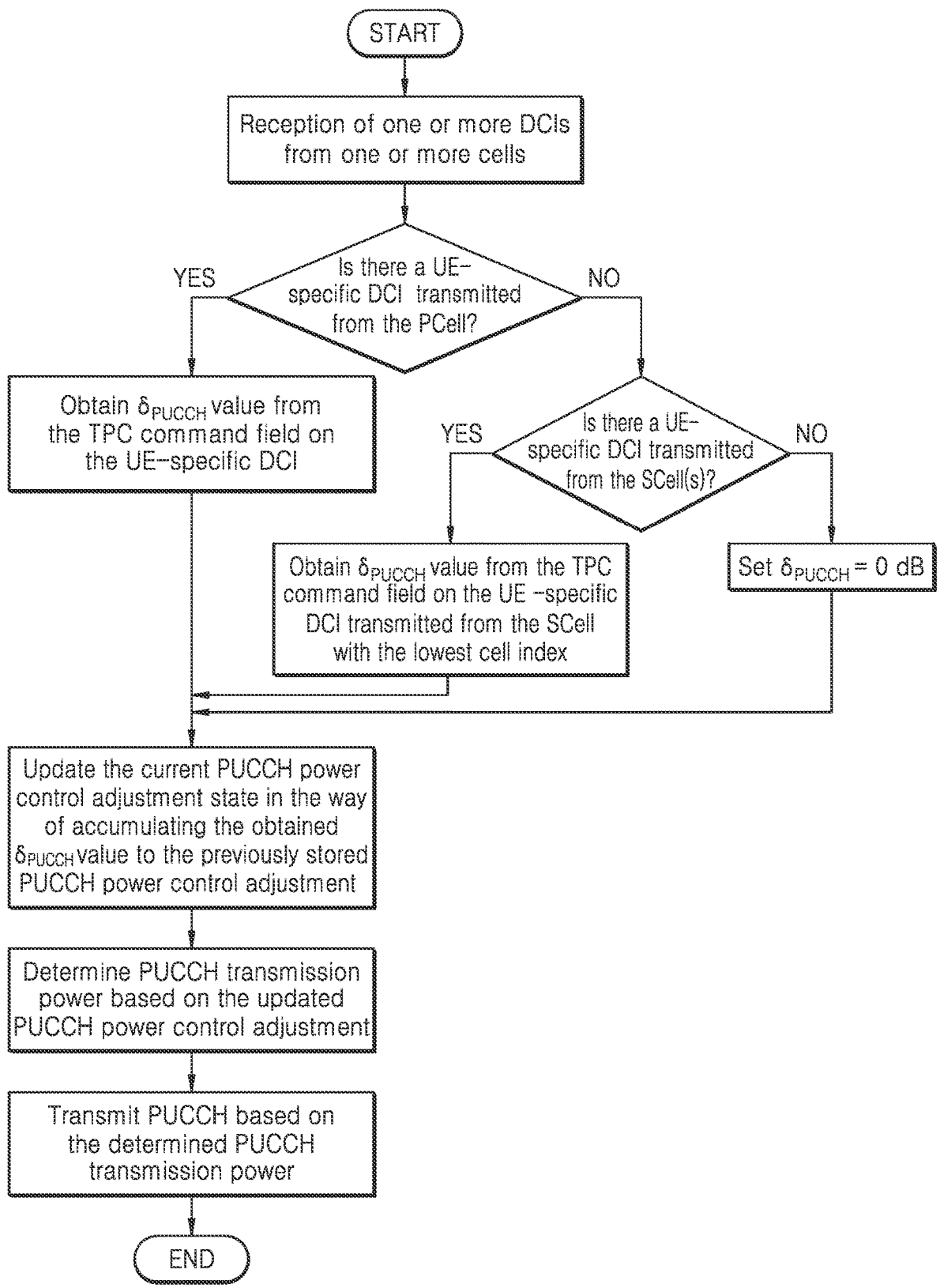
FIG. 7 is a diagram of an example of transmission of DL data and DL control information and transmission of UL control information in a system to which CA is applied, according to an embodiment of the disclosure.

FIG. 7 is a diagram for describing transmission of DL data and DL control information and transmission of UL control information in a system to which CA is applied, according to an embodiment of the disclosure.

A UE may receive, in a $(n-k)^{th}$ subframe, one or more DCIs from one or more cells. Then, the UE may transmit a PUCCH on PCell, in an $n^{th}$ subframe.

In a communication system according to an embodiment of the disclosure, in order to support a service having various latencies, a BS may flexibly configure a value of k. In this case, k may indicate a time difference between a time when DCI is received and a time when a PUCCH is transmitted.

In more detail, a value of k in an FDD system may be 4, and a value of k in a TDD system may correspond to values defined in Table 2, according to configuration of a DL and a UL. That is, a fixed value of k may be used.

According to an embodiment of the disclosure, a ratio and a pattern of a DL and a UL configuring a frame or a slot may vary and may be dynamically changed. Accordingly, the BS may configure or indicate a value of k for the UE.

For example, the BS may indicate, via RRC signaling, the UE of k value candidates including two or more values of k, and may indicate, for the UE, one value of k from the k value candidates via DCI. In this case, the BS may configure a value of k, by sufficiently considering a processing time capability of the UE. In more detail, the BS may obtain information about a processing time capability of each UE, in a procedure of negotiating a capability with each UE. For example, UE-A may provide a fast processing time, and thus, may use a small value of k, but UE-B may not provide a fast processing time, and thus, may should use a large value of k.

According to an embodiment of the disclosure, the UE may determine, by using the value of k, whether UE-specific DCI received in the $(n-k)^{th}$ subframe from the PCell exists.

When the UE-specific DCI received from the PCell exists, the UE may obtain a value of $\delta_{PUCCH}$ from a TPC command field of the DCI.

When the UE-specific DCI received from the PCell does not exist, the UE may determine whether UE-specific DCI received from SCell exists.

When the UE-specific DCI received from the SCell exists, the UE may obtain a value of $\delta_{PUCCH}$ from a TPC command field of the DCI.

When the UE receives two or more UE-specific DCIs from two or more SCells, the UE may obtain a value of $\delta_{PUCCH}$ from a TPC command field of UE-specific DCI received from SCell having a lowest cell index.

When there are not UE-specific DCIs received from PCell and SCell, the UE may configure the value of $\delta_{PUCCH}$ as 0 dB.

The UE may update a value of g(i) (where i=n) by using Equation 2, based on the value $\delta_{PUCCH}$ obtained through UE-specific DCI of PCell or S Cell (when UE-specific DCI received from PCell or SCell exists), or the value of $\delta_{PUCCH}$ configured as 0 dB (when UE-specific DCI received from the PCell or the SCell does not exist).

The BS may transmit resource information of the PUCCH via the UE-specific DCI of the PCell and the one or more SCells. In this case, the BS may configure the resource information of the PUCCH, which is transmitted via UE-specific DCI, to be the same in all cells and may transmit the source information of the PUCCH to the UE.

Accordingly, the UE may obtain the resource information of the PUCCH via UE-specific DCI transmitted from one cell from among the PCell or the SCells. The UE may configure a transmission power value of the PUCCH to be transmitted on PCell, by using the updated value of g(i) and the obtained resource information of the PUCCH. Then, the UE may transmit the PUCCH in the $n^{th}$ subframe, by using the configured transmission power value of the PUCCH.

Figure 8:
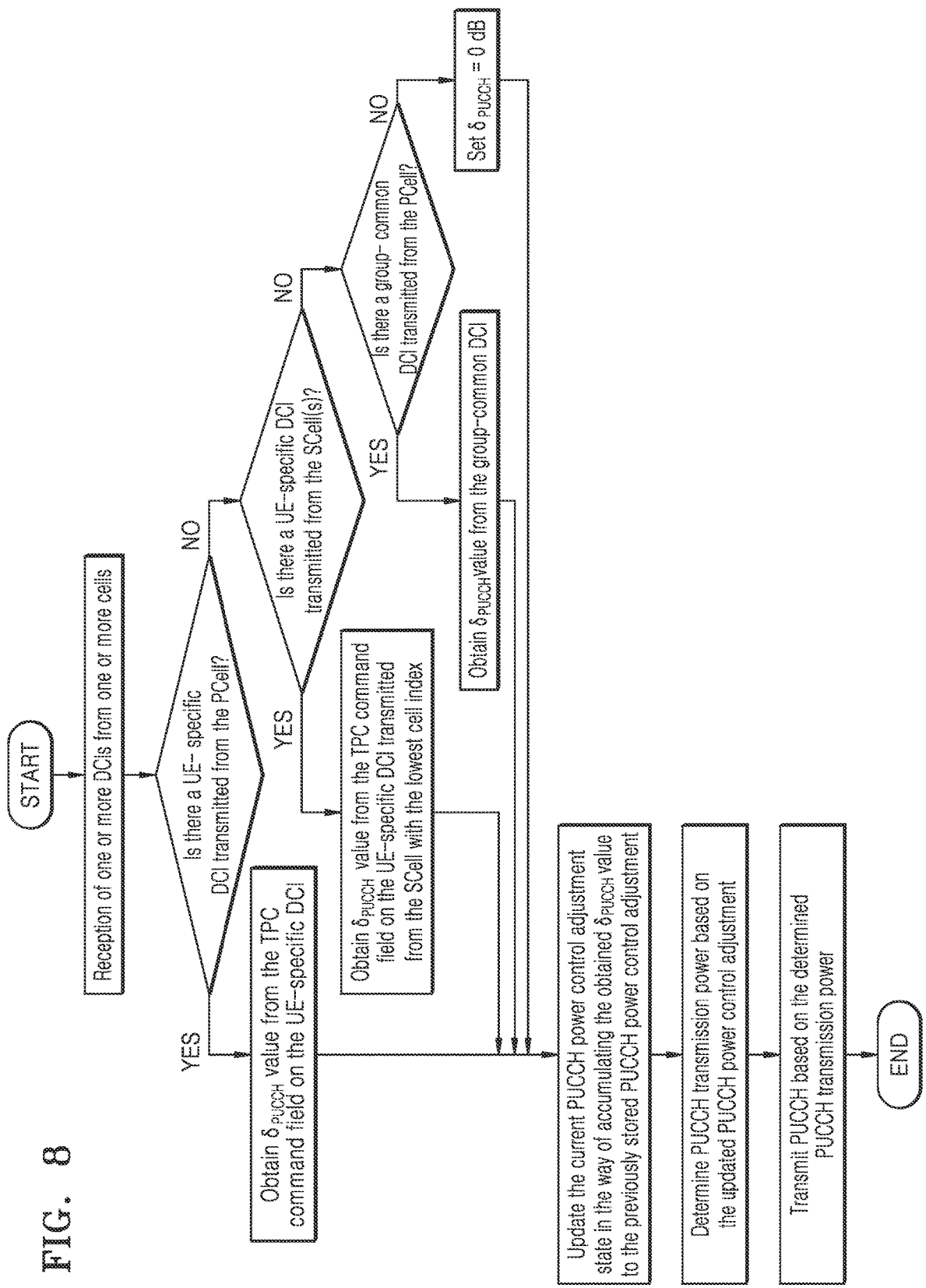
FIG. 8 is a diagram of another example of transmission of DL data and DL control information and transmission of UL control information in a system to which CA is applied, according to an embodiment of the disclosure.

FIG. 8 is a diagram for describing transmission of DL data and DL control information and transmission of UL control information in a system to which CA is applied, according to an embodiment of the disclosure.

A UE according to an embodiment of the disclosure may receive, in a $(n-k)^{th}$ subframe, one or more DCIs from one or more cells. Then, the UE may transmit a PUCCH on PCell, in an $n^{th}$ subframe.

As described with reference to FIG. 7, the UE may determine, by using a value of k, whether UE-specific DCI received in the $(n-k)^{th}$ subframe from the PCell exists.

When the UE-specific DCI received from the PCell exists, the UE may obtain a value of $\delta_{PUCCH}$ from a TPC command field of the DCI.

When the UE-specific DCI received from the PCell does not exist, the UE may determine whether UE-specific DCI received from SCell exists.

When the UE-specific DCI received from the SCell exists, the UE may obtain a value of $\delta_{PUCCH}$ from a TPC command field of the DCI.

When the UE receives two or more UE-specific DCIs from two or more SCells, the UE may obtain a value of $\delta_{PUCCH}$ from a TPC command field of UE-specific DCI received from SCell, according to a predefined rule between a BS and the UE. For example, the UE may obtain a value of $\delta_{PUCCH}$ from a TPC command field of UE-specific DCI received from SCell having a lowest cell index.

According to an embodiment of the disclosure, when there are not UE-specific DCIs received from PCell and SCell, the UE may determine whether there is group-common DCI received from the PCell.

When the group-common DCI received from the PCell exists, the UE may obtain a value of $\delta_{PUCCH}$ from the group-common DCI.

When UE-specific DCI received from the PCell or SCell does not exist and the group-common DCI received from the PCell does not exist, the UE may configure the value of $\delta_{PUCCH}$ as 0 dB.

The UE may update the value of g(i) (where i=n) by using Equation 2, based on the obtained $\delta_{PUCCH}$ (when UE-specific DCI received from PCell or SCell exists or when group-common DCI received from the PCell exists and UE-specific DCI received from the SCell does not exist), or the value of $\delta_{PUCCH}$ configured as 0 dB (when UE-specific DCI or group-common DCI received from the PCell does not exist and UE-specific DCI received from the SCell does not exist).

Like in FIG. 7, the BS may transmit resource information of the PUCCH via the UE-specific DCI of the PCell and the one or more SCells, and in this case, the BS may configure the resource information of the PUCCH, which is transmitted via the UE-specific DCI, to be the same in all cells and may transmit the resource information of the PUCCH to the UE.

Accordingly, the UE may obtain the resource information of the PUCCH via UE-specific DCI transmitted from one cell from among the PCell or the SCells. The UE may configure a transmission power value of the PUCCH to be transmitted on PCell, by using the updated value of g(i) and the obtained resource information of the PUCCH. Then, the UE may transmit the PUCCH in the $n^{th}$ subframe, by using the configured transmission power value of the PUCCH.

Figure 9:
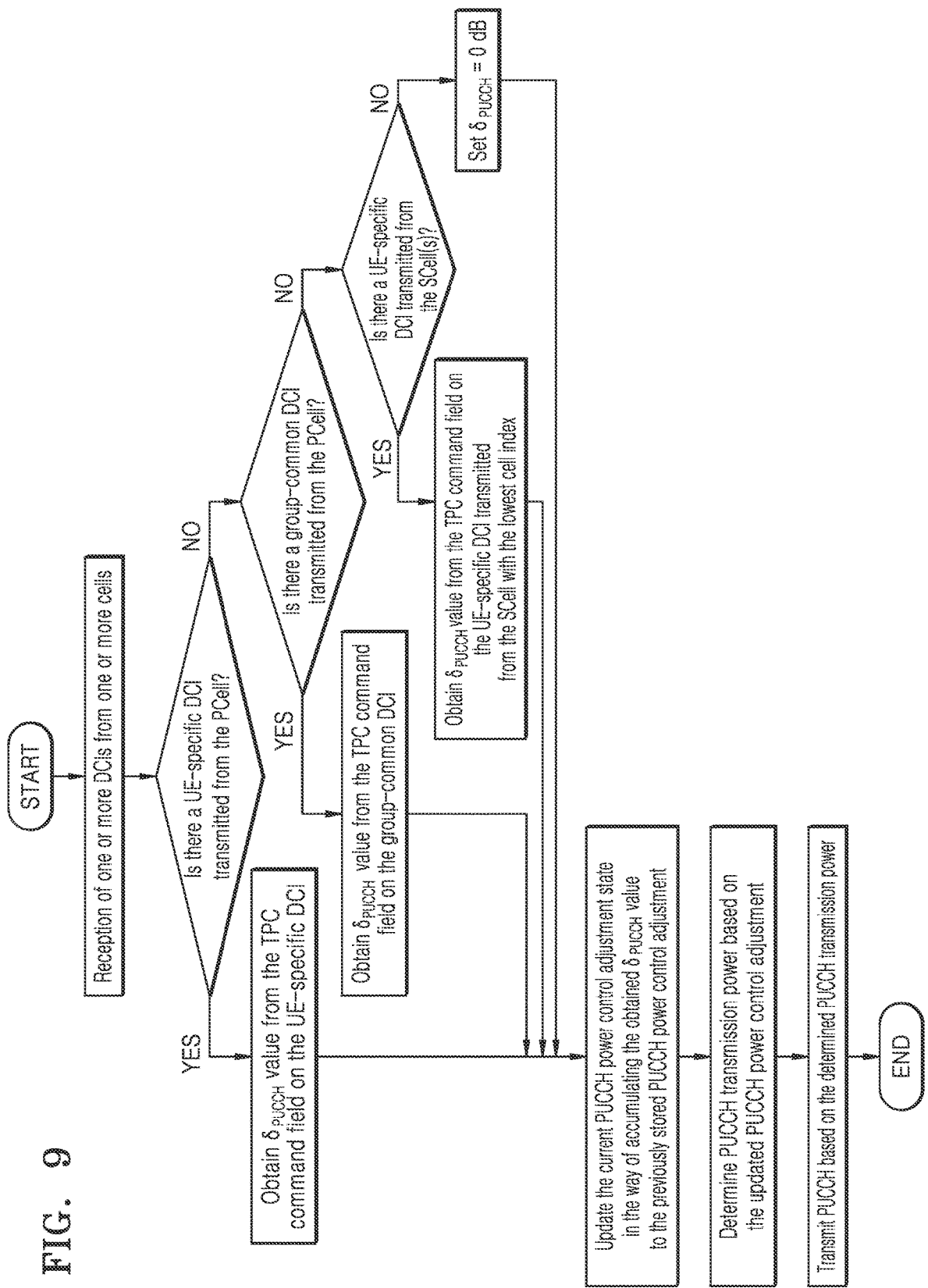
FIG. 9 is a diagram of another example of transmission of DL data and DL control information and transmission of UL control information in a system to which CA is applied, according to an embodiment of the disclosure.

FIG. 9 is a diagram for describing transmission of DL data and DL control information and transmission of UL control information in a system to which CA is applied, according to an embodiment of the disclosure.

According to an embodiment of the disclosure, in FIG. 8, when UE-specific DCI received from PCell does not exist, a UE may determine whether UE-specific DCI from SCell having a lowest cell index exists, and when the DCI does not exist, may determine whether group-common DCI transmitted from the PCell exists.

According to an embodiment of the disclosure, in FIG. 9, when UE-specific DCI received from PCell does not exist, a UE may first determine whether group-common DCI transmitted from the PCell exists, and when the corresponding DCI exists, the UE may obtain a value of $\delta_{PUCCH}$ from the group-common DCI.

When UE-specific DCI nor group-common DCI transmitted from the PCell does not exist, the UE may determine whether UE-specific DCI received from SCell exists. When UE-specific DCI is transmitted from two or more SCells, the UE may obtain a value of $\delta_{PUCCH}$ via the UE-specific DCI transmitted from SCell having a lowest cell index.

When UE-specific DCI or group-common DCI received from the PCell does not exist, and UE-specific DCIs received from SCells do not exist, the UE may configure the value of $\delta_{PUCCH}$ as 0 dB. The UE may update a value of g(i) (where i=n), by using Equation 2, based on the obtained value of $\delta_{PUCCH}$ or the value of $\delta_{PUCCH}$ configured as 0 dB.

Like in FIGS. 7 and 8, a BS may transmit resource information of a PUCCH via UE-specific DCI of the PCell or the one or more SCells. In this case, the BS may configure the resource information of the PUCCH, which is transmitted via the UE-specific DCI, to be the same in all cells and may transmit the resource information of the PUCCH to the UE.

Accordingly, the UE may obtain the resource information of the PUCCH via UE-specific DCI transmitted from one cell from among the PCell or the SCells. The UE may configure a transmission power value of the PUCCH to be transmitted on PCell, by using the updated value of g(i) and the obtained resource information of the PUCCH. Then, the UE may transmit the PUCCH in an $n^{th}$ subframe, by using the configured transmission power value of the PUCCH.

As another example of PUCCH resource information transmission by the BS, the BS may transmit PUCCH resource information to the UE, according to a predefined rule between the BS and the UE. That is, the BS may not equally configure and transmit PUCCH resource information via UE-specific DCI transmitted from one cell from among the PCell or the SCells. According to an embodiment of the disclosure, the UE and the BS may predefine to transmit PUCCH resource information via UE-specific DCI transmitted from the PCell.

In this case, the UE may obtain the PUCCH resource information via the UE-specific DCI transmitted from the PCell, and may ignore PUCCH resource information included in UE-specific DCI transmitted from SCell or SCells, regardless of configuration by the BS. As another example, the BS may configure a field of PUCCH resource information with a particular value, the PUCCH resource information being included in UE-specific DCI transmitted from SCell or SCells. For example, the BS may configure all bits of the field as '0' or '1'. Upon reception of this, the UE may ignore the field about the PUCCH resource information. For convenience of explanation, although an example is provided in which the field about the PUCCH resource information included in the UE-specific DCI transmitted from SCell or SCells is configured with the particular value, in general, the BS may transmit PUCCH resource information valid only for UE-specific DCI transmitted from a particular cell predefined with the UE, and may transmit PUCCH resource information invalid for UE-specific DCI transmitted from other cells. In this case, the invalid PUCCH resource information may be regarded as a field about PUCCH resource information configured with a particular value.

As another example of PUCCH resource information transmission by the BS, the BS may inform the UE of PUCCH resource information via UE-specific DCIs transmitted from PCell and SCell having a lowest cell index. The UE not having received the UE-specific DCI from the PCell may obtain the PUCCH resource information via reception of the UE-specific DCI transmitted from the SCell having a lowest cell index.

The UE may obtain the PUCCH resource information from the UE-specific DCIs transmitted from the PCell and the SCell having a lowest cell index, and may ignore PUCCH resource information included in UE-specific DCI transmitted from SCell or SCells, regardless of configuration by the BS. Alternatively, the BS may configure a field of PUCCH resource information with a particular value, the PUCCH resource information being included in UE-specific DCI transmitted from SCell or SCells. For example, the BS may configure all bits of the field as '0' or '1'.

As another example, the BS may inform the UE of PUCCH resource information via UE-specific DCI transmitted on particular SCell. For example, the BS may inform the UE of PUCCH resource information via UE-specific DCI transmitted on SCell having a lowest cell index. The UE may ignore PUCCH resource information included in UE-specific DCI transmitted from the PCell and UE-specific DCI transmitted from SCell or SCells, regardless of configuration by the BS.

Alternatively, the BS may configure a field of PUCCH resource information with a particular value, the PUCCH resource information being included in UE-specific DCIs excluding UE-specific DCI to be referenced by the UE to obtain PUCCH resource information. For example, the BS may configure all bits of the field as '0' or '1'.

As another example, the BS may inform the UE of PUCCH resource information via UE-specific DCI transmitted on particular SCell. For example, the BS may inform the UE of PUCCH resource information via UE-specific DCI transmitted on SCell having a lowest cell index. The UE may ignore PUCCH resource information included in UE-specific DCI received from the PCell and UE-specific DCI transmitted from SCell or S Cells, regardless of configuration by the BS.

Alternatively, the BS may configure a field of PUCCH resource information with a particular value, the PUCCH resource information being included in UE-specific DCIs excluding UE-specific DCI to be referenced by the UE to obtain PUCCH resource information. For example, the BS may configure all bits of the field as '0' or '1'.

As another example, the BS may inform the UE of a cell index to be referenced by the UE to obtain PUCCH resource information, via RRC signaling or a medium access control control element (MAC CE).

When obtaining the index, the UE may obtain PUCCH resource information from UE-specific DCI transmitted from a cell having the cell index. The UE may ignore PUCCH resource information transmitted from UE-specific DCIs transmitted from a cell or cells not having the index informed by the BS.

Figure 10:
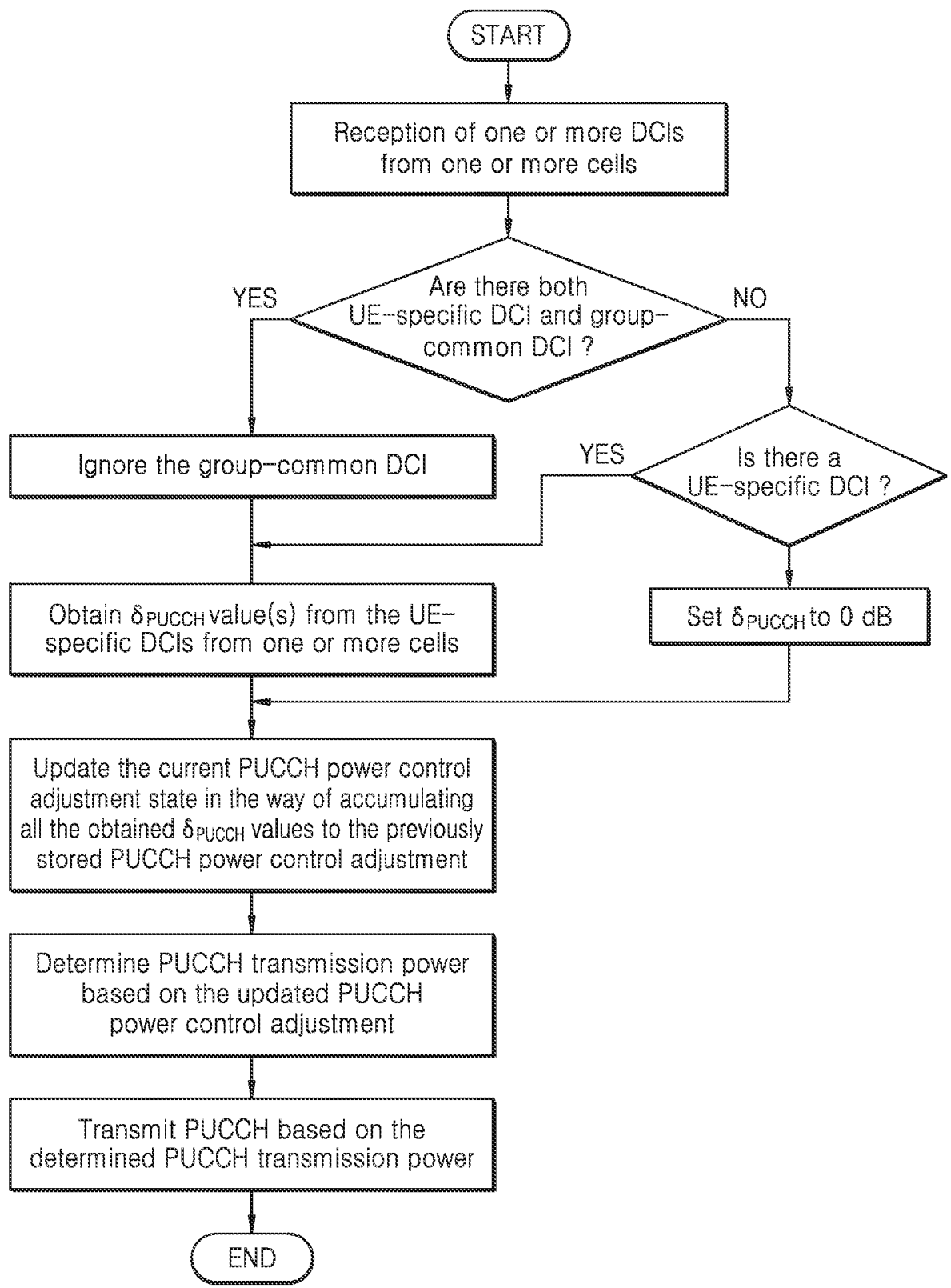
FIG. 10 is a diagram of another example of transmission of DL data and DL control information and transmission of UL control information in a system to which CA is applied, according to an embodiment of the disclosure.

FIG. 10 is a diagram for describing transmission of DL data and DL control information and transmission of UL control information in a system to which CA is applied, according to an embodiment of the disclosure.

A UE according to an embodiment of the disclosure may update a value of g(i) of Equation 2 by using values of $\delta_{PUCCH}$ obtained from all UE-specific DCIs received from PCell and one or more SCells. That is, the UE may accumulate and use all values of $\delta_{PUCCH}$ included in the UE-specific DCIs. In this case, values of $\delta_{PUCCH}$ included in group-common DCIs may not be accumulated.

When the received UE-specific DCI does not exist, the UE may configure the value of $\delta_{PUCCH}$ as 0 dB and may update the value of g(i) by using Equation 2.

Also, as described above with reference to FIG. 9, the UE may obtain resource information of a PUCCH by using at least one of the above-described methods.

The UE may configure a transmission power value of the PUCCH to be transmitted on PCell, by using the updated value of g(i) and the obtained resource information of the PUCCH.

The UE may transmit the PUCCH in an $n^{th}$ subframe, by using the configured transmission power value of the PUCCH.

Figure 11:
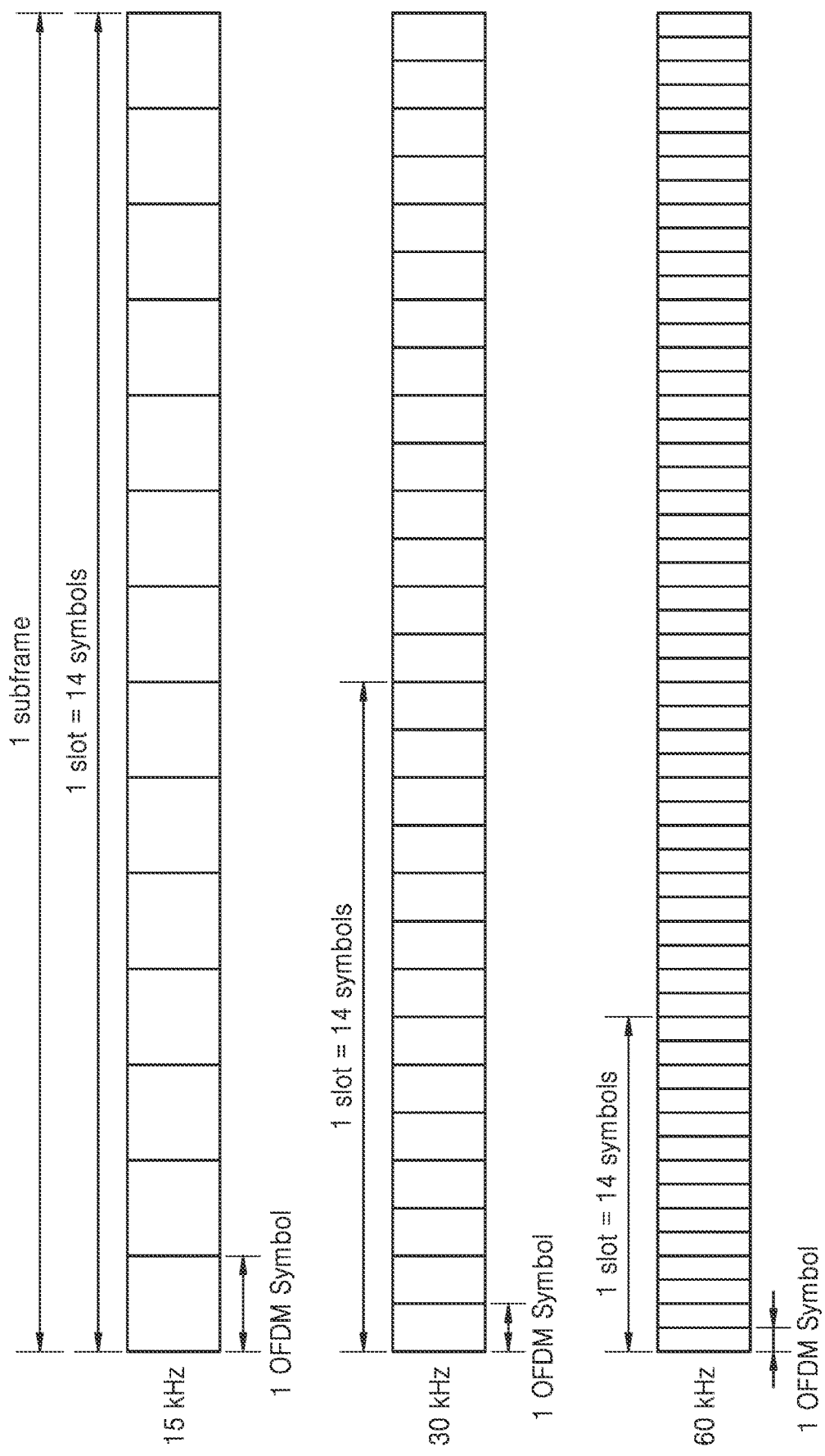
FIG. 11 is a diagram for describing a subframe and a slot, according to an embodiment of the disclosure.

FIG. 11 is a diagram for describing a subframe and a slot, according to an embodiment of the disclosure.

One subframe may have a length of 1 ms on a time axis, and one slot may include 14 symbols. When a subcarrier spacing of 15 kHz is used, one slot including 14 symbols has a length of 1 ms, and thus, one slot and one subframe may be the same.

When a subcarrier spacing of 30 kHz is used, one slot including 14 symbols has a length of 0.5 ms, and thus, one subframe may include two slots. Also, when a subcarrier spacing of 60 kHz is used, one slot including 14 symbols has a length of 0.25 ms, and thus, one subframe may include four slots. Accordingly, when a subcarrier spacing $\Delta f$ is N times 15 kHz, the number of slots including one subframe may be increased by N times.

Accordingly, such rules may be applied even when subcarrier spacings not shown in FIG. 11 are used. For example, when a subcarrier spacing of 120 kHz is used, $\Delta f$ is 8 times 15 kHz, and thus, the number of slots including one subframe may be 8.

Figure 12A:
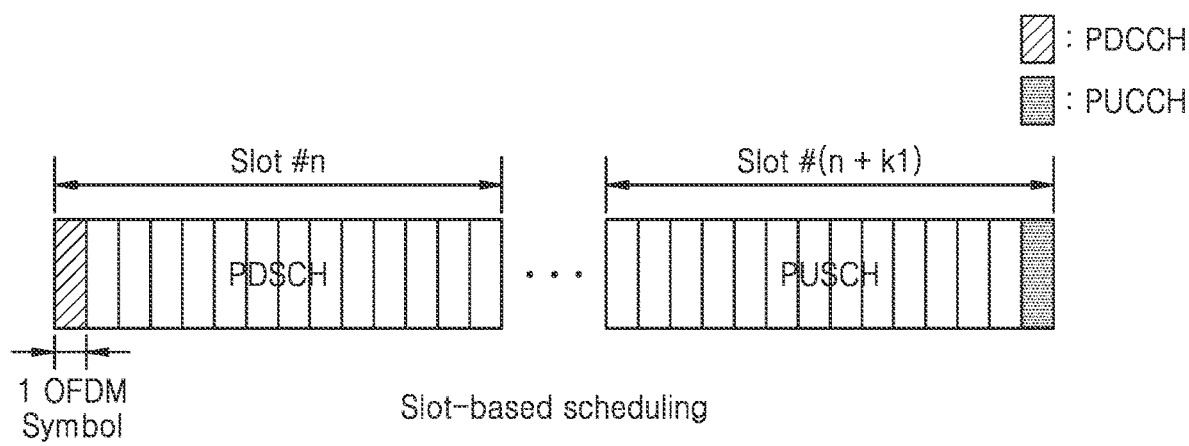
FIGS. 12A and 12B are diagrams for describing slot-based scheduling and mini-slot-based scheduling, according to an embodiment of the disclosure.

FIG. 12A is a diagram for describing slot-based scheduling, according to an embodiment of the disclosure.

An $n^{th}$ DL slot may include a PDCCH and a PDSCH, and a $(n+k1)^{th}$ UL slot may include a PUSCH and a PUCCH. In this case, for convenience of explanation, the PDCCH of the $n^{th}$ slot includes one symbol, but the PDCCH may include two symbols or three symbols. Also, although a position of a symbol on which the PDCCH is to be transmitted is a first symbol, the disclosure is not limited thereto. That is, a position of a symbol on which the PDCCH is to be transmitted may be a second symbol or after the second symbol.

Also, although the PUCCH is to be transmitted on a last symbol in the $(n+k1)^{th}$ slot, the PUCCH may be transmitted on a random position from among 14 symbols constituting the (n+k1)$^{th}$ slot. Also, although the PUCCH includes one symbol, the number of symbols constituting the PUCCH may be equal to or greater than 2 and equal to or less than 14.

Figure 12B:
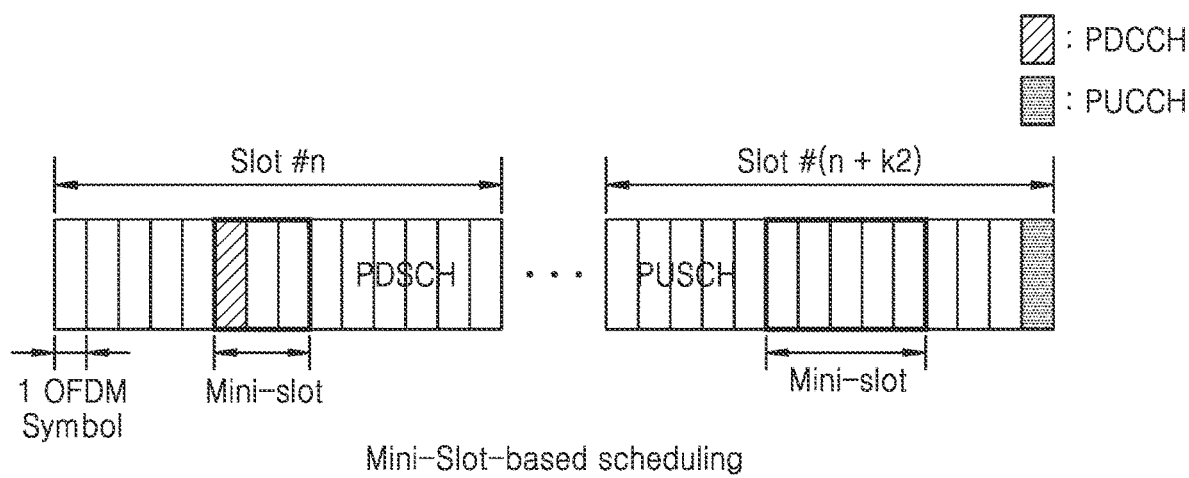

FIG. 12B is a diagram for describing mini-slot-based scheduling, according to an embodiment of the disclosure.

A DL mini-slot may include a PDCCH and a PDSCH in an n$^{th}$ DL slot. In this case, although a mini-slot includes one PDCCH symbol and two PDSCH symbols, the disclosure is not limited thereto. That is, a case being smaller than the number of PDSCH symbols used in DL slot-based scheduling may be referred to as the DL mini-slot.

A (n+k2)$^{th}$ UL slot may include a PUSCH and a PUCCH. In this case, for convenience of explanation, a UL mini-slot in the (n+k2)$^{th}$ UL slot includes 5 symbols, but the disclosure is limited thereto. That is, a case being smaller than the number of PUSCH symbols used in UL slot-based scheduling may be referred to as the UL mini-slot. Also, although the PUCCH is to be transmitted on a last symbol in the (n+k2)$^{th}$ slot, the PUCCH may be transmitted on a random position from among 14 symbols constituting the (n+k2)$^{th}$ UL slot. Also, although the PUCCH includes one symbol, the number of symbols constituting the PUCCH may be equal to or greater than 2 and equal to or less than 14.

Figure 13:
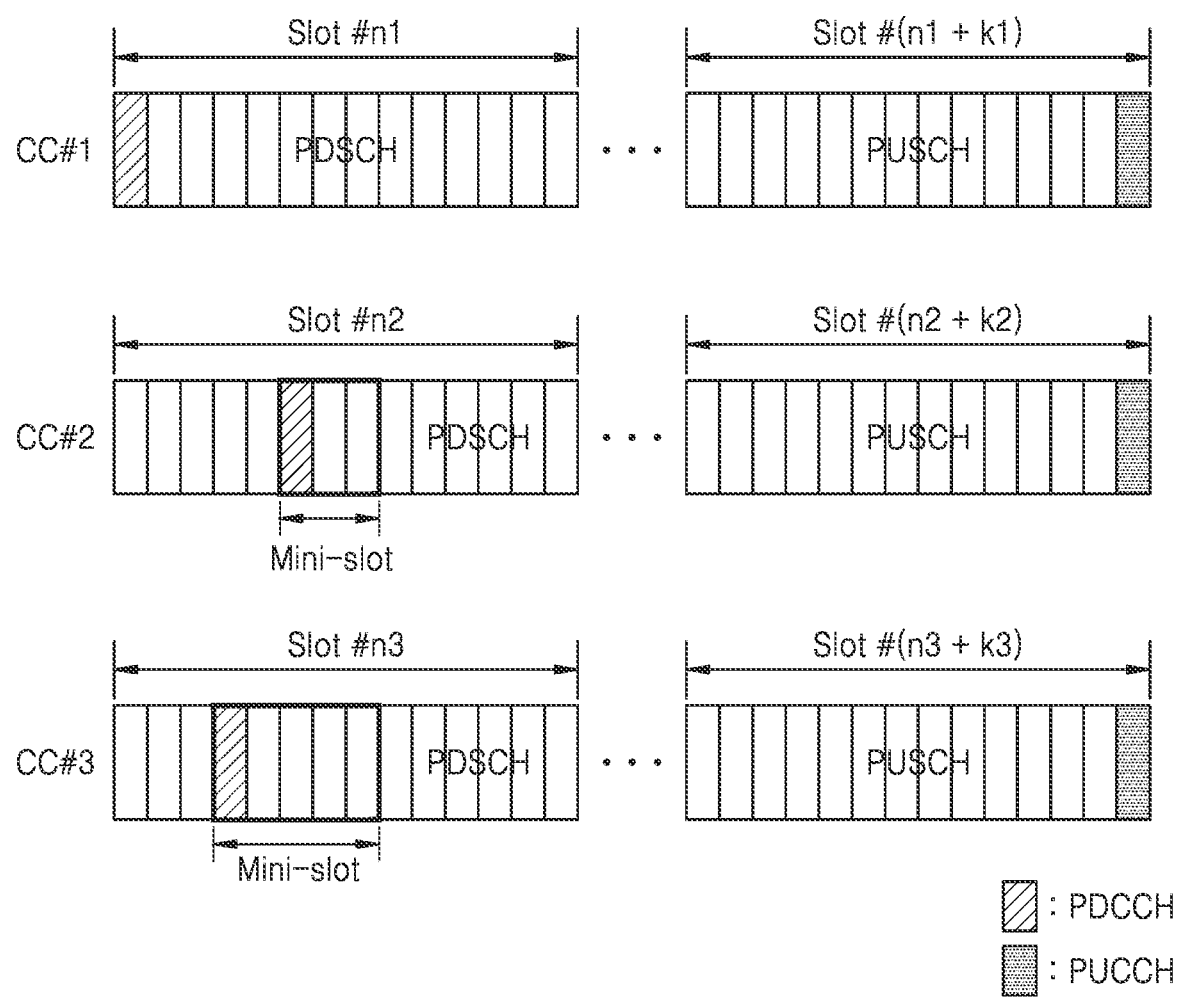
FIG. 13 is a diagram for describing a case where slot-based scheduling and mini-slot-based scheduling coexist in a system to which CA is applied, according to an embodiment of the disclosure.

FIG. 13 is a diagram for describing a case where slot-based scheduling and mini-slot-based scheduling coexist in a system to which CA is applied, according to an embodiment of the disclosure.

It is assumed that a BS transmits a PDCCH and a PDSCH in an n1$^{th}$ slot via slot-based scheduling on carrier no. 1 (CC #1), and CC #1 is PCell. Also, it is assumed that the BS transmits a PDCCH and a PDSCH in a mini-slot including 3 symbols within an n2$^{th}$ slot via mini-slot-based scheduling on carrier no. 2 (CC #2). Also, it is assumed that the BS transmits a PDCCH and a PDSCH in a mini-slot including 5 symbols within an n3$^{th}$ slot via mini-slot-based scheduling on carrier no. 3 (CC #3). Lastly, it is assumed that a PUCCH is transmitted only via CC #1 that is the PCell.

In this case, n1, n2, and n3 may be different from each other, but it is possible that n1+k1=n2+k2=n3+k3. This may mean that HARQ-ACK/NACK information about a PDSCH which includes a slot or a mini-slot and which is transmitted in a DL of each CC may be transmitted via a PUCCH of the same time.

Also, although the PUCCH is transmitted via all cells in FIG. 13, this is merely an example considering a case where a UE that does not support CA accesses a particular cell, in view of a system. That is, UE-2 that accesses CC #2 and does not have a CA support capability may receive the PDCCH and the PDSCH on a DL carrier of CC #2 and may transmit the PUCCH on a UL carrier of CC #2.

Also, UE-3 that accesses CC #3 and does not have a CA support capability may receive the PDCCH and the PDSCH on a DL carrier of CC #3 and may transmit the PUCCH on a UL carrier of CC #2. Unlike this, UE-1 having a CA support capability may receive the PDCCH and the PDSCH on DL carriers of CC #1, CC #2, and CC #3 and may transmit the PUCCH on a UL carrier of CC #1. In this case, it is assumed that CC #1 is the PCell. FIG. 13 illustrates three CCs, but the disclosure may be applied to a CA scenario of at least four CCs.

Under the aforementioned assumption, a UE having a CA support capability may obtain timing information of a PUCCH (i.e., k1 value) which indicates that the PUCCH is to be transmitted in a (n1+k1)$^{th}$ slot, resource information of the PUCCH transmitted in the (n1+k1)$^{th}$ slot, and a value of $\delta_{PUCCH}$ for configuring a transmission power value of the PUCCH, from a DCI field of a PDCCH transmitted in the n1$^{th}$ slot of CC #1.

The UE may obtain timing information of a PUCCH (i.e., k2 value) which indicates that the PUCCH is to be transmitted in a (n2+k2)$^{th}$ slot, resource information of the PUCCH transmitted in the (n2+k2)$^{th}$ slot, and a value of $\delta_{PUCCH}$ for configuring a transmission power value of the PUCCH, from a DCI field of a PDCCH transmitted in a mini-slot within the n2$^{th}$ slot of CC #2.

Likewise, the UE may obtain timing information of a PUCCH (i.e., k3 value) which indicates that the PUCCH is to be transmitted in a (n3+k3)$^{th}$ slot, resource information of the PUCCH transmitted in the (n3+k3)$^{th}$ slot, and a value of $\delta_{PUCCH}$ for configuring a transmission power value of the PUCCH, from a DCI field of a PDCCH transmitted in a mini-slot within the n3$^{th}$ slot of CC #3.

Figure 14:
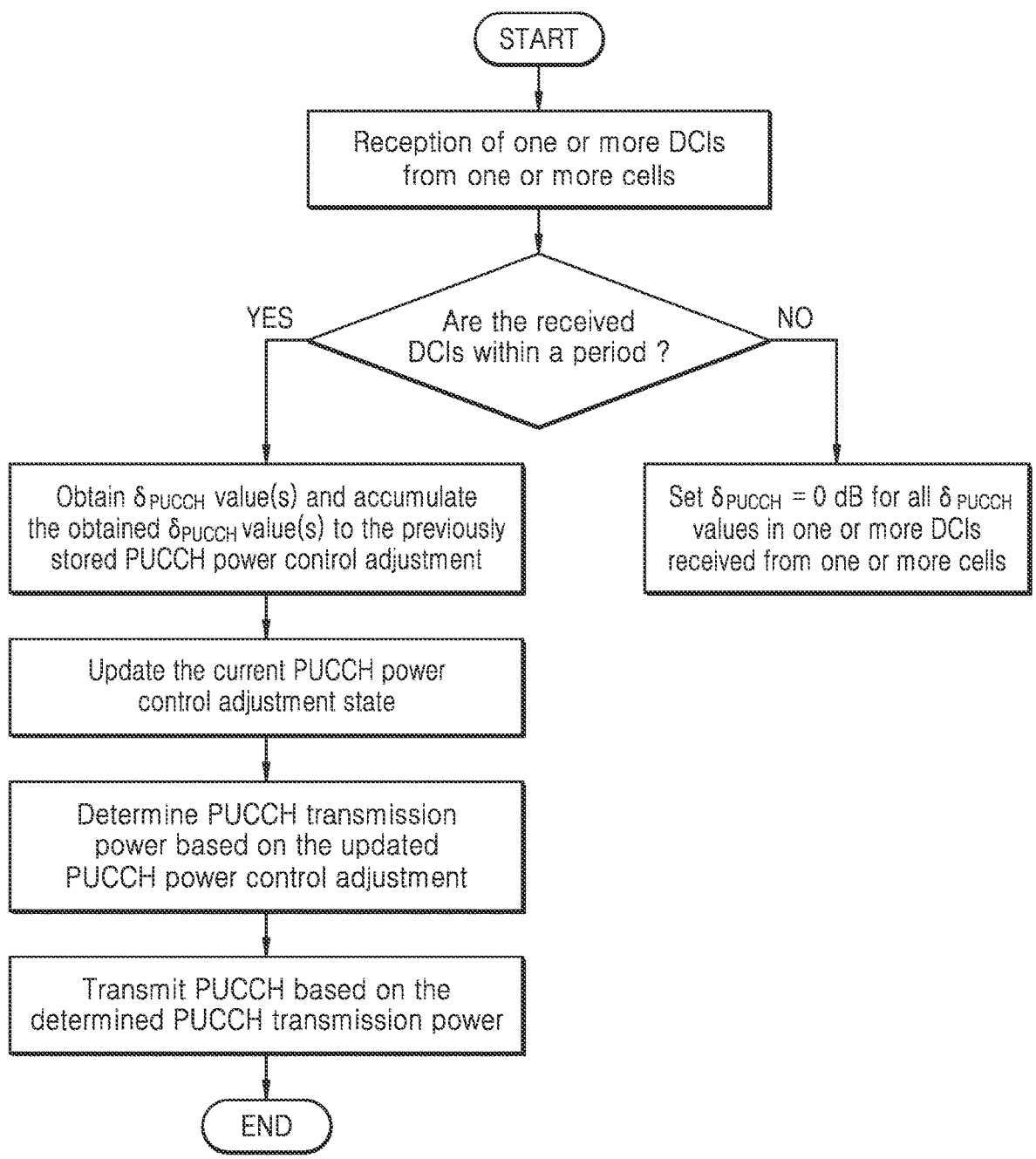
FIG. 14 is a diagram of an example of a CA system where slot-based scheduling and mini-slot-based scheduling coexist, according to an embodiment of the disclosure.

FIG. 14 is a diagram for describing transmission of DL data and DL control information and transmission of UL control information in a CA environment where slot-based scheduling and mini-slot-based scheduling coexist, according to an embodiment of the disclosure.

A UE according to an embodiment of the disclosure may receive one or more DCIs from one or more cells. In this case, DCI may be UE-specific DCI or group-common DCI.

As shown in FIG. 13, the UE may receive, on each CC, a PDSCH and a PDCCH including control information about the PDSCH which are transmitted via slot-based or mini-slot-based scheduling in an n1$^{th}$ slot of CC #1, an n2$^{th}$ slot of CC #2, and an n3$^{th}$ slot of CC #3. In this case, the PDCCH received on each CC is a PDCCH about slot-based or mini-slot-based scheduling, and thus, DCI may be regarded as UE-specific DCI. Although not shown in FIG. 13, in addition to the UE-specific DCI, the UE may receive group-common DCI on each CC.

Accordingly, the UE may require a method of updating g(i) defined in Equation 2 for configuring a transmission power value of a PUCCH transmitted at a time of n1+k1=n2+k2=n3+k3 shown in FIG. 13. That is, when the UE receives two or more UE-specific DCIs or group-common DCIs, the UE may need consideration for an accumulation method with respect to values of $\delta_{PUCCH}$. In order to support this, a BS and the UE may predetermine a predefined period (or window).

Figure 15A:
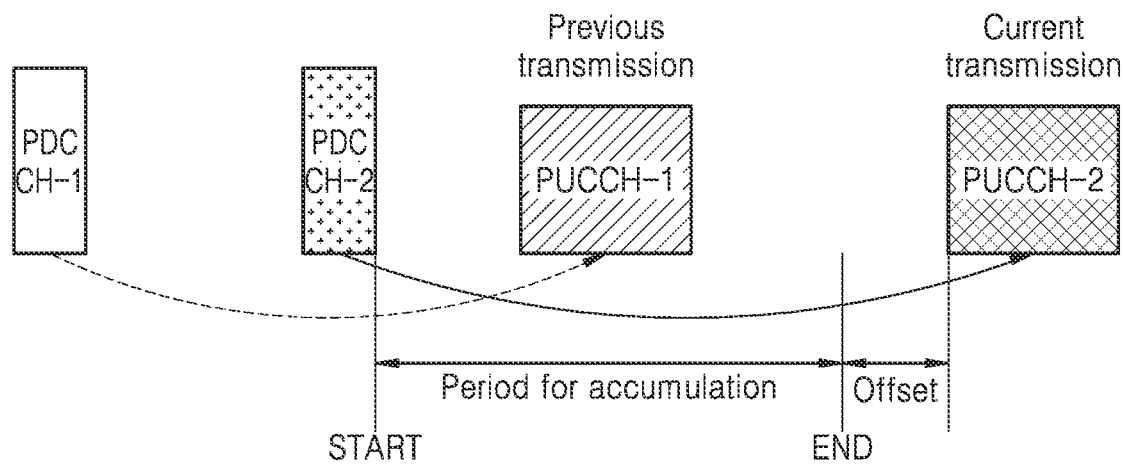
FIGS. 15A and 15B are diagrams for describing a start point and an end point of accumulation of a value of $\delta_{PUCCH}$, according to an embodiment of the disclosure.
Figure 15B:
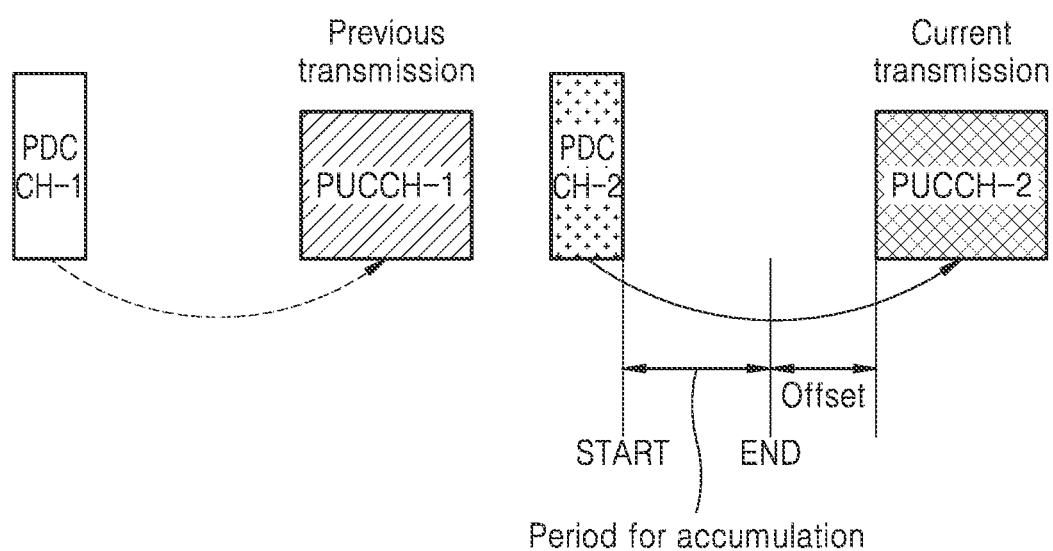

FIGS. 15A and 15B are diagrams for describing a start point and an end point of accumulation of a value of $\delta_{PUCCH}$, according to an embodiment of the disclosure.

FIG. 15A illustrates an example where PDCCH-2 is received before PUCCH-1 is transmitted, and FIG. 15B illustrates an example where PDCCH-2 is received after PUCCH-1 is transmitted.

A UE according to an embodiment of the disclosure may regard a time when reception of UE-specific DCI including information about current PUCCH transmission ends, as a time to start accumulation of a value of $\delta_{PUCCH}$, and may obtain values of $\delta_{PUCCH}$ from all DCIs (one or more UE-specific DCIs and group-common DCIs transmitted from one or more cells) received within a predefined period starting from a time when the UE-specific DCI is received, and may accumulate all the obtained values of $\delta_{PUCCH}$.

PDCCH-2 indicates UE-specific DCI including information about PUCCH-2 to be currently transmitted by the UE, and PDCCH-1 indicates UE-specific DCI including information about PUCCH-1 transmitted immediately before the PUCCH-2 to be currently transmitted. In this case, a BS and the UE may predefine that UE-specific DCI indicating a start of accumulation of a value of $\delta_{PUCCH}$ (i.e., the UE-specific DCI including the information about transmission of the PUCCH-2 to be currently transmitted) will be transmitted only from PCell.

The BS and the UE may predefine that, when the UE-specific DCI transmitted from the PCell does not exist, UE-specific DCI transmitted from particular SCell indicates a start of accumulation of a value of $\delta_{PUCCH}$. In this case, the BS and the UE may predefine that the particular SCell is a cell having a lowest cell index (or a cell having a highest cell index) from among SCells. As another example, the BS may configure the UE with a cell index indicating a start of accumulation of a value of $\delta_{PUCCH}$. Upon reception of this, the UE may start accumulation of a value of $\delta_{PUCCH}$ at a point when reception of UE-specific DCI transmitted from a cell having the cell index ends.

The accumulation of a value of $\delta_{PUCCH}$ may end before transmission of a PUCCH (PUCCH-2) to be currently transmitted. That is, the UE may start the accumulation of a value of $\delta_{PUCCH}$ at a point when reception of the PDCCH-2 ends and then may end the accumulation of a value of $\delta_{PUCCH}$ at a point when transmission of the PUCCH-2 starts. However, in this case, a time period in which the UE may update a value of g(i) of Equation 2 by using accumulated values of $\delta_{PUCCH}$ and may configure transmission power for transmission of the PUCCH may be insufficient. In this case, the accumulation of a value of $\delta_{PUCCH}$ may end before transmission of the PUCCH (PUCCH-2) to be currently transmitted starts. This is marked as an offset in FIGS. 15A and 15B.

Such offset information should be determined, in consideration of a processing time capability of the UE, and may be a predefined value. Alternatively, the BS may configure the UE with the offset information via RRC signaling. Alternatively, based on a value configured by the BS, the UE may calculate the offset information.

Figure 16A:
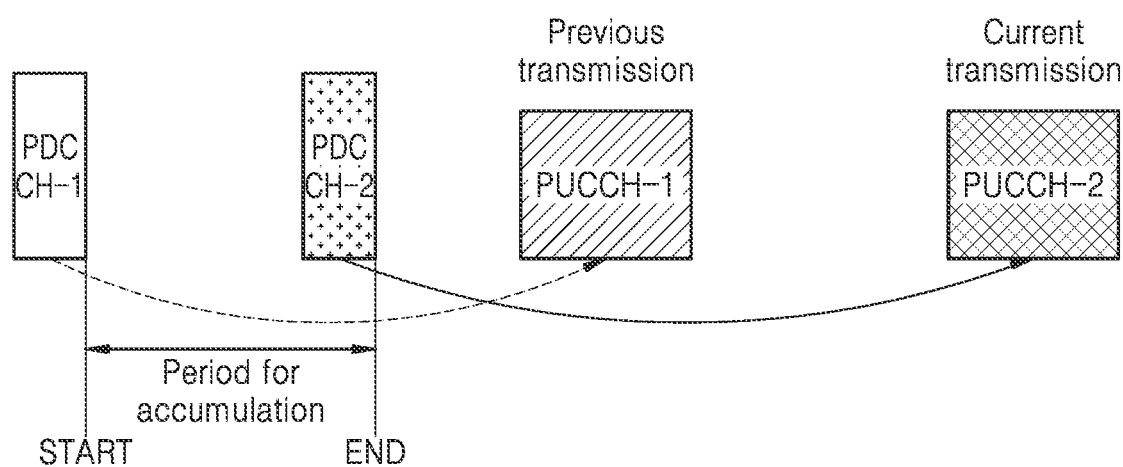
FIGS. 16A and 16B are diagrams for describing a start point and an end point of accumulation of a value of $\delta_{PUCCH}$, according to an embodiment of the disclosure.
Figure 16B:
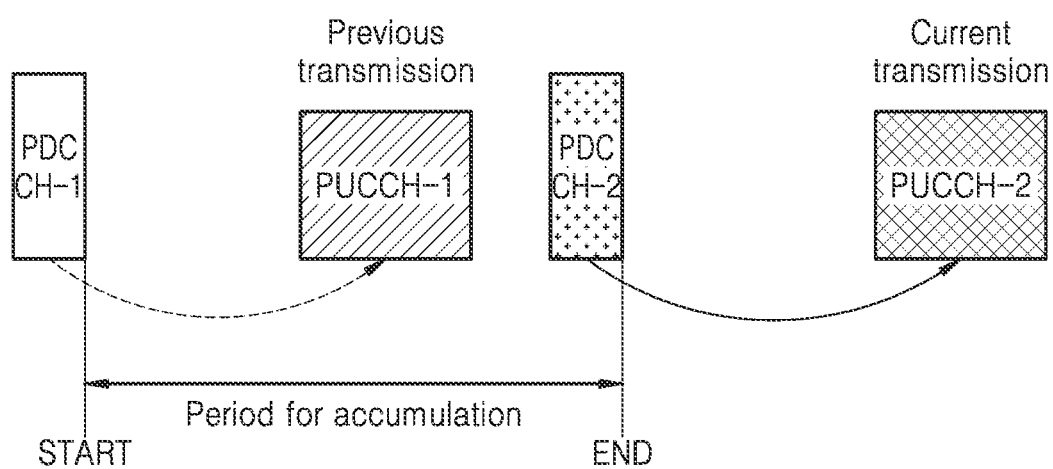

FIGS. 16A and 16B are diagrams for describing a start point and an end point of accumulation of a value of $\delta_{PUCCH}$, according to an embodiment of the disclosure.

FIG. 16A illustrates an example where PDCCH-2 is received before PUCCH-1 is transmitted, and FIG. 16B illustrates an example where PDCCH-2 is received after PUCCH-1 is transmitted.

As another example of a start of accumulation of a value of $\delta_{PUCCH}$, as shown in FIGS. 16A and 16B, accumulation of a value of $\delta_{PUCCH}$ may start based on a pre-transmitted PUCCH (PUCCH-1), not in a way accumulation of a value of $\delta_{PUCCH}$ starts based on UE-specific DCI including information about current transmission of a PUCCH (PUCCH-2) as described above with reference to FIGS. 15A and 15B.

In more detail, a PUCCH to be transmitted in a $(n1+k1)^{th}$ slot of FIG. 13 is defined as a 'currently transmitted PUCCH (PUCCH-2 of FIG. 16A)', and a PUCCH transmitted immediately before the currently transmitted PUCCH is defined as an 'immediately-before transmitted PUCCH (PUCCH-1 of FIG. 16A)'.

In this case, a start of accumulation of a value of $\delta_{PUCCH}$ used in configuring a transmission power value of the currently transmitted PUCCH may be determined based on a transmission time of the immediately-before transmitted PUCCH (PUCCH-1). That is, the UE may start accumulation of a value of $\delta_{PUCCH}$, based on a transmission start point of the immediately-before transmitted PUCCH (PUCCH-1) (or a transmission end point of PUCCH-1).

For example, when the transmission time of the immediately-before transmitted PUCCH-1 is a $p^{th}$ symbol of a $j^{th}$ slot and the PUCCH-1 includes L symbols, the UE may start the accumulation of a value of $\delta_{PUCCH}$ on a symbol after the $p^{th}$ symbol of the $j^{th}$ slot (based on the transmission start point of the PUCCH-1). Alternatively, the UE may start the accumulation of a value of $\delta_{PUCCH}$ on a symbol after a $(p+L)^{th}$ symbol of the $j^{th}$ slot (based on the transmission end point of the PUCCH-1).

The end of the accumulation of a value of $\delta_{PUCCH}$ may be performed up to a start of transmission of the currently transmitted PUCCH (PUCCH-2) or may be performed up to an offset with respect to the transmission of the currently transmitted PUCCH (PUCCH-2).

In another example, as shown in FIGS. 16A and 16B, the end of the accumulation of a value of $\delta_{PUCCH}$ may be performed at a point when reception of the PDCCH-2 including information about the currently transmitted PUCCH-2 ends. Although not shown in FIGS. 16A and 16B, the accumulation of a value of $\delta_{PUCCH}$ may end at a point when reception of the PDCCH-2 starts.

In this case, the BS and the UE may predefine that UE-specific DCI indicating the end of the accumulation of a value of $\delta_{PUCCH}$ (i.e., PDCCH-2 that includes UE-specific DCI including information about transmission of the PUCCH-2 to be currently transmitted) will be transmitted only from PCell. The BS and the UE may predefine that, when the UE-specific DCI transmitted from the PCell does not exist, UE-specific DCI transmitted from particular SCell indicates the end of the accumulation of a value of $\delta_{PUCCH}$. In this case, the BS and the UE may predefine that the particular SCell is a cell having a lowest cell index (or a cell having a highest cell index) from among SCells.

As another example, the BS may configure the UE with a cell index indicating the end of accumulation of a value of $\delta_{PUCCH}$. Upon reception of this, the UE may accumulate a value of $\delta_{PUCCH}$ up to a point when reception of UE-specific DCI transmitted from a cell having the cell index ends.

In another example, the BS and the UE may predefine that the UE-specific DCI indicating the end of the accumulation of a value of $\delta_{PUCCH}$ will be transmitted from the same cell having a cell index from which the aforementioned UE-specific DCI indicating the start of the accumulation of a value of $\delta_{PUCCH}$ is transmitted.

Figure 17A:
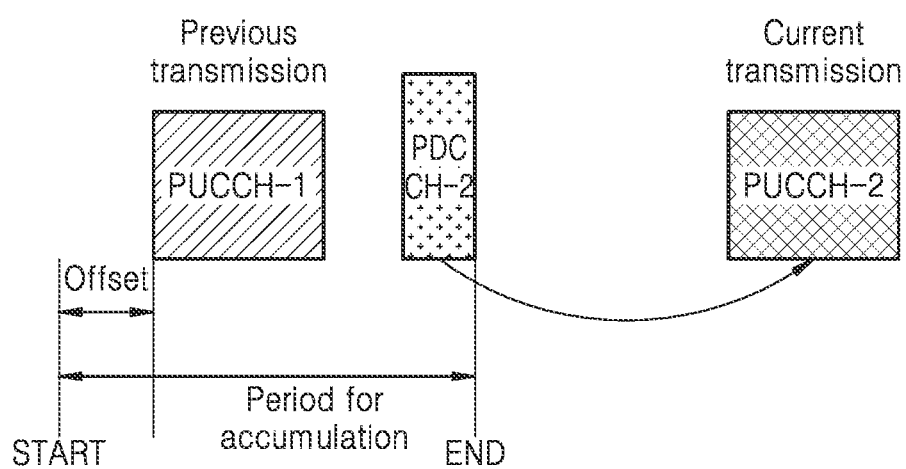
FIGS. 17A and 17B are diagrams for describing a start point and an end point of accumulation of a value of $\delta_{PUCCH}$, according to an embodiment of the disclosure.

In another example, the UE may start accumulation of a value of $\delta_{PUCCH}$ by a particular offset from the transmission start point of the immediately-before transmitted PUCCH (PUCCH-1) (or the transmission end point of PUCCH-1). For example, as shown in FIG. 17A, it is assumed that a transmission time of an immediately-before transmitted PUCCH (PUCCH-1) is a $p^{th}$ symbol of a $j^{th}$ slot and PUCCH-1 includes L symbols. Also, it is assumed that an offset value is K symbols.

In this case, a UE may start accumulation of a value of $\delta_{PUCCH}$ before (or after) K symbols starting from the $p^{th}$ symbol of the $j^{th}$ slot (based on a transmission start point of the immediately-before transmitted PUCCH-1).

Alternatively, the UE may start accumulation of a value of $\delta_{PUCCH}$ before (or after) K symbols starting from a $(p+L)^{th}$ symbol of the $j^{th}$ slot (based on a transmission end point of the immediately-before transmitted PUCCH-1).

The offset value may be a predefined value, or a BS may configure the UE with the offset value via RRC signaling. Alternatively, based on a value configured by the BS, the UE may calculate the offset value.

According to an embodiment of the disclosure, the offset value is a symbol, but embodiments of the disclosure may be applied even when the offset value is a slot or a subframe.

An end of the accumulation of a value of $\delta_{PUCCH}$ may be performed up to a start of transmission of the currently transmitted PUCCH (PUCCH-2) or may be performed up to an offset with respect to the transmission of the currently transmitted PUCCH (PUCCH-2) as described with reference to FIGS. 15A and 15B.

Figure 17B:
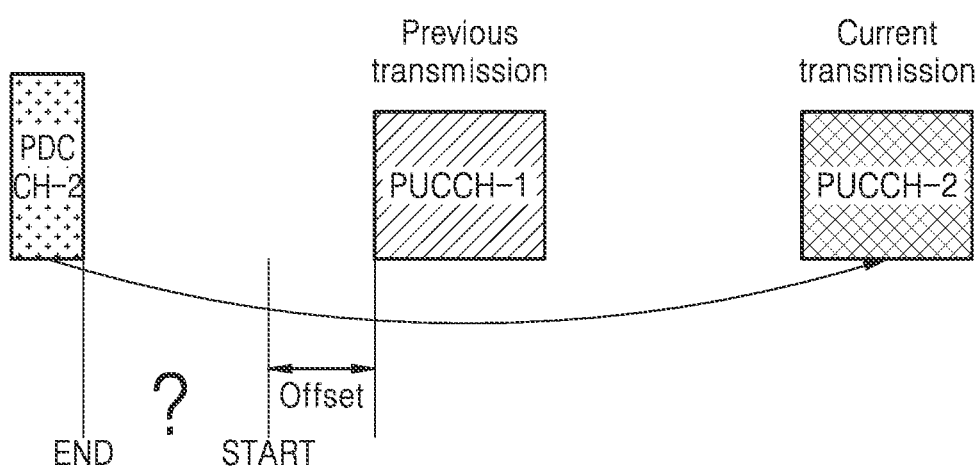

FIGS. 17A and 17B are diagrams for describing a start point and an end point of accumulation of a value of $\delta_{PUCCH}$, according to an embodiment of the disclosure.

FIG. 17A illustrates an example where PDCCH-2 is received after PUCCH-1 is transmitted, and FIG. 17B illustrates an example where PDCCH-2 is received before PUCCH-1 is transmitted.

In another example, an end of accumulation of a value of $\delta_{PUCCH}$ may be performed at a point when reception of the PDCCH-2 including information about PUCCH-2 to be currently transmitted ends, as shown in FIGS. 16A to 17B. Also, although not shown in FIGS. 16A to 17B, accumulation of a value of $\delta_{PUCCH}$ may end at a point when reception of the PDCCH-2 starts.

However, assuming that the accumulation of a value of $\delta_{PUCCH}$ starts and ends by using a method described above, when reception of PDCCH-2 is performed before transmission of PUCCH-1, as shown in FIG. 17B, the UE may not be able to perform the accumulation of a values of $\delta_{PUCCH}$. In this case, the UE may not accumulate a value of $\delta_{PUCCH}$. That is, the value of $\delta_{PUCCH}$ may be configured as 0.

With respect to accumulation of a value of $\delta_{PUCCH}$, the UE may not use a start point of accumulation of a value of $\delta_{PUCCH}$ and an end point of accumulation of a value of $\delta_{PUCCH}$ but may use the start point of accumulation of a value of $\delta_{PUCCH}$ and a period in which accumulation of a value of $\delta_{PUCCH}$ is to be performed. In this case, it may be required to provide configuration as to how long the UE should perform accumulation of a value of $\delta_{PUCCH}$. As an example therefor, the BS may configure, via RRC signaling, a value of a window. Upon reception of this, the UE may accumulate values of $\delta_{PUCCH}$ obtained from one or more DCIs received from one or more cells, during a window period configured via RRC by the BS, the window starting from a point when reception of UE-specific DCI indicating a start of accumulation of values of $\delta_{PUCCH}$ is completed.

When there is no DCI received during a predefined window or a window period configured by the BS, the UE may configure the values of $\delta_{PUCCH}$ as 0 dB. By using an accumulated value of $\delta_{PUCCH}$ or a value of $\delta_{PUCCH}$ configured as 0 dB, the UE may update a value of g(i) by using Equation 2 (where i=n1+k1=n2+k2=n3+k3). The UE may configure a transmission power value of the PUCCH to be transmitted on PCell, by using the updated value of g(i) and PUCCH resource information obtained from UE-specific DCI. Then, the UE may transmit the PUCCH in a (n1+k1)$^{th}$ UL slot, by using the configured transmission power value of the PUCCH.

With reference to FIG. 17B, descriptions of the start point and end point of accumulation of values of $\delta_{PUCCH}$ for transmission of the PUCCH are provided, but the descriptions may be equally applied to a start point and end point of accumulation of values of $\delta_{PUSCH}$ for transmission of a PUSCH.

For example, PUCCH-1 of FIG. 17B may be regarded as PUSCH-1, and PUCCH-2 may be regarded as PUSCH-2. PDCCH-2 may be regarded as UE-specific DCI including resource allocation information or the like about transmission of the PUSCH-2. In this case, the PUSCH-1 may not be a PUSCH (grant-based PUSCH) being allocated via UE-specific DCI but may be a grant-free PUSCH configured via RRC.

In this case, the PDCCH-2 may be received before the PUSCH-1 is transmitted, and in this case, as described with reference to FIG. 17B, $\delta_{PUSCH}$ accumulation may be performed, transmission power of the PUSCH may be configured, and then the PUSCH may be transmitted.

Figure 18:
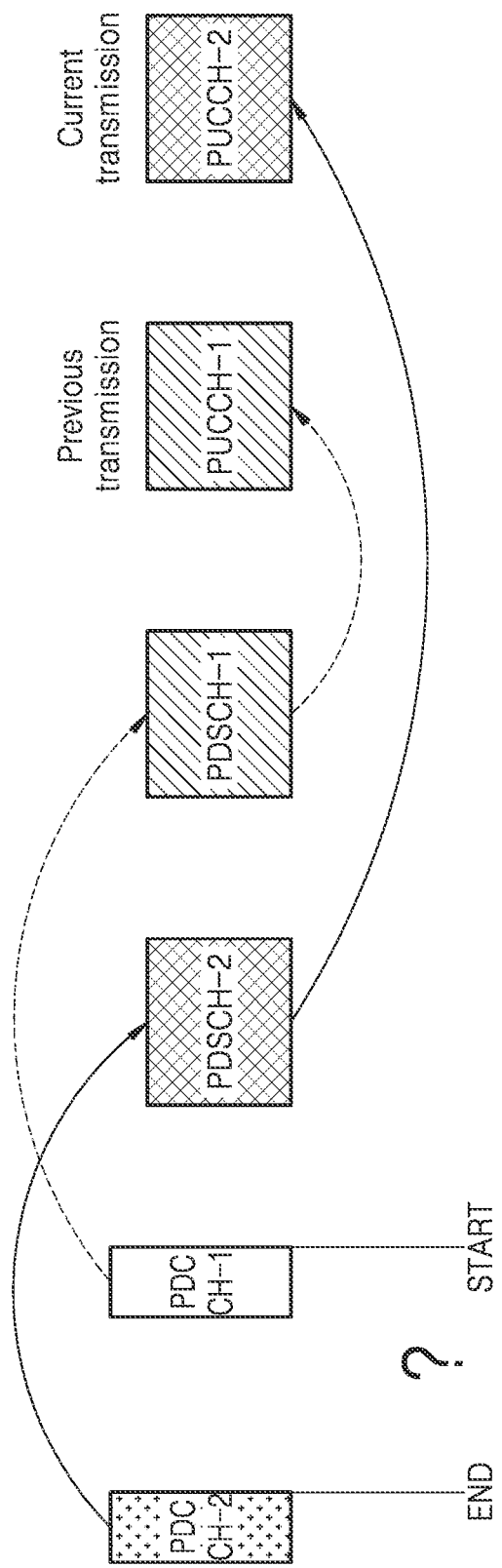
FIG. 18 is a diagram for describing a start point and an end point of accumulation of a value of $\delta_{PUCCH}$, according to an embodiment of the disclosure.

FIG. 18 is a diagram for describing a start point and end point of accumulation of a value of $\delta_{PUCCH}$, according to an embodiment of the disclosure.

Embodiments of using a start point and end point of accumulation of a value of $\delta_{PUCCH}$ have been described. In this case, as shown in FIG. 17B, an order of the start point and the end point may be switched. In another example, as shown in FIG. 18, PDCCH-1 may include resource allocation of PDSCH-1 and transmission information of PUCCH-1, and PDCCH-2 may include resource allocation of PDSCH-2 and transmission information of PUCCH-2. As described with reference to FIGS. 12A, 12B, and 13, PDSCH-1/PDSCH-2/PUCCH-1/PUCCH-2 may include a different number of symbols, and different scheduling schemes of mini-slot-based scheduling or slot-based scheduling may be used.

Accordingly, as shown in FIG. 18, after a UE receives a PDCCH (PDCCH-2) including information about a PUCCH (PUCCH-2) to be currently transmitted, the UE may receive a PDCCH (PDCCH-1) including information about a pre-transmitted PUCCH (PUCCH-1).

In this case, as shown in FIGS. 16A and 16B, when a start point of accumulation of a value of $\delta_{PUCCH}$ and an end point of accumulation of a value of $\delta_{PUCCH}$ are used, an order of the start point and the end point may be switched. In this case, the UE may not perform accumulation of a value of $\delta_{PUCCH}$. That is, the value of $\delta_{PUCCH}$ may be configured as 0.

Also, according to embodiments of informing a start point and an end point of accumulation of a value of $\delta_{PUCCH}$, a start point and an end point of accumulation may be equal to each other. In this case, the UE may accumulate values of $\delta_{PUCCH}$ obtained from one or more DCIs received at the start point of accumulation of a value of $\delta_{PUCCH}$ (or the end point of accumulation of a value of $\delta_{PUCCH}$), by using the method in the embodiments described above.

Embodiments where a start point of accumulation of a value of $\delta_{PUCCH}$ and an accumulation window period are used have been described. In this case, there may be a case where the accumulation window period is 0 (i.e., only the start point of accumulation of a value of $\delta_{PUCCH}$ is received). In this case, the UE may accumulate values of $\delta_{PUCCH}$ obtained from one or more DCIs received only at the start point of accumulation of a value of $\delta_{PUCCH}$, by using the method in the embodiments described above. In another example, when the accumulation window period is 0, the UE may not perform accumulation of a value of $\delta_{PUCCH}$ (i.e., the value of $\delta_{PUCCH}$ may be configured as 0).

Also, with reference to FIG. 14, a method of accumulating values of $\delta_{PUCCH}$, when the UE receives two or more DCIs from one or more cells in a CA environment, has been described. However, the disclosure is not limited to the environment and may be applied even when two or more DCIs are received from one cell.

When the UE receives one DCI or two or more DCIs from one cell or two or more cells in a system to which CA is applied, by using a UL transmission power control method according to the disclosure, the UE may assure UL performance by accumulating values of transmission power control parameters obtained from the DCIs and may minimize interference to an adjacent cell.

Figure 19A:
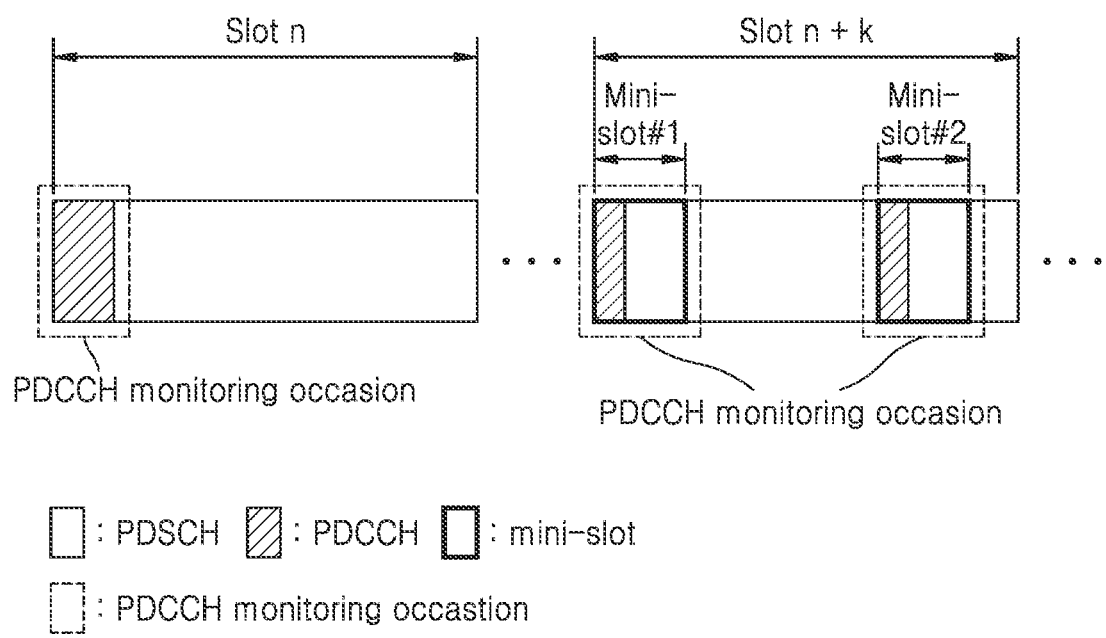
FIG. 19A is a diagram for describing a physical downlink control channel (PDCCH) monitoring occasion of a UE in a single cell, according to an embodiment of the disclosure.

FIG. 19A is a diagram for describing a PDCCH monitoring occasion of a UE in a single cell, according to an embodiment of the disclosure.

A PDCCH monitoring occasion refers to a time/frequency domain in which a UE may receive a PDCCH, and may be associated with a PDCCH search space. The UE may be configured with the PDCCH monitoring occasion through an RRC parameter from a BS. Referring to FIG. 19A, in a slot index n, one PDCCH monitoring occasion may exist in one slot; and in a slot index n+k (where k≥1), two PDCCH monitoring occasions may exist in one slot. That is, a different number of PDCCH monitoring occasions may exist in each slot. Although up to two PDCCH monitoring occasions exist in one slot in FIG. 19A, the disclosure is not limited thereto (i.e., three or more PDCCH monitoring occasions may exist in one slot). PDCCH monitoring occasion configuration information may include at least one of time axis information such as a start slot, a start symbol, or a period of a PDCCH monitoring occasion, or frequency axis information (e.g., a position of the PDCCH monitoring occasion along a frequency axis). When a plurality of PDCCH monitoring occasions are configured for one UE, PDCCH monitoring occasion configuration information may be applied to each PDCCH monitoring occasion. A UE receiving PDCCH monitoring occasion configuration information from a BS may monitor a PDCCH to be received by the UE in a corresponding PDCCH monitoring occasion. Although a PDCCH is transmitted in all PDCCH monitoring occasions in FIG. 19A, a PDCCH may not be transmitted in a region configured as a PDCCH monitoring occasion. The UE may not know when a PDCCH to be received by the UE is transmitted in a PDCCH monitoring occasion configured from the BS. Accordingly, the UE should monitoring the configured PDCCH monitoring occasion, and should always check whether the PDCCH to be received by the UE has been transmitted. Also, although not shown in FIG. 19A, when a PDCCH is transmitted through a PDCCH monitoring occasion in FIG. 19A it may mean that the PDCCH is transmitted within an activated bandwidth part (BWP). In this case, the BWP may be located in a system bandwidth operated by the BS (i.e., the BWP is a subset of the system bandwidth), and a plurality of BWPs may be configured for one UE in the system bandwidth. For example, the BS may configure four BWPs for one UE via RRC, and may activate one of the four configured BWPs. The UE may perform UL and DL transmission/reception only in the activated BWP from among the plurality of configured BWPs (i.e., the UE may not be able to simultaneously perform UL and DL transmission/reception in two or more BWPs).

Figure 19B:
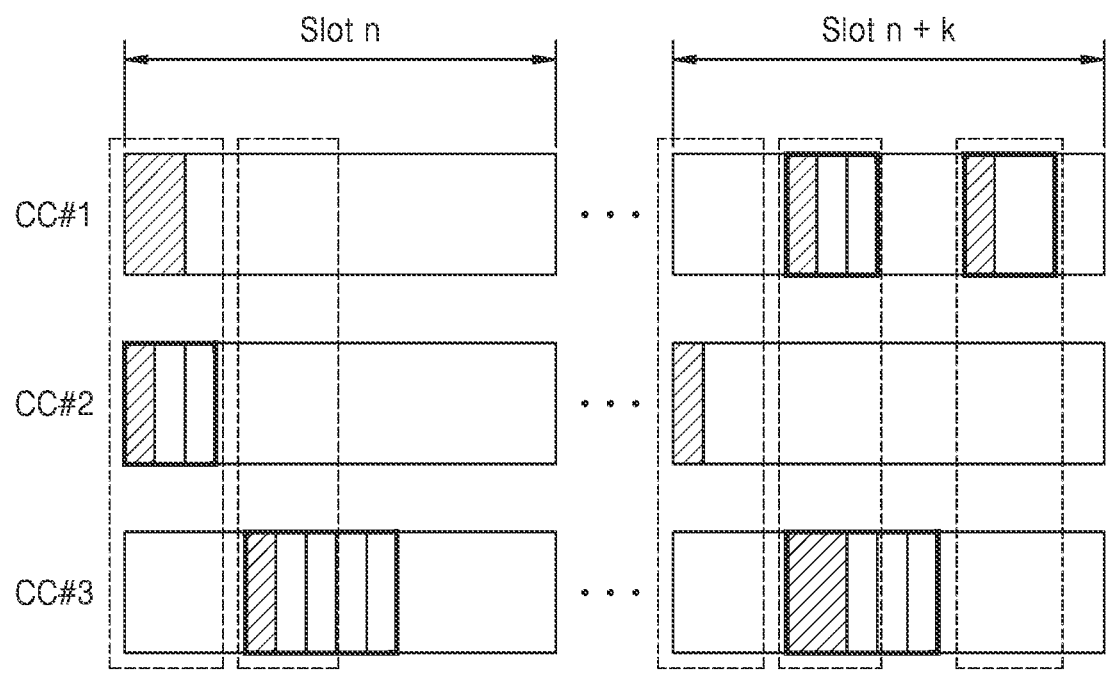
FIG. 19B is a diagram for describing a PDCCH monitoring occasion of a UE in a CA environment, according to an embodiment of the disclosure.

FIG. 19B is a diagram for describing a PDCCH monitoring occasion of a UE in a CA environment, according to an embodiment of the disclosure.

FIG. 19B illustrates a PDCCH monitoring occasion of a UE in a CA environment including three CCs. Two PDCCH monitoring occasions are configured in a slot n, and three PDCCH monitoring occasions are configured in a slot n+k (where k≥1). In a CA environment, one PDCCH monitoring occasion may span all CCs constituting a CA system. That is, a first PDCCH monitoring occasion in the slot n of FIG. 19B may be applied to CC #1, CC #2, and CC #3. Accordingly, the UE configured with the first PDCCH monitoring occasion should check whether a PDCCH to be received by the UE is transmitted by monitoring the first PDCCH monitoring occasion spanning CC #1, CC #2, and CC #3, as shown in FIG. 19B. The above operation of the UE may be applied to first, second, and third PDCCH monitoring occasions in the slot n, and may also be applied to first, second, and third PDCCH monitoring occasions in the slot n+k. Although the CA system includes three CCs in FIG. 19B, the above operation may be equally applied to a CA system including four or more CCs. Although not shown in FIG. 19B, when a PDCCH is transmitted in a PDCCH monitoring occasion of each CC in FIG. 19B, it may mean that the PDCCH is transmitted within an activated BWP of each CC.

FIG. 20 is a diagram for describing a method by which a UE determines a PUCCH resource in a UL CA environment, according to an embodiment of the disclosure.

In UL CA, a UE may transmit a PUCCH only on PCell or simultaneously on both PCell and S-Pcell according to configuration of a BS. In FIG. 20, the UE may transmit the PUCCH in CC #1. In this case, CC #1 may be considered as PCell or S-PCell.

As another example for preventing an increase in power consumption of the UE and an increase in interference to an adjacent cell, there may be a method by which the UE follows a TPC command included in DCI indicating PUCCH resource information.

Referring to FIG. 20, the UE may receive PDCCHs (PDCCH-A and PDCCH-B in FIG. 20) transmitted from CC #1 and CC #2 in a first PDCCH monitoring occasion of a slot n, and may receive a PDCCH (PDCCH-C in FIG. 20) transmitted from CC #3 in a second PDCCH monitoring occasion of the slot n. Also, the UE may receive a PDCCH (PDCCH-D in FIG. 20) transmitted from CC #2 in a first PDCCH monitoring occasion of a slot n+k (where k≥1), and may receive PDCCHs (PDCCH-E and PDCCH-F in FIG. 20) transmitted from CC #1 and CC #3 in a second PDCCH monitoring occasion. In this case, it may be assumed that the UE succeeds in detecting all of the six PDCCHs (i.e., PDCCH-A, PDCCH-B, PDCCH-C, PDCCH-D, PDCCH-E, and PDCCH-F), and it may be assumed that all of the PDCCHs correspond to DCI format 1_0 or DCI format 1_1 in which a PUCCH may be scheduled. In this case, DCI transmitted to PDCCH-X may be defined as DCI-X (where X∈{A, B, C, D, E}). DCI format 1_0 or DCI format 1_1 may include the following information.

Indicator for indicating PUCCH resource information
  HARQ feedback timing of PDSCH scheduled by DCI format 1_0 or DCI format 1_1: Indicator indicating information (i.e., information indicating a slot and/or symbol in which HARQ-ACK/NACK information for a corresponding PDSCH should be transmitted).

As shown in FIG. 20, six DCIs (or six PDCCHs) received by the UE in the slot n and the slot n+k may each indicate to transmit HARQ feedback in a slot n+k+1 (where k≥1, l≥1). Also, bit fields indicating PUCCH resource information included in the six DCIs may be different from each other (i.e., at least one DCI from among the six DCIs may indicate a different PUCCH resource). In this case, there may occur ambiguity in which the UE does not know a PUCCH resource on which HARQ feedback should be transmitted. Also, there may occur ambiguity in which the BS does not know a PUCCH resource on which the UE transmits HARQ feedback.

In order to solve these problems, a predefined rule is required between the BS and the UE, and at least one of the following methods may be used.

Method 1) PUCCH resource information of DCI transmitted in a lowest cell index from among most recently received DCIs is followed: In this case, the most recently received DCIs may refer to DCIs detected in a PDCCH monitoring occasion that is an earliest PDCCH monitoring occasion before PUCCH transmission. For example, in FIG. 20, the most recently received DCIs may be DCI-E and DCI-F detected in the second PDCCH monitoring occasion of the slot n+k. Accordingly, because the DCI transmitted in the lowest cell index is the DCI-E, the UE may transmit a PUCCH on a PUCCH resource indicated by a PUCCH resource transmission indicator included in the DCI-E. The reason why most recently received DCIs are used is that the most recently received DCIs are information that is most recently scheduled by the BS, and thus, may have a higher priority than that of previously scheduled information. Also, the reason why DCI having a lowest cell index is applied is that a cell having a lowest cell index may be PCell. However, because the PCell may not transmit DCI, Method 2) may be additionally considered.

Method 2) PUCCH resource information of DCI transmitted in a highest cell index from among most recently received DCIs is followed: Like in Method 1), most recently detected DCIs have a higher priority, but unlike in Method 1), DCI transmitted in a highest cell index has a higher priority. Accordingly, in FIG. 20, the UE may transmit a PUCCH on a PUCCH resource indicated by a PUCCH resource transmission indicator included in the DCI-F.

Figure 21A:
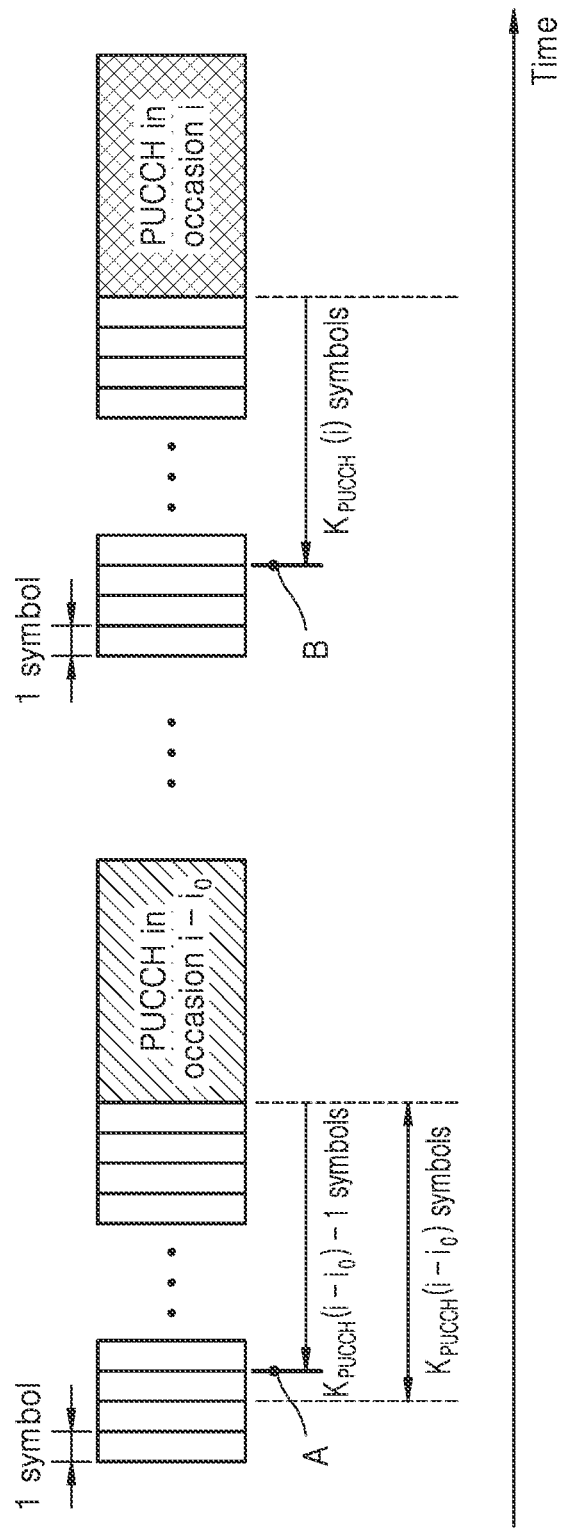
FIG. 21A is a diagram for describing a start point and an end point of accumulation of a value of $\delta_{PUCCH}$, according to an embodiment of the disclosure.

FIGS. 21A, 21B, 21C, and 21D are diagrams for describing a start point and an end point of accumulation of a value of $\delta_{PUCCH}$, according to an embodiment of the disclosure. As described with reference to FIGS. 15 to 18, a UE should recognize a start point and an end point of accumulation in order to accumulate values of $\delta_{PUCCH}$. FIGS. 21A, 21B, 21C, and 21D are other examples thereof. In FIGS. 21A, 21B, 21C, and 21D, a PUCCH that is to be currently transmitted is defined as a PUCCH (i.e., PUCCH-i) in an $i^{th}$ transmission occasion, and a PUCCH transmitted immediately before PUCCH-i is defined as a PUCCH (i.e., PUCCH-(i–$i_0$)) in a (i–$i_0$)$^{th}$ transmission occasion. In this case, the UE may obtain a value of $\delta_{PUCCH}$ from DCI format 2_2 transmitted after being CRC scrambled by TPC-PUCCH-RNTI, or may be obtained from DCI format 1_0 or DCI format 1_1 transmitted after being CRC scrambled by C-RNTI. A start point of accumulation of values of $\delta_{PUCCH}$ which should be accumulated for transmission of the PUCCH-i may be A in FIG. 21A, and an end point of accumulation may be B in FIG. 21A. That is, the UE may accumulate all values of $\delta_{PUCCH}$ obtained from the start point A to the end point B. In FIG. 21A, A that is the start point of accumulation of values of $\delta_{PUCCH}$ may refer to previous $K_{PUCCH}$(i–$i_0$)–1 symbols before a start symbol of the PUCCH-(i–$i_0$). Also, B that is the end point of accumulation of values of $\delta_{PUCCH}$ may refer to previous $K_{PUCCH}$(i) symbols before a start symbol of the PUCCH-i.

The number of symbols constituting $K_{PUCCH}$(i–$i_0$) and $K_{PUCCH}$(i) may vary according to a reception time point of DCI for scheduling a PUCCH and a transmission time point of the PUCCH. For example, a PDCCH through which DCI for scheduling the PUCCH-(i–$i_0$) is transmitted may be defined as PDCCH-1, and a PDCCH through which DCI for scheduling the PUCCH-i is transmitted may be defined as PDCCH-2. In this case, when reception time points of PDCCHs and transmission time points of PUCCHs are sequentially arranged, there may be the following cases.

Case 1) PDCCH-1 is received, PUCCH-(i–$i_0$) is transmitted, PDCCH-2 is received, and PUCCH-i is transmitted Case 2) PDCCH-1 is received, PDCCH-2 is received, PUCCH-(i–$i_0$) is transmitted, and PUCCH-i is transmitted A start point and an end point of accumulation of values of $\delta_{PUCCH}$ in Case 1) and Case 2) will be described in more detail with reference to FIG. 21B.

In another example, the number of symbols constituting the $K_{PUCCH}$(i–$i_0$) and the $K_{PUCCH}$(i) may vary according to whether the PUCCH-(i–$i_0$) and the PUCCH-i are scheduled and transmitted by DCI format 1_0 or DCI format 1_1, or are transmitted by RRC configuration (e.g., transmission of a PUCCH that transmits feedback on downlink semi-persistent scheduling (SPS)) without being scheduled by DCI format 1_0 or DCI format 1_1. In more detail, there may be the following cases, according to whether the PUCCH transmission is scheduled by a PDCCH through which DCI format 1_0 or DCI format 1_1 is transmitted.

Case 3) PUCCH-(i–$i_0$) transmission is not scheduled by DCI, and PUCCH-i is scheduled by DCI Case 4) PUCCH-(i–$i_0$) transmission is scheduled by DCI, and PUCCH-i is not scheduled by DCI When the PUCCH-(i–$i_0$) is scheduled and transmitted by DCI format 1_0 or DCI format 1_1, the $K_{PUCCH}$(i–$i_0$) may refer to the number of all symbols from a last received symbol of a PDCCH through which DCI format 1_0 or DCI format 1_1 is transmitted to a first symbol of the PUCCH-(i–$i_0$). Likewise, the $K_{PUCCH}$(i) may refer to the number of all symbols from the last received symbol of the PDCCH through which by DCI format 1_0 or DCI format 1_1 is transmitted to a first symbol of the PUCCH-i. For a PUCCH that is not scheduled and transmitted by DCI format 1_0 or DCI format 1_1, the $K_{PUCCH}$(i–$i_0$) and the $K_{PUCCH}$(i) may each be defined as 14×k2 and may be expressed as $K_{PUCCH,min}$. In this case, a value of k2 may be provided to the UE via RRC, and specifically, may refer to a minimum value from among values of k2 which may be configured in a PUSCH-ConfigCommon parameter. As described above, a start point and an end point of accumulation of values of $\delta_{PUCCH}$ may vary according to whether PUCCH transmission is scheduled by a PDCCH through which DCI format 1_0 or DCI format 1_1 is transmitted, which will be described in more detail with reference to FIGS. 21C to 21D.

Figure 21B:
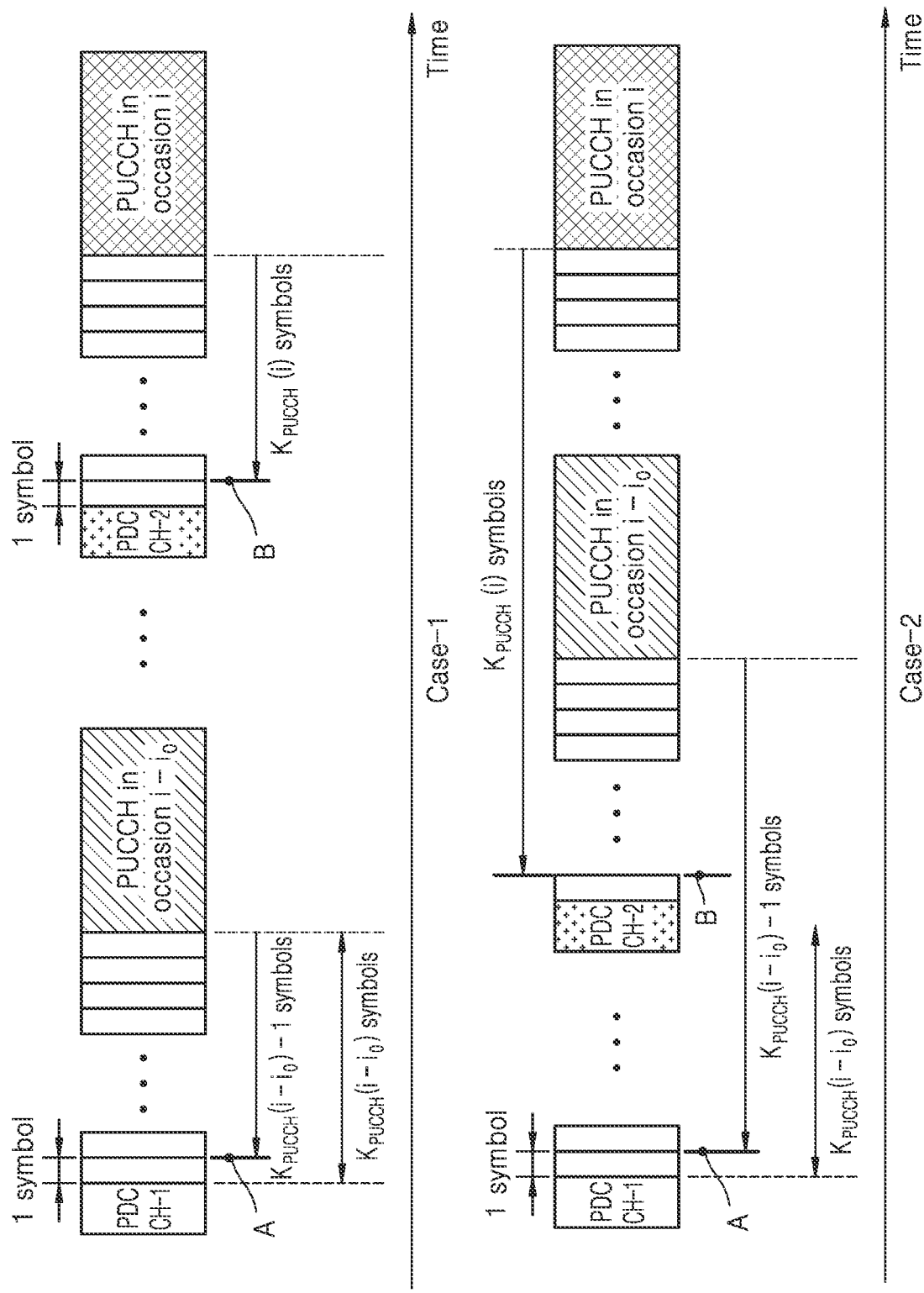
FIG. 21B is a diagram for describing a start point and an end point of accumulation of a value of $\delta_{PUCCH}$, according to an embodiment of the disclosure.

FIG. 21B is a diagram for describing a start point and an end point of accumulation of values of $\delta_{PUCCH}$, according to an embodiment of the disclosure.

In FIG. 21B, both PUCCH-(i–$i_0$) and PUCCH-(i) are scheduled and transmitted by DCI format 1_0 or DCI format 1_1, and a PDCCH through which DCI for scheduling the PUCCH-(i–$i_0$) is transmitted is expressed as PDCCH-1 and a PDCCH through which DCI for scheduling the PUCCH-i is transmitted is expressed as PDCCH-2. As described with reference to FIG. 21A, there may be Case-1 and Case-2 according to a reception time point of a PDCCH and a transmission time point of a PUCCH. As shown in FIG. 21B, in Case-1 and Case-2, $K_{PUCCH}$(i–$i_0$) may refer to the number of all symbols from a last received symbol of the PDCCH-1 to a first symbol of the PUCCH-(i–$i_0$), and $K_{PUCCH}$(i) may refer to the number of all symbols from a last received symbol of the PDCCH-2 to a first symbol of the PUCCH-i. Accordingly, in FIG. 21B, the UE may accumulate all values of $\delta_{PUCCH}$ received from a symbol (A) next to a last symbol of the PDCCH-1 to the last received symbol (B) of the PDCCH-2.

Although a start point and an end point of accumulation of values of $\delta_{PUCCH}$ for PUCCH transmission have been described in FIG. 21B, the same description may be applied to a start point and an end point of accumulation of values of $\delta_{PUSCH}$ for PUSCH transmission. For example, when both the PUSCH-(i–$i_0$) and the PUSCH-(i) are scheduled and transmitted by DCI format 2_0 or DCI format 2_1, a PDCCH through which DCI for scheduling PUSCH-(i–$i_0$) is transmitted may be considered as PDCCH-1, and a PDCCH through which DCI for scheduling PUSCH-i may be considered as PDCCH-2. In this case, the UE may accumulate all values of $\delta_{PUSCH}$ received from a symbol (A) next to a last symbol of the PDCCH-1 to a last received symbol (B) of the PDCCH-2.

In FIG. 20, when DCI is transmitted from different cells and the UE detects a plurality of DCIs, the UE may transmit a PUCCH on a PUCCH resource indicated by DCI received from a cell having a lowest cell index from among most recently received DCIs, or may transmit a PUCCH in a PUCCH resource indicated by DCI received from a cell having a highest cell index from among the most recently received DCIs. It may be necessary to consider such a method of determining DCI indicating PUCCH resource information in association with a method of accumulating values of $\delta_{PUCCH}$. In more detail, in FIG. 20, the UE may obtain resource information for PUCCH transmission through a PUCCH resource information indicator of DCI-F. Although FIG. 21B is described assuming a single cell, a start point A and an end point B for accumulation of values of $\delta_{PUCCH}$ may be applied even when multiple cells are used. In this case, DCI indicating resource information of PUCCH-(i-i$_0$) may indicate the start point A of FIG. 21B, and DCI indicating resource information of PUCCH-i may indicate the end point B of FIG. 21B. For example, DCI-F of FIG. 20 may be considered as PDCCH-2 of FIG. 21B. Although not shown in FIG. 20, PDCCH-1 of FIG. 21B may be one of DCI-A, DCI-B, or DCI-C for scheduling PUCCH transmission transmitted between a slot n and a slot n+k in FIG. 20 (Case-1 in FIG. 21B). Alternatively, the PDCCH-1 of FIG. 21B may be one of DCI-A, DCI-B, DCI-C, DCI-D, or DCI-E for scheduling PUCCH transmission transmitted between the slot n+k and a slot n+k+1 in FIG. 20 (Case-2 in FIG. 21B). Accordingly, according to the description of FIG. 20, the UE may accumulate values of $\delta_{PUCCH}$ by using a PUCCH resource indicator used for PUCCH transmission. For example, accumulation of values of $\delta_{PUCCH}$ may be accumulation of values of $\delta_{PUCCH}$ included in all DCIs (i.e., DCI format 2_2 transmitted after being CRC scrambled by TPC-PUCCH-RNTI and DCI format 1_0 or DCI format 1_1 transmitted after being CRC scrambled by C-RNTI) received from all cells between DCI-A (when the PDCCH-1 of FIG. 21B is assumed as DCI-A of FIG. 20) and DCI-F (when the PDCCH-2 of FIG. 21B is assumed as DCI-F of FIG. 20).

However, in this case, as the number of accumulated values of $\delta_{PUCCH}$ increases, the UE may unnecessarily configure high transmission power, thereby increasing power consumption of the UE and increasing the amount of interference to an adjacent cell. In order to solve the problems, a BS may configure values of $\delta_{PUCCH}$ included in DCIs transmitted from some cells as 0 dB. Alternatively, the BS may configure a sum of accumulated values of $\delta_{PUCCH}$ included in DCIs as 0 dB. For example, the BS may configure a sum of accumulation as 0 dB by configuring values of $\delta_{PUCCH}$ included in DCIs transmitted from some cells as −1 dB and configuring values of $\delta_{PUCCH}$ included in DCIs transmitted from some cells as +1 dB. In another example, when a combination of values of $\delta_{PUCCH}$ is configured as −1 dB, −1 dB, −1 dB, and +3 dB, a sum of accumulation may be 0 dB.

Figure 21C:
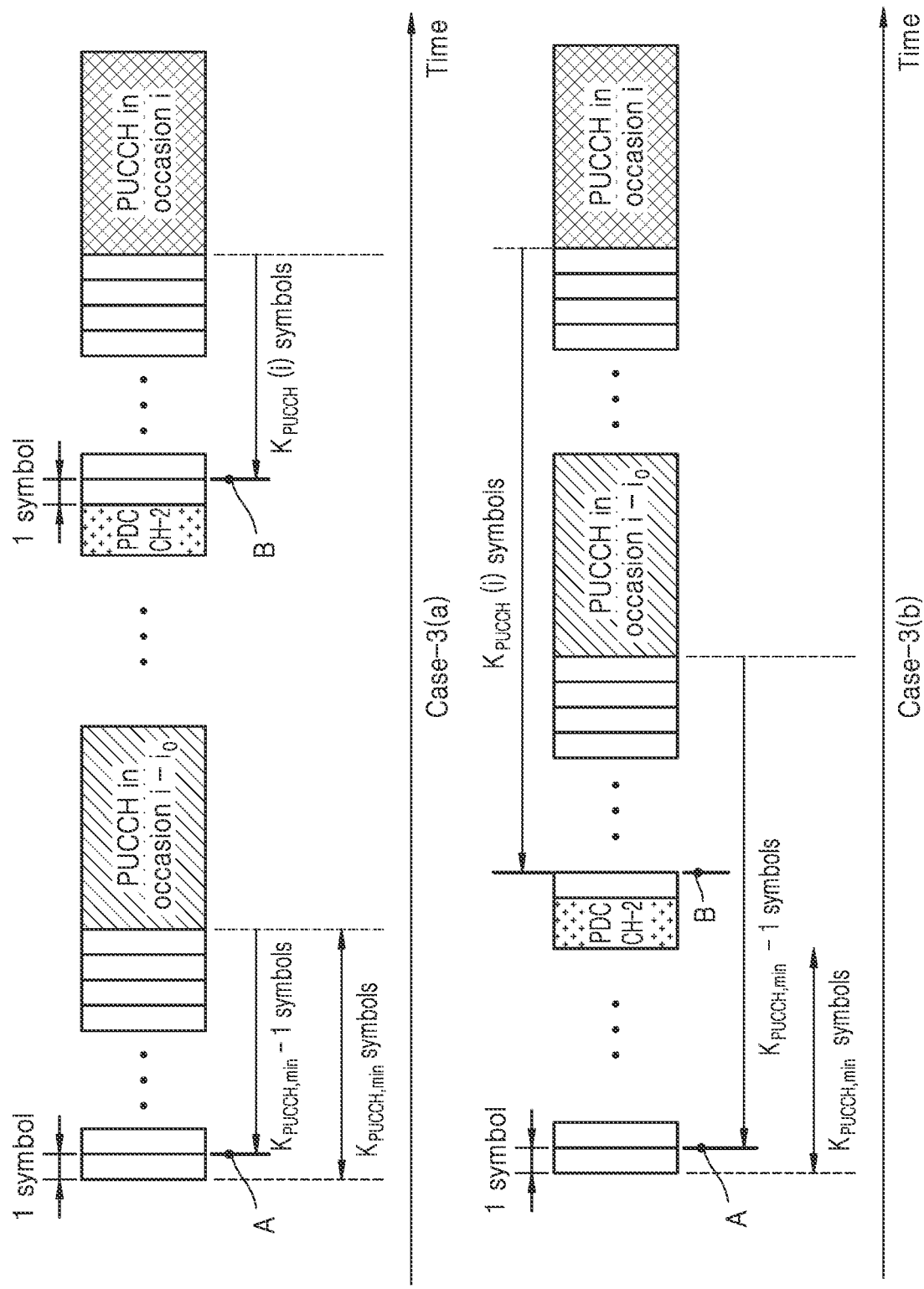
FIG. 21C is a diagram for describing a start point and an end point of accumulation of a value of $\delta_{PUCCH}$, according to an embodiment of the disclosure.

FIG. 21C is a diagram for describing a start point and an end point of accumulation of values of $\delta_{PUCCH}$, according to an embodiment of the disclosure.

Unlike in FIG. 21B, in FIG. 21C, PUCCH-(i-i$_0$) is not scheduled by DCI, and PUCCH-(i) is scheduled and transmitted by DCI (Case-3). In this case, there may be two additional cases as shown in FIG. 21C, according to a transmission time point of the PUCCH-(i-i$_0$) and a reception time point of PDCCH-2. A case where a transmission time point of the PUCCH-(i-i$_0$) is earlier than a reception time point of the PDCCH-2 is expressed as Case-3(a), and a case where a transmission time point of the PUCCH-(i-i$_0$) is later than a reception time point of the PDCCH-2 is expressed as Case-3(b). As described with reference to FIG. 21A, in Case-3(a) and Case-3(b), $K_{PUCCH}$(i-i$_0$) may refer to $K_{PUCCH,min}$ before a first symbol of the PUCCH-(i-i$_0$), and $K_{PUCCH}$(i) may refer to the number of all symbols from a last received symbol of the PDCCH-2 to a first symbol of the PUCCH-i. Accordingly, in FIG. 21C, the UE may accumulate all values of $\delta_{PUCCH}$ received from a $K_{PUCCH,min}$−1 symbol (A) with respect to the first symbol of the PUCCH-(i-i$_0$) to the last received symbol (B) of the PDCCH-2.

Although a start point and an end point of accumulation of values of $\delta_{PUCCH}$ for PUCCH transmission have been described in FIG. 21C, the same description may be applied to a start point and an end pint of accumulation of values of $\delta_{PUSCH}$ for PUSCH transmission. For example, in FIG. 21C, PUSCH-(i-i$_0$) may not be scheduled by DCI, and PUSCH-(i) may be scheduled and transmitted by DCI. In this case, the UE may accumulate all values of $\delta_{PUSCH}$ received from a $K_{PUSCH,min}$−1 symbol (A) with respect to a first symbol of the PUSCH-(i-i$_0$) to a last received symbol (B) of PDCCH-2.

In FIG. 20, when DCI is transmitted from different cells and the UE detects a plurality of DCIs, the UE may transmit a PUCCH on a PUCCH resource indicated by DCI received from a cell having a lowest cell index from among most recently received DCIs, or may transmit a PUCCH in a PUCCH resource indicated by DCI received from a cell having a highest cell index from among the most recently received DCIs. It may be necessary to consider such a method of determining DCI indicating PUCCH resource information in association with a method of accumulating values of $\delta_{PUCCH}$. In more detail, in FIG. 20, the UE may obtain resource information for PUCCH transmission through a PUCCH resource information indicator of DCI-F. Although 21B is described assuming a single cell, a start point A and an end point B for accumulation of values of $\delta_{PUCCH}$ may be applied even when multiple cells are used. In this case, as described with reference to FIG. 20, DCI indicating PUCCH resource information may refer to the end point B of FIG. 21C. For example, DCI-F of FIG. 20 may be considered as PDCCH-2 of FIG. 21C. Although not shown in FIG. 20, the PUCCH-(i-i$_0$) of FIG. 21C may be transmitted between a slot n and a slot n+k in FIG. 20 (Case-3(a) FIG. 21C). Alternatively, the PUCCH-(i-i$_0$) of FIG. 21C may be transmitted between the slot n+k and a slot n+k+1 in FIG. 20 (Case-3(b) in FIG. 21C). Accordingly, according to the description of FIG. 20, although the UE transmits a PUCCH by using a PUCCH resource indicator obtained from DCI-F, accumulation of values of $\delta_{PUCCH}$ may be accumulation of values of $\delta_{PUCCH}$ included in all DCIs (i.e., DCI format 2_2 transmitted after being CRC scrambled by TPC-PUCCH-RNTI and DCI format 1_0 or DCI format 1_1 transmitted after being CRC scrambled by C-RNTI) received from all cells between a $K_{PUSCH,min}$−1 symbol (A) before the PUCCH-(i-i$_0$) and DCI-F (when the PDCCH-2 of FIG. 21B is assumed as DCI-F of FIG. 20). In this case, as the number of accumulated values of $\delta_{PUCCH}$ increases, the UE may unnecessarily configure high transmission power, thereby increasing power consumption of the UE and increasing the amount of interference to an adjacent cell. In order to solve the problems, the BS may configure values of $\delta_{PUCCH}$ included in DCIs transmitted from some cells as 0 dB. Alternatively, the BS may configure a sum of accumulated values of $\delta_{PUCCH}$ included in DCIs as 0 dB. For example, the BS may configure a sum of accumulation as 0 dB by configuring values of $\delta_{PUCCH}$ included in DCIs transmitted from some cells as −1 dB and configuring values of $\delta_{PUCCH}$ included in DCIs transmitted from some cells as +1 dB. In another example, when a combination of values of $\delta_{PUCCH}$ is configured as −1 dB, −1 dB, −1 dB, and +3 dB, a sum of accumulation may be 0 dB.

Figure 21D:
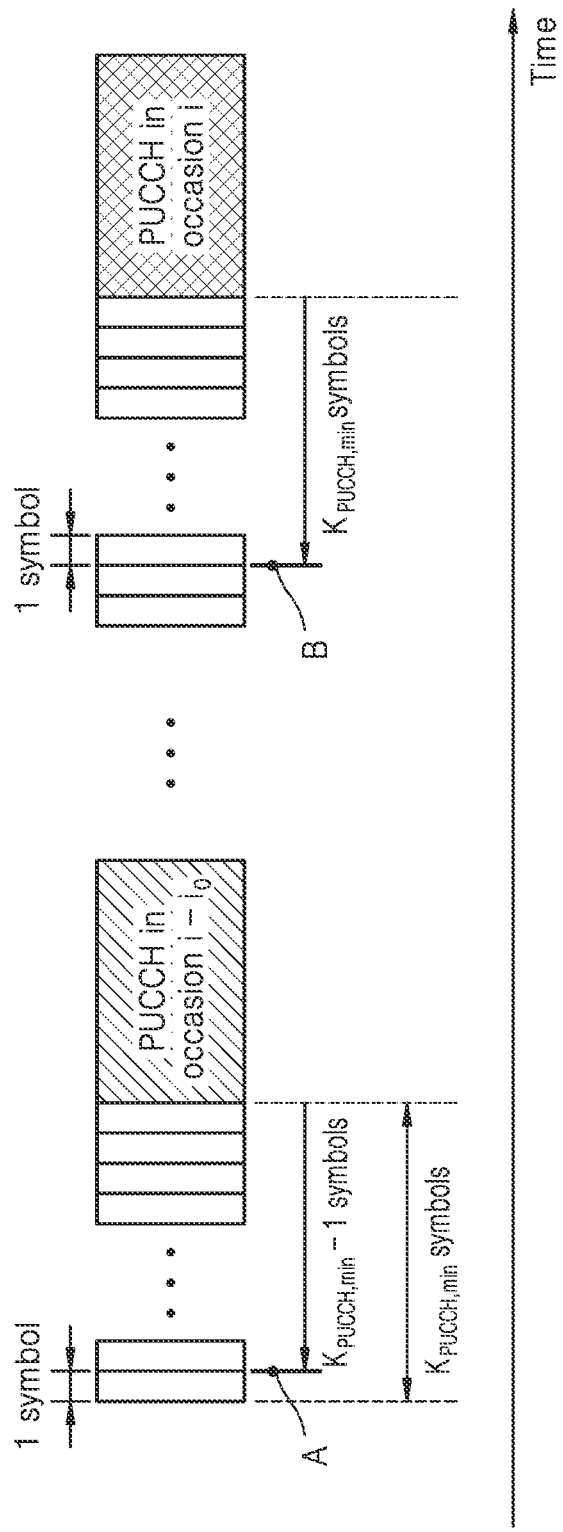
FIG. 21D is a diagram for describing a start point and an end point of accumulation of a value of $\delta_{PUCCH}$, according to an embodiment of the disclosure.

FIG. 21D is a diagram for describing a start point and an end pint of accumulation of values of $\delta_{PUCCH}$, according to an embodiment of the disclosure.

Unlike in FIGS. 21B to 21C, in FIG. 21D, both PUCCH-(i−i$_0$) and PUCCH-(i) are not scheduled by DCI. In this case, as described with reference to FIG. 21A, $K_{PUCCH}(i-i_0)$ may refer to $K_{PUCCH,min}$ before a first symbol of the PUCCH-(i−i$_0$), and $K_{PUCCH}(i)$ may refer to $K_{PUCCH,min}$ before a first symbol of the PUCCH-i. Accordingly, in FIG. 21D, the UE may accumulate all values of $\delta_{PUCCH}$ received from a $K_{PUCCH,min}-1$ symbol (A) with respect to the first symbol of the PUCCH-(i−i$_0$) to a $K_{PUCCH,min}-1$ symbol (B) with respect to the first symbol of the PUCCH-i.

Although a start point and an end point of accumulation of values of $\delta_{PUCCH}$ for PUCCH transmission have been described with reference to FIG. 21D, the same description may be applied to a start point and an end point of accumulation of values of $\delta_{PUSCH}$ for PUSCH transmission. For example, in FIG. 21D, both PUSCH-(i−i$_0$) and PUSCH-(i) may not be scheduled by DCI. In this case, the UE may accumulate all values of $\delta_{PUSCH}$ received from a $K_{PUSCH,min}-1$ symbol (A) with respect to a first symbol of the PUSCH-(i−i$_0$) to a $K_{PUSCH,min}-1$ symbol (B) with respect to a first symbol of the PUSCH-i.

Figure 22:
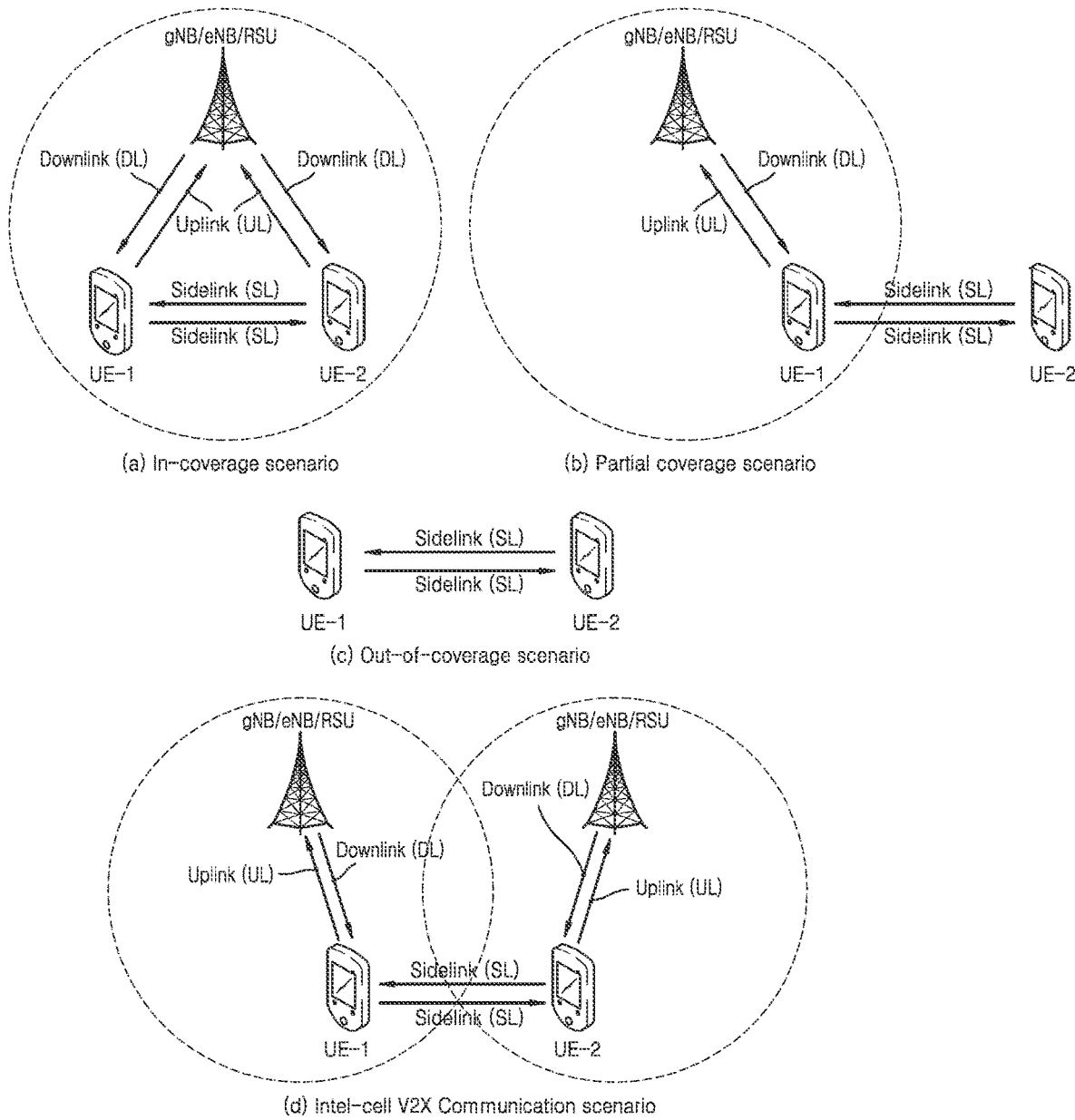
FIG. 22 illustrates an example of a system for describing some embodiments of the disclosure.

FIG. 22 illustrates an example of a system for describing some embodiments of the disclosure.

(a) of FIG. 22 illustrates an example of a case where all V2X UEs (UE-1 and UE-2) are located within coverage of a BS. All V2X UEs may receive, from the BS, data and control information through a downlink (DL), or may transmit, to the BS, data and control information through an uplink (UL). According to some embodiments, data and control information transmitted or received by V2X UEs may be data and control information for V2X communication or data and control information for general cellular communication, not V2X communication. Also, in (a) of FIG. 22, the V2X UEs may transmit/receive data and control information for V2X communication through a sidelink (SL).

(b) of FIG. 22 illustrates an example of a case where UE-1 of the V2X UEs is located within coverage of a BS and UE-2 is located outside the coverage of the BS. An arrangement of the V2X UEs shown in (b) of FIG. 22 may be referred to as partial coverage. UE-1 located within the coverage of the BS may receive data and control information from the BS through a DL or may transmit data and control information to the BS through a UL. UE-2 located outside the coverage of the BS may not receive data and control information from the BS through a DL, and may not transmit data and control information to the BS through a UL. UE-2 may transmit/receive data and control information for V2X communication to/from UE-1 through a SL.

(c) of FIG. 22 illustrates an example of a case where all V2X UEs are located outside coverage of a BS. Accordingly, UE-1 and UE-2 may not receive data and control information from the BS through a DL, and may not transmit data and control information to the BS through a UL. UE-1 and UE-2 may transmit/receive data and control information for V2X communication through a SL.

(d) of FIG. 22 illustrates an example of a scenario in which UEs located in different cells perform V2X communication therebetween. In detail, (d) of FIG. 22 illustrates a case where a V2X transmission UE and a V2X reception UE are connected to different BSs (RRC connected state) or camp on different BSs (RRC disconnected state, that is, RRC idle state). In this case, UE-1 may be the V2X transmission UE and UE-2 may be the V2X reception UE. Alternatively, UE-1 may be the V2X reception UE, and UE-2 may be the V2X transmission UE. UE-1 may receive a V2X-specific system information block (SIB) from a BS to which UE-1 is connected (or on which UE-1 camps), and UE-2 may receive a V2X-specific SIB from another BS to which UE-2 is connected (or on which UE-2 camps). In this case, information of the V2X-specific SIB received by UE-1 may be different from information of the V2X-specific SIB received by UE-2. Accordingly, it is required to unify a plurality of pieces of information so as to perform V2X communication between UEs located in different cells.

For convenience of explanation, FIG. 22 illustrates a V2X system including two UEs (UE-1 and UE-2), but the disclosure is not limited thereto. Also, a UL and a DL between a BS and V2X UEs may each be called a Uu interface, and a SL between the V2X UEs may be called a PC5 interface. Accordingly, they may be interchangeably used in the disclosure. In the disclosure, a UE may refer to a vehicle that supports vehicle-to-vehicle (V2V) communication, a vehicle or a pedestrian's handset (i.e., a smartphone) which supports vehicle-to-pedestrian (V2P) communication, a vehicle that supports vehicle-to-network (V2N) communication, or a vehicle that supports vehicle-to-infrastructure (V21) communication. Also, in the disclosure, a UE may refer to a road side unit (RSU) having UE functions, an RSU having BS functions, or an RSU having some BS functions and some UE functions. Also, it is predefined that, in the disclosure, a BS is a BS that supports both V2X communication and general cellular communication or that supports only V2X communication. In this case, the BS may refer to a 5G BS (gNB), a 4G BS (eNB), or a road side unit (RSU). Accordingly, unless otherwise stated in the disclosure, a BS and an RSU may be the same concept, and thus, may be interchangeably used.

Figure 23:
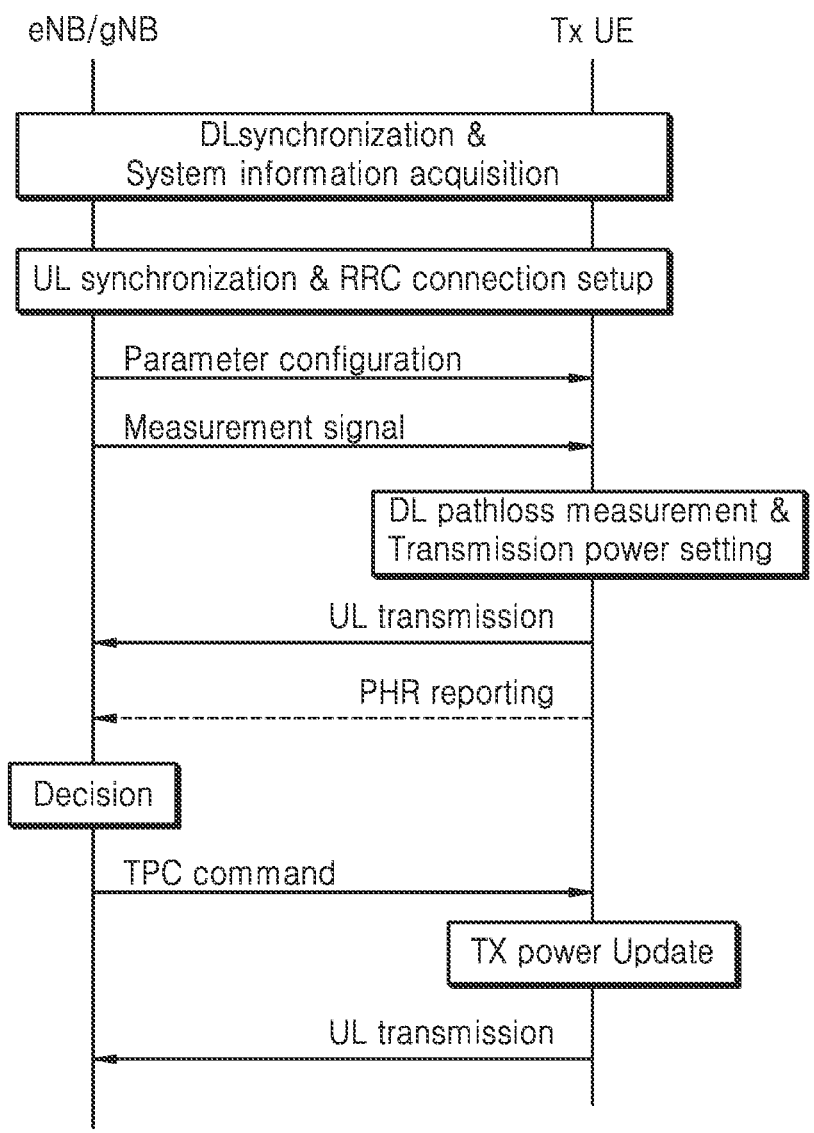
FIG. 23 illustrates a procedure in which a base station (BS) controls transmission power of a UE in a cellular system, according to some embodiments of the disclosure.

FIG. 23 illustrates a procedure in which a BS controls transmission power of a UE in a cellular system, according to some embodiments of the disclosure.

The UE within coverage of the BS may perform DL synchronization with the BS and may obtain system information. According to some embodiments of the disclosure, the DL synchronization may be performed through a primary synchronization signal/secondary synchronization signal (PSS/SSS) received from the BS. The UE having performed the DL synchronization may receive a master information block (MIB) and a system information block (SIB) and obtain the system information from the BS. The UE may perform a random access procedure to perform UL synchronization with the BS. In the random access procedure, the UE may transmit a random access preamble and a message 3 (msg3) to the BS via a UL. In this case, UL transmission power control may be performed in the transmission of the random access preamble and the transmission of the message 3, and the UE may receive parameters for UL transmission power control from the BS via an SIB or may use predefined parameters.

The UE may measure reference signal received power (RSRP) from a path attenuation estimation signal transmitted by the BS and may estimate a DL path attenuation value as in Equation 3. Then, based on the estimated DL path attenuation value, the UE may configure a UL transmission power value for transmitting the random access preamble and the message 3.

DL path attenuation=transmission power of BS signal−RSRP measured by UE    Equation 3

In Equation 3, the transmission power of the BS signal refers to transmission power of a DL path attenuation estimation signal transmitted by the BS. The DL path attenuation estimation signal transmitted by the BS may be a cell-specific reference signal (CRS) or a synchronization signal block (SSB). When the path attenuation estimation signal is a CRS, the transmission power of the BS signal may refer to transmission power of the CRS, and may be transmitted to the UE via a referenceSignalPower parameter of the system information. When the path attenuation estimation signal is an SSB, the transmission power of the BS signal may refer to transmission power of a secondary synchronization signal (SSS) and a demodulation reference signal (DMRS) that is transmitted via a physical broadcast channel (PBCH), and may be transmitted to the UE via an ss-PBCH-BlockPower parameter.

When RRC connection is established, the UE may receive, from the BS, RRC parameters for UL transmission power control via UE-specific RRC signaling or common RRC signaling. The received transmission power control parameters may be different from each other according to types of UL channels and types of signals. That is, transmission power control parameters to be applied to transmission of a physical uplink control channel (PUCCH), a physical uplink shared channel (PUSCH), and a sounding reference signal (SRS) may be different from each other. Also, as described above, a transmission power control parameter the UE received from the BS via a SIB before RRC connection establishment or transmission power control parameters the UE used as a predefined value before the RRC connection establishment may be included in the RRC parameters that are transmitted from the BS after the RRC connection establishment. In this case, the UE may use an RRC parameter value so as to control UL transmission power, the RRC parameter value being received from the BS after the RRC connection establishment.

Also, after the RRC connection establishment with the UE, the BS may configure a channel state information-reference signal (CSI-RS) as a path attenuation estimation signal for the UE. In this case, the BS may transmit, to the UE, information about transmission power of the CSI-RS via a powerControlOffsetSS parameter of UE dedicated RRC information. In this case, powerControlOffsetSS may indicate a transmission power offset between the SSB and the CSI-RS.

The UE may measure a DL RSRP by using the CSI-RS, and may estimate the DL path attenuation value by using Equation 1 by using the information about the transmission power of the CSI-RS received from the BS. Then, based on the estimated DL path attenuation value, the UE may configure the UL transmission power value for PUCCH, PUSCH, and SRS transmission.

The UE may report a power headroom (PH) to the BS. The power headroom may refer to a difference between current transmission power of the UE and maximum output power of the UE. The BS may use the power headroom report received from the UE to optimize a system operation. For example, when a value of a power headroom a particular UE reports to the BS is a positive value, the BS may allocate more resource blocks (RBs) to the particular UE, thereby increasing system yield. In contrast, when a value of a power headroom a particular UE reports to the BS is a negative value, the BS may allocates fewer resources to the particular UE or may reduce transmission power of the particular UE via a transmission power control (TPC) command By doing so, the BS may increase system yield or may reduce unnecessary power consumption by the UE.

The UE receiving the TPC command from the BS may reduce, increase, or maintain transmission power as indicated by the TPC command (transmission power update). In this case, the TPC command may be transmitted to the UE via UE-specific DCI or group common DCI. Accordingly, the BS may dynamically control transmission power of the UE via the TPC command.

Figure 24:
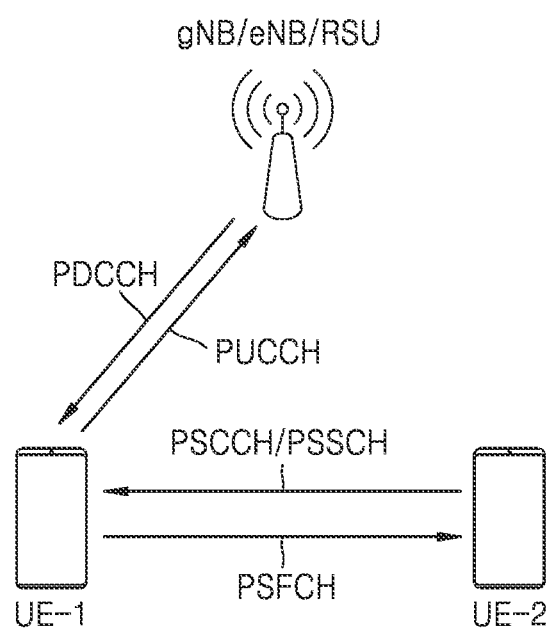
FIG. 24 illustrates a procedure in which a BS controls transmission power of a UE in a cellular system, according to some embodiments of the disclosure.

FIG. 24 illustrates a procedure in which a BS controls transmission power of a UE in a cellular system, according to some embodiments of the disclosure;

A UE may be allocated a resource for separate sidelink communication from a BS (e.g., gNB/eNB/RSU, referred to as a BS) in order to perform sidelink communication with another UE, or may select a resource for sidelink communication without intervention of the BS. FIG. 24 illustrates a process in which UE-1 is allocated a separate sidelink resource from a BS in order to perform sidelink communication with UE-2. In detail, the BS may schedule a PDCCH for sidelink communication to the UE-1. DCI information (e.g., DCI format 3_0) transmitted to the UE-1 through the PDCCH may include at least one of the following.

Sidelink assignment index (SAI): A field that indicates HARQ-ACK resource location information when the UE transmits a PUCCH including HARQ-ACK information for the PDCCH, and may be divided into Total SAI indicating size information of an HARQ-ACK resource and Counter SAI indicating location information of the HARQ-ACK resource. The SAI may include at least one information of Total SAI and Counter SAI.

Time gap: It may refer to time difference information between the PDCCH including the DCI information and a physical sidelink control channel (PSCCH) or a physical sidelink shared channel (PSSCH). In detail, the time gap may refer to an interval value between a start symbol (or an end symbol) of the PDCCH and a start symbol (or an end symbol) of the PSCCH (or the PSSCH). Candidate values of the information may be determined via a higher layer signal, and one of the candidate values may be determined via a layer 1 (L1) signal. When subcarrier spacings of the PDCCH (or a Uu interface channel) and the PSCCH or PSSCH (or a sidelink channel) are different, the time gap may be determined based on a subcarrier spacing of the PDCCH or may be determined based on a subcarrier spacing of the PSCCH (or a subcarrier spacing of the PSSCH). Alternatively, the time gap may be interpreted (or determined) based on a largest subcarrier spacing (or a smallest subcarrier spacing) from among a subcarrier spacing of the PDCCH, a subcarrier spacing of the PSCCH, and a subcarrier spacing of the PSSCH. The time gap may be determined in units of symbols, absolute times, or slots.

HARQ process ID

New data indicator (NDI)

Lowest index of the subchannel allocation to the initial transmission

Frequency resource assignment

Time resource assignment

PSFCH-to-HARQ feedback timing indicator: The indicator may indicate time difference information between a physical sidelink feedback channel (PSFCH) and a PUCCH or PUSCH through which HARQ feedback information is transmitted. When subcarrier spacings of the PSFCH and the PUCCH (or PUSCH) through which the HARQ feedback information is transmitted are different, the UE may determine the time difference value based on a subcarrier spacing of the PSFCH, a subcarrier spacing of the PUCCH (or PUSCH), or a largest (or smallest) subcarrier spacing from among the subcarrier spacing of the PSFCH and the subcarrier spacing of the PUCCH (or PUSCH)). A unit of the information may be a symbol, a slot, or a specific sub-slot. The HARQ feedback information is feedback information about the PSFCH, not feedback on the PDCCH.

PUCCH resource indicator: It may refer to a field indicating specific resource information in which the HARQ feedback information is transmitted.

Configuration index: A field indicating index information of a configured grant sidelink resource that is activated or deactivated. The field information is valid when a CRC of the DCI format is scrambled by sidelink-configured scheduling (SL-CS)-RNTI, and the field exists as preserved field information in a DCI format including a CRC scrambled by sidelink (SL)-RNTI.

The UE-1 receiving the DCI formation information in the PDCCH may obtain PSCCH (or PSSCH) resource information to be transmitted or received to or from the UE-2. Also, the UE-1 may obtain PSFCH information from the UE-2. The UE-1 may perform sidelink transmission or reception through the PSCCH (or PSSCH) resource information and the PSFCH information. Also, the UE-1 receiving the PSFCH information may transmit the PSFCH information as HARQ feedback to the BS through the PUCCH or the PUSCH. When transmission or reception relationships of physical channels shown in FIG. 24 are sequentially described, first, the BS may transmit the PDCCH to the UE-1 (step 1). The UE-1 may transmit the PSCCH (or PSSCH) to the UE-2 (step 2). The UE-2 may transmit the PSFCH to the UE-1 (step 3). The UE-1 may transmit the PUCCH to the BS (step 4). A transmission or reception flow of physical channels according to an embodiment of the disclosure may include the above steps. However, according to an embodiment, some of the above steps may be omitted, and other steps may be added. For example, in the above steps, step 3 or step 4 may be omitted by a higher layer signal or an L1 signal. In another example, step 4 may be omitted by a specific combination of some fields (e.g., the PSFCH-to-HARQ feedback timing indicator and the PUCCH resource indicator) from among the fields of the DCI format. That is, the UE-1 may not transmit the HARQ feedback information to the BS, based on a specific combination of some fields from among the fields of the DCI format. For example, when both the PSFCH-to-HARQ feedback timing indicator and the PUCCH resource indicator indicate a value of 0, the UE-1 does not transmit the HARQ feedback information to the BS.

Transmission power control of a physical uplink control channel (PUCCH) of a wireless communication system (e.g., an NR (5G) communication system) is as shown in Equation 4.

$$P_{PUCCH,b,f,c}(i) = \min\left\{\begin{array}{l} P_{CMAX,f,c}(i), \\ P_{0_{PUCCH},b,f,c}(q_u) + 10\log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i,l) \end{array}\right\}(dBm)$$

Equation 4

$P_{CMAX,f,c}(i)$ may refer to maximum transmission output of a UE at a PUCCH transmission location I for a serving cell c and a carrier f. The UE may determine $P_{CMAX,f,c}(i)$ by a P-max value configured through system information or RRC from a BS (when there is no BS, a pre-set value), a power class of the UE built in the UE, etc.

$P_{0_{PUCCH},b,f,c}(q_u)$ may refer to a value configured through system information or RRC from the BS (when there is no BS, a pre-set value) in order to guarantee the link quality of a reception UE on the serving cell c, the carrier f, and a BWP b.

$2^\mu \cdot M_{RB,b,f,c}^{PUCCH}(i)$ may refer to a size of a frequency block of the PUCCH allocated for UL transmission on the serving cell c, the carrier f, and the BWP b. In this case, $2^\mu$ may be a parameter for compensating for a different power density (PSD) according to a subcarrier spacing. For example, when a subcarrier spacing of 15 kHz is used, $\mu=0$. Even when the same number of frequency blocks are used, when a subcarrier spacing is doubled to 30 kHz, a power density may be reduced by half compared to a case where a subcarrier spacing of 15 kHz is used. Accordingly, it is necessary to double power in order to compensate for this. In more detail, when two frequency blocks are used, for example, in the case of a subcarrier spacing of 15 kHz, 3 dB may be required. However, in the case of a subcarrier spacing of 30 kHz, in order to maintain the same power density as that in the subcarrier spacing of 15 kHz, transmission power needs to be increased to 6 dB.

$PL_{b,f,c}(q_d)$ may refer to a path attenuation estimation value. In this case, a path attenuation value may be estimated through reference signal received power (RSRP) of a synchronization signal or a reference signal.

$\Delta_{F_{PUCCH}}(F)$ is a power allocation offset value for each PUCCH format, and the value is provided by configuration of a higher layer signal. When there is no higher layer signal, the UE considers the value as 0 dBm.

$\Delta_{TF,b,f,c}(i)$ may refer to a PUCCH power control parameter determined according to uplink control information (UCI) included in the PUCCH or for each PUCCH format on the serving cell c, the carrier f, and the BWP b. In more detail, the parameter may refer to a PUCCH power control parameter according to at least one of channel status information (CSI), HARQ-ACK, scheduling request (SR), the number of UCI bits, or a PUCCH resource size.

$g_{b,f,c}(i,l)$ is an accumulation value of TPC commands for a specific closed-loop power control index I on the serving cell c, the carrier f, and the BWP b, and may be expressed as in Equation 5.

$$g_{b,f,c}(i, l) = g_{b,f,c}(i - i_0, l) + \sum_{m=0}^{C(c_i)-1} \delta_{PUCCH,b,f,c}(m, l)$$  Equation 5

$i_0$ has been described with reference to FIGS. 20 to 22, and may be equally defined in Equation 5. $C(c_i)$ is the total number of transmission power control (TPC) commands received by the UE between $I^{th}$ PUCCH transmission and $(i-i_0)^{th}$ PUCCH transmission. $\delta_{PUCCH,b,f,c}(m,l)$ may refer to a TPC command value for the specific closed-loop power control index I on the serving cell c, the carrier f, and the BWP b. $\delta_{PUCCH,b,f,c}(m,l)$ may be indicated by a UE-common DCI format (e.g., DCI format 2_3) or a UE-specific DCI format (e.g., DCI format 1_0, 1_1, or 1_2). Also, according to an embodiment, $\delta_{PUCCH,b,f,c}(m,l)$ may have values as shown in Table 6.

TABLE 6

| TPC command field | Accumulated $\delta_{PUCCH,\ b,\ f,\ c}$ [dBm or dB] |
|---|---|
| 0 | −1 |
| 1 | 0 |
| 2 | 1 |
| 3 | 3 |

The UE may determine transmission power for transmitting a PUCCH as described above in Equation 4 and Equation 5. However, a field (e.g., a TPC command) related to PUCCH transmission power may not exist in a DCI format (e.g., DCI format 3_0) indicating allocation of a sidelink resource (e.g., PSCCH/PSSCH or PSFCH) for communication between UE-1 and UE-2. In a situation where there is no field related to PUCCH transmission power, the UE may determine transmission power by using at least one of the following methods or a combination thereof Method 24-1: Method of configuring a TPC command value as $\delta_{PUCCH,b,f,c}(i,l)=0$ dBm. In Method 24-1, when the UE receives a DCI format having no TPC command, the UE may apply a TPC command value $\delta_{PUCCH,b,f,c}$ of PUCCH transmission power scheduled by the DCI format to 0 dBm.

Method 24-2: Method of configuring a TPC command value as $\delta_{PUCCH,b,f,c}(i,l)=\delta_{PUCCH,b,f,c}(i-1,l)$. In Method 24-2, the UE may use a TPC command value for $i^{th}$ PUCCH transmission as a TPC command value applied for $i-1^{th}$ PUCCH transmission.

Method 24-3: Method of configuring a TPC command value as $\delta_{PUCCH,b,f,c}(i,l)=\delta_{PUCCH,b,f,c}(i-i_0,l)$. In Method 24-3, the UE may use a TPC command value for $i^{th}$ PUCCH transmission as a TPC command value applied for $i-i_0^{th}$ PUCCH transmission. $i_0$ follows the descriptions of FIGS. 21A, 21B, 21C, and 21D.

Method 24-4: Method of determining $\delta_{PUCCH,b,f,c}(i,l)$ through a higher layer signal. In Method 24-4, the UE may determine a TPC command value for $i^{th}$ PUCCH transmission as a value pre-configured by a higher layer signal.

Method 24-5: According to Method 24-5, $\delta_{PUCCH,b,f,c}(i,l)$ may be implicitly determined by one of other fields of the DCI format (e.g., PUCCH resource indicator, HARQ process ID, etc.) or a combination of two or more fields. For example, a method of determining a TPC command value may be possible by applying a modulo operation to a value indicated by the PUCCH resource indicator that is one of the fields included in the DCI format. That is, the UE may determine a value determined by mod 4 that is a value indicated by the PUCCH resource indicator as the TPC command value ($\delta_{PUCCH,b,f,c}$) in Table 6. When a value indicated by the PUCCH resource indicator is 5, the UE may determine that the TPC command of Table 6 indicates a value of 1 (0 dBm). Although a method of configuring a TPC command value by using the PUCCH resource indicator has been described in order to describe an embodiment of the disclosure, another field in DCI format 3_0 indicating sidelink resource allocation information may be used instead of the PUCCH resource indicator.

Method 24-6: A transmission UE may determine a different $\delta_{PUCCH,b,f,c}(i,l)$ according to a cast type in which the transmission UE performs as a sidelink, for example, whether a cast type is groupcast or unicast. The cast information may be determined by a higher layer signal or an L1 signal, or may be determined according to an HARQ feedback type received by the transmission UE (e.g., UE-1 of FIG. 24) from a reception UE (e.g., UE-2 of FIG. 24). In detail, the HARQ feedback type may be divided into a type in which ACK/NACK information is transmitted and a type in which only NACK information is transmitted.

In another example, because 1 in $\delta_{PUCCH,b,f,c}(i,l)$ denotes a closed-loop index (corresponding to the specific closed-loop power control index), the UE may adjust transmission power by independently (or individually) configuring a plurality of closed-loop indexes. The UE receiving control information having no TPC command may always consider the value of 1 as a fixed value of 0 or 1, or may determine the value of I (closed-loop index value) by considering a value of 1 associated with a PUCCH resource indicated by a separate PUCCH resource indicator.

Figure 25:
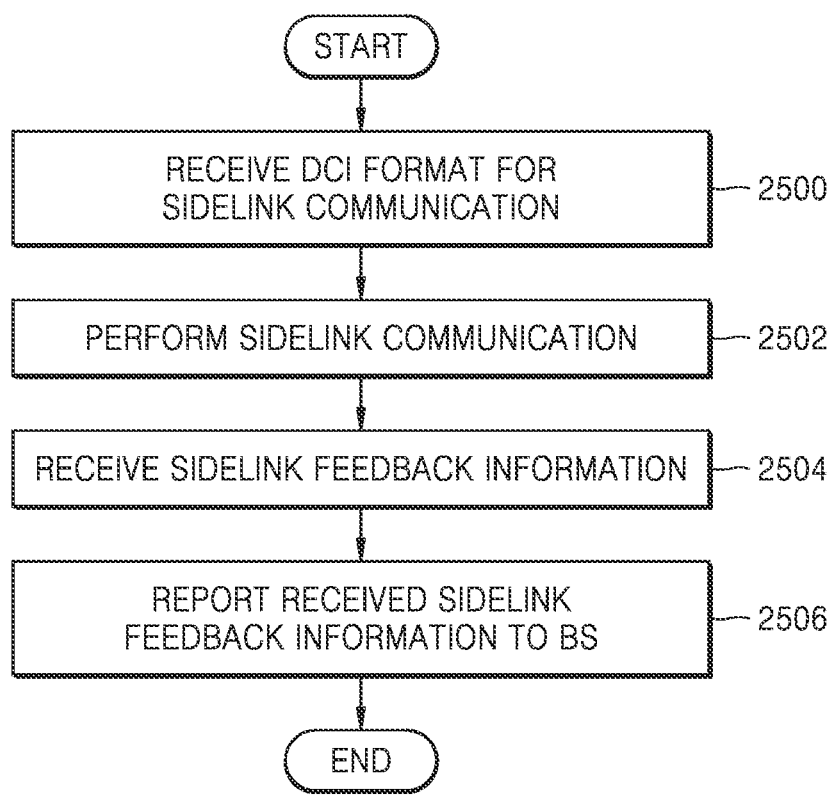
FIG. 25 is a flowchart illustrating PUCCH transmission power determination of a UE, according to an embodiment.

FIG. 25 is a flowchart illustrating PUCCH transmission power determination of a UE, according to an embodiment.

As described with reference to FIG. 24, UE-1 may receive DCI information (hereinafter, referred to as DCI information for sidelink communication) including sidelink resource allocation information and PUCCH resource information from a BS (2500). The UE-1 may transmit a PSCCH and a PSSCH to UE-2 on a sidelink resource allocated based on the DCI information for sidelink communication (2502). When a sidelink communication resource pool includes a PSFCH, the UE-1 may receive HARQ feedback information from the UE-2 (2504). The UE-1 may transmit the HARQ feedback information received through the PSFCH on a PUCCH resource provided by the DCI information for sidelink communication (2506). In this case, transmission power is determined by at least one of the methods described with reference to FIG. 24 or a combination of some of the methods.

Figure 26:
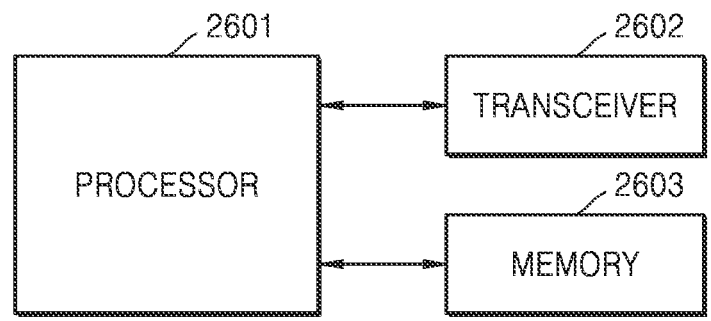
FIG. 26 illustrates a structure of a UE, according to an embodiment of the disclosure.

FIG. 26 illustrates a structure of a UE, according to an embodiment of the disclosure.

Referring to FIG. 26, a UE may include a processor 2601, a transceiver 2602, and a memory 2603. In the disclosure, the processor 2601 may be defined as a circuit, an application-specific integrated circuit, or at least one processor.

The UE of FIG. 26 may correspond to UE-2 as well as UE-1 of FIG. 22. Also, the UE of FIG. 26 may correspond to UE-1 of FIG. 24 and may also correspond to UE-2.

The processor 2601 according to an embodiment of the disclosure may control an overall operation of the UE. For example, the processor 2601 may control a signal flow between blocks so as to perform operations according to flowcharts described above. Also, the processor 2601 may write data to and read data from the memory 2603. The processor 2601 may perform functions of a protocol stack which are required by communication standards. To this end, the processor 2601 may include at least one processor or a micro-processor. Alternatively, the processor 2601 may be a part of another processor. Also, a part of the transceiver 2602 and the processor 2601 may be referred to as a communication processor (CP).

According to an embodiment of the disclosure, the processor 2601 may control operations of the UE described with reference to FIGS. 1 to 25.

The processor 2601 according to an embodiment of the disclosure may perform a UL transmission power control method, and thus, when the UE receives one or more DCIs from one or more cells in a system to which CA is applied, the processor 2601 may assure UL performance by accumulating values of transmission power control parameters obtained from the DCIs and may minimize interference to an adjacent cell.

The transceiver 2602 according to an embodiment of the disclosure may perform functions for transmitting or receiving signals through a wireless channel. For example, the transceiver 2602 may perform conversion between a baseband signal and a bit string based on physical layer specifications of a system. For example, for data transmission, the transceiver 2602 may generate complex symbols by encoding and modulating a transmission bit string. For data reception, the transceiver 2602 may reconstruct a reception bit string by demodulating and decoding a baseband signal. Also, the transceiver 2602 may up-convert a baseband signal into a radio frequency (RF) band signal and then may transmit the RF band signal through an antenna, and may down-convert an RF band signal received through the antenna into a baseband signal. For example, the transceiver 2602 may include a transmission filter, a reception filter, an amplifier, a mixer, an oscillator, a digital-to-analog convertor (DAC), an analog-to-digital convertor (ADC), or the like. Also, the transceiver 2602 may include a plurality of transmission or reception paths. Furthermore, the transceiver 2602 may include at least one antenna array including a plurality of antenna elements. In terms of hardware, the transceiver 2602 may include a digital circuit and an analog circuit (e.g., a radio frequency integrated circuit (RFIC)). The digital circuit and analog circuit may be implemented in one package. Also, the transceiver 2602 may include a plurality of RF chains.

The memory 2603 according to an embodiment of the disclosure may store basic programs, application programs, and data, e.g., configuration information, for operations of the UE. The memory 2603 may be configured as a volatile memory, a non-volatile memory, or a combination of a volatile memory and a non-volatile memory. The memory 2603 may provide stored data, in response to a request by the processor 2601. The memory 2603 may store at least one of information transmitted or received via the transceiver 2602 or information generated by the processor 2601.

Figure 27:
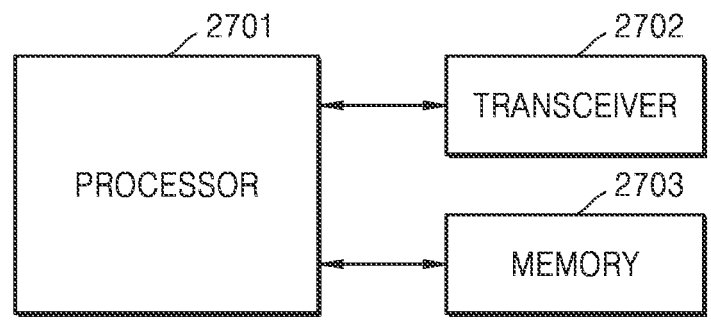
FIG. 27 illustrates a structure of a BS, according to an embodiment of the disclosure.

FIG. 27 illustrates a structure of a BS, according to an embodiment of the disclosure.

Referring to FIG. 27, a BS may include a processor 2701, a transceiver 2702, and a memory 2703. In the disclosure, the processor 2701 may be defined as a circuit, an application-specific integrated circuit, or at least one processor.

The processor 2701 according to an embodiment of the disclosure may control an overall operation of the BS. For example, the processor 2701 may control a signal flow between blocks so as to perform operations according to flowcharts described above. Also, the processor 2701 may write data to and read data from the memory 2703. The processor 2701 may perform functions of a protocol stack which are required by communication standards. To this end, the processor 2701 may include at least one processor or a micro-processor. Alternatively, the processor 2701 may be a part of another processor. Also, a part of the transceiver 2702 and the processor 2701 may be referred to as a CP.

According to an embodiment of the disclosure, the processor 2701 may control operations of the BS described with reference to FIGS. 1 to 25.

The transceiver 2702 according to an embodiment of the disclosure may perform functions for transmitting or receiving signals through a wireless channel. For example, the transceiver 2702 may perform conversion between a baseband signal and a bit string based on physical layer specifications of a system. For example, for data transmission, the transceiver 2702 may generate complex symbols by encoding and modulating a transmission bit string. For data reception, the transceiver 2702 may reconstruct a reception bit string by demodulating and decoding a baseband signal. Also, the transceiver 2702 may up-convert a baseband signal into an RF band signal and then may transmit the RF band signal through an antenna, and may down-convert an RF band signal received through the antenna into a baseband signal. For example, the transceiver 2702 may include a transmission filter, a reception filter, an amplifier, a mixer, an oscillator, a DAC, an ADC, or the like. Also, the transceiver 2702 may include a plurality of transmission or reception paths. Furthermore, the transceiver 2702 may include at least one antenna array including a plurality of antenna elements. In terms of hardware, the transceiver 2702 may include a digital circuit and an analog circuit (e.g., a RFIC). The digital circuit and analog circuit may be implemented in one package. Also, the transceiver 2702 may include a plurality of RF chains.

The memory 2703 according to an embodiment of the disclosure may store basic programs, application programs, and data, e.g., configuration information, for operations of the BS. The memory 2703 may be configured as a volatile memory, a non-volatile memory, or a combination of a volatile memory and a non-volatile memory. The memory 2703 may provide stored data, in response to a request by the processor 2701. The memory 2703 may store at least one of information transmitted or received via the transceiver 2702 or information generated by the processor 2701.

Methods according to the claims of the disclosure or the embodiments described in the specification may be implemented by hardware, software, or a combination of hardware and software.

When the methods are implemented by software, a computer-readable storage medium storing one or more programs (software modules) may be provided. The one or more programs stored in the computer-readable storage medium are configured to be executed by one or more processors in an electronic device. The one or more programs may include instructions for allowing the electronic device to execute the methods according to the claims of the disclosure or the embodiments described in the specification.

The programs (e.g., software modules or software) may be stored in a random-access memory (RAM), a non-volatile memory including a flash memory, a read-only memory (ROM), an electrically erasable programmable read-only memory (EEPROM), a magnetic disc storage device, a compact disc-ROM (CD-ROM), a digital versatile disc (DVD), another optical storage device, or a magnetic cassette. Alternatively, the programs may be stored in a memory including any combination of some or all of the above storage media. Also, a plurality of constituent memories may be provided.

Also, the programs may be stored in an attachable storage device that is accessible through a communication network, such as the Internet, an intranet, a local area network (LAN), a wide LAN (WLAN), or a storage area network (SAN), or a combination thereof. Such a storage device may be connected through an external port to an apparatus for performing an embodiment of the disclosure. Also, a separate storage device on a communication network may be connected to an apparatus for performing an embodiment of the disclosure.

In detailed embodiments of the disclosure, elements included in the disclosure have been expressed as singular or plural according to the detailed embodiments of the disclosure. However, the singular or plural form is selected appropriately for a condition provided for convenience of explanation, and the disclosure is not limited to the singular or plural form. An element expressed in a singular form may include a plurality of elements and elements expressed in a plural form may include a single element.

Particular embodiments of the disclosure have been described in the detailed descriptions of the disclosure, but it will be understood that various modifications may be made without departing the scope of the disclosure. Hence, the scope of the disclosure is not limited to the above embodiments of the disclosure, and may be defined by not only the following claims but also equivalents thereof.

The invention claimed is:

1. An operating method of a first user equipment (UE) in a wireless communication system, the operating method comprising:
   receiving downlink control information (DCI) for sidelink communication from a base station;
   transmitting a physical sidelink control channel (PSCCH) or a physical sidelink shared channel (PSSCH) to a second UE, based on the DCI for the sidelink communication;
   receiving hybrid automatic repeat and request (HARQ) feedback information through a physical sidelink feedback channel (PSFCH) from the second UE, based on the DCI for the sidelink communication;
   in case that a transmission power control (TPC) command field is not included in the DCI for the sidelink communication, determining a TPC command value as a configured value for a physical uplink control channel (PUCCH);
   determining transmission power for transmitting the HARQ feedback information to the base station, based on the determined TPC command value; and
   transmitting the HARQ feedback information through the PUCCH to the base station, based on the determined transmission power.

2. The operating method of claim 1, wherein the TPC command value is determined as 0 dBm or a TPC command value for previous PUCCH transmission.

3. The operating method of claim 1, wherein the determining of the TPC command value comprises:
   identifying the configured value as a TPC command value applied for another PUCCH transmission before the HARQ feedback information is transmitted through the PUCCH.

4. The operating method of claim 1, wherein the TPC command value is determined as the configured value included in a higher layer signal.

5. The operating method of claim 1, wherein the determining of the TPC command value comprises:
   determining the TPC command value as the configured value indicated by at least one field included in the DCI for the sidelink communication.

6. The operating method of claim 1,
   wherein the determining of the TPC command value comprises;
   determining the TPC command value, as the configured value determined based on a sidelink cast type for the sidelink communication performed by the first UE, and
   wherein the sidelink cast type is determined based on a higher layer signal, a layer 1 signal, or a type of the HARQ feedback information received from the second UE.

7. The operating method of claim 6, wherein the type of the HARQ feedback information comprises a type of transmitting acknowledgement (ACK) or negative acknowledgement (NACK) or a type of transmitting NACK.

8. The operating method of claim 1, wherein the determining of the TPC command value comprises:
   determining a closed-loop index value based on a pre-set value, or information related to a PUCCH transmission resource indicated by a PUCCH resource indicator included in the DCI for the sidelink communication; and
   determining the TPC command value as the configured value, based on the closed-loop index value.

9. A first user equipment (UE) operating in a wireless communication system, the first UE comprising:
   a transceiver;
   at least one processor communicatively coupled to the transceiver; and
   at least one memory, communicatively coupled to the at least one processor, storing instructions executable by the at least one processor individually or in any combination to cause to the first UE to:
      receive downlink control information (DCI) for sidelink communication from a base station,
      transmit a physical sidelink control channel (PSCCH) or a physical sidelink shared channel (PSSCH) to a second UE, based on the DCI for the sidelink communication,
      receive hybrid automatic repeat and request (HARQ) feedback information through a physical sidelink feedback channel (PSFCH) from the second UE, based on the DCI for the sidelink communication,
      in case that a transmission power control (TPC) command field is not included in the DCI for the sidelink communication, determine a TPC command value as a configured value for a physical uplink control channel (PUCCH),
      determine transmission power for transmitting the HARQ feedback information to the base station, based on the determined TPC command value, and
      transmit the HARQ feedback information through the PUCCH to the base station, based on the determined transmission power.

10. The first UE of claim 9, wherein the TPC command value is determined as 0 dBm; or as a TPC command value for previous PUCCH transmission.

11. The first UE of claim 9, wherein the at least one memory stores further instructions executable by the at least one processor individually or in any combination to cause the first UE to:

identify the configured value as a TPC command value applied for another PUCCH transmission before the HARQ feedback information is transmitted through the PUCCH.

12. The first UE of claim 9, wherein the at least one memory stores further instructions executable by the at least one processor individually or in any combination to cause the first UE to:
determine the TPC command value as the configured value indicated by at least one field included in the DCI for the sidelink communication.

13. The first UE of claim 9,
wherein the at least one memory stores further instructions executable by the at least one processor individually or in any combination to cause the first UE to:
determine the TPC command value, as the configured value determined based on a sidelink cast type for the sidelink communication performed by the first UE, and
wherein the sidelink cast type is determined based on a higher layer signal, a layer 1 signal, or a type of the HARQ feedback information received from the second UE.

14. The first UE of claim 13, wherein the type of the HARQ feedback information comprises a type of transmitting acknowledgement (ACK) or negative acknowledgement (NACK) or a type of transmitting NACK.

15. The first UE of claim 9, wherein the at least one memory stores further instructions executable by the at least one processor individually or in any combination to cause the first UE to:
determine a closed-loop index value based on a pre-set value, or information related to a PUCCH transmission resource indicated by a PUCCH resource indicator included in the DCI for the sidelink communication, and
determine the TPC command value as the configured value, based on the closed-loop index value.

16. The first UE of claim 9, wherein the TPC command value is determined as the configured value included in a higher layer signal.

* * * * *